(12) United States Patent
Cesares Cano et al.

(10) Patent No.: US 11,153,142 B2
(45) Date of Patent: Oct. 19, 2021

(54) METHODS AND DEVICES FOR NARROWBAND COMMUNICATIONS

(71) Applicant: Intel Corporation, Santa Clara, CA (US)

(72) Inventors: Jose Cesares Cano, Dresden (DE); Goeran Oekvist, Lulea (SE); Frank Sjoeberg, Lulea (SE); James Leblanc, Lulea (SE); Magnus Lundberg Nordenvaad, Lulea (SE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/650,877

(22) PCT Filed: Nov. 30, 2017

(86) PCT No.: PCT/EP2017/081000
§ 371 (c)(1),
(2) Date: Mar. 26, 2020

(87) PCT Pub. No.: WO2019/105557
PCT Pub. Date: Jun. 6, 2019

(65) Prior Publication Data
US 2020/0288406 A1 Sep. 10, 2020

(51) Int. Cl.
*H04L 27/26* (2006.01)
*H04W 56/00* (2009.01)
(Continued)

(52) U.S. Cl.
CPC ....... *H04L 27/2663* (2013.01); *H04W 56/001* (2013.01); *H04B 17/327* (2015.01);
(Continued)

(58) Field of Classification Search
CPC ....... H04L 27/2655–2672; H04W 56/00–0025
See application file for complete search history.

(56) References Cited

U.S. PATENT DOCUMENTS 8,369,854 B2   2/2013   Peisa et al.
8,619,752 B2   12/2013  Meylan et al.
(Continued)

FOREIGN PATENT DOCUMENTS

EP   2211579 A1      7/2010
WO   2015012654 A1   1/2015
WO   2017076610 A1   5/2017

OTHER PUBLICATIONS

Nokia et al., "On coverage level selection related matters", 8.24.2.1, Nov. 14-18, 2016, 1 page, R4-1609827, 3 GPP TSG-RAN WG4 3rd #81, Reno, USA.
(Continued)

*Primary Examiner* — Raymond S Dean
(74) *Attorney, Agent, or Firm* — Viering, Jentschura & Partner mbB

(57) ABSTRACT

A communication device includes a measurement engine configured to perform a radio measurement to obtain a reception metric, a power reduction database configured to identify a potential power reduction from a plurality of power reductions, a metric scaler configured to scale the reception metric to compensate for the potential power reduction to obtain a reduced reception metric, and a transmit controller configured to select a transmit power or a transmit repetition count for a radio frequency transceiver based on the reduced reception metric.

10 Claims, 27 Drawing Sheets

(51) Int. Cl.

| | | |
|---|---|---|
| *H04B 17/327* | (2015.01) | |
| *H04L 5/00* | (2006.01) | |
| *H04W 52/10* | (2009.01) | |
| *H04W 52/14* | (2009.01) | |
| *H04W 52/24* | (2009.01) | |
| *H04W 52/36* | (2009.01) | |
| *H04W 52/50* | (2009.01) | |
| *H04W 72/04* | (2009.01) | |

(52) U.S. Cl.
CPC .......... *H04L 5/0073* (2013.01); *H04W 52/10* (2013.01); *H04W 52/146* (2013.01); *H04W 52/24* (2013.01); *H04W 52/367* (2013.01); *H04W 52/50* (2013.01); *H04W 72/0473* (2013.01)

(56) References Cited

U.S. PATENT DOCUMENTS

| | | | |
|---|---|---|---|
| 9,674,832 | B2 | 6/2017 | Kim et al. |
| 9,936,423 | B2 | 4/2018 | Pani et al. |
| 9,999,016 | B2 | 6/2018 | Yi et al. |
| 10,681,728 | B2 | 6/2020 | Lee et al. |
| 10,834,673 | B2 | 11/2020 | Martin et al. |
| 2008/0225824 | A1 | 9/2008 | Meylan et al. |
| 2009/0103445 | A1 | 4/2009 | Sammour et al. |
| 2009/0225743 | A1* | 9/2009 | Nicholls ............... H04W 56/00 370/350 |
| 2015/0245214 | A1 | 8/2015 | Bellam et al. |
| 2015/0334553 | A1 | 11/2015 | Yang et al. |
| 2016/0219458 | A1 | 7/2016 | Kubota et al. |
| 2017/0093540 | A1* | 3/2017 | Lei ...................... H04L 27/2655 |
| 2017/0094560 | A1 | 3/2017 | Pani et al. |
| 2017/0237584 | A1* | 8/2017 | Yan ...................... H04J 11/0073 370/330 |
| 2017/0265156 | A1* | 9/2017 | Xue ...................... H04L 5/0092 |
| 2017/0311250 | A1* | 10/2017 | Rico Alvarino ........ H04W 4/70 |
| 2017/0317816 | A1* | 11/2017 | Lei ........................ H04J 13/10 |
| 2017/0332357 | A1* | 11/2017 | Xu ....................... H04W 72/10 |
| 2018/0352601 | A1 | 12/2018 | Park et al. |
| 2020/0154306 | A1 | 5/2020 | Jeon et al. |

OTHER PUBLICATIONS

Nokia et al., "Aspects for supporting low power UE", 6.2.9.5, Nov. 14-18, 2016, 3 pages, R1-1611312, 3 GPP TSG-RAN WG1 Meeting #87, Reno, USA.
Huawei et al., "NB-IOT—Coverage Class Decision and Adaption", 07.16.3.2, Oct. 5-9, 2015, 3 pages, R2-154513, 3 GPP TSG-RAN WG2 #91BIS, Malmo, Sweden.
Sriharsha, M. R. et al., "A complete cell search and synchronization in LTE", EURASIP Journal on Wireless Communications and Networking, May 31, 2017, 14 pages, 101(2017), Springer.
International Search Report issued for the counterpart international application No. PCT/EP2017/081000, dated Oct. 16, 2018, 9 pages (for reference purpose only).
Intel Corporation, "Further discussion on RLC-AM for NB-IOT", 3GPP TSG-RAN WG2 NB-IOT adhoc meeting, Jan. 19-21, 2016, 4 pages, 6.2, Budapest, Hungary.
International Search Report issued for corresponding PCT-Application No. PCT/EP2017/080979, dated Aug. 6, 2018, 3 pages (only for informational purpose only).
ETSI, "LTE; Evolved Universal Terrestrial Radio Access (E-UTRA); Radio Link Control (RLC) protocol specification", Apr. 2017, 48 pages, ETSI TS 136.322, version 13.3.0.
ETSI, "Universal Mobile Telecommunications System (UMTS), LTE; Non-Access-Stratum (NAS) protocol for Evolved Packet System (EPS); Stage 3", Mar. 2017, 459 pages, ETSI TS 124.301, version 13.9.0.
ETSI, "LTE; General Packet Radio Service (GPRS) enhancements for Evolved Universal Terrestrial Radio Access Network (E-UTRAN) access", Jan. 2017, 376 pages, ETSI TS 123.401, version 13.9.0.
3rd Generation Partnership Project, Technical Specification Group Radio Access Network, Evolved Universal Terrestrial Radio Access (E-UTRA), Physical channels and modulation, Mar. 2017, 171 pages, 3GPP TS 36.211 V13.5.0, Release 13.
ETSI, LTE, Evolved Universal Terrestrial Radio Access (E-UTRA), User Equipment (UE) procedures in idle mode, Apr. 2017, 50 pages, ETSI TS 136.304 version 13.5.0.
Qualcom Incorporated, "NB-PSS and NB-SSS Design", 2.2.5, Mar. 22-24, 2016, 25 pages, R1-161936, 3GPP TSG RAN WG1 NB-IoT Ad-Hoc Meeting, Sophia Antipolis, France.
Huawei et al., "Synchronization signal evaluation", 2.1.1.4, Jan. 18-20, 2016, 7 pages, R1-160021, 3GPP TSG RAN WG1 NB-IoT Ad-Hoc Meeting, Budapest, Hungary.
Qualcomm Incorporated, "NB-PSS and NB-SSS Design (Revised)", 2.2.5, Mar. 22-24, 2016, 26 pages, R1-161981, 3GPP TSG RAN WG1 NB-IoT Ad-Hoc Meeting, Sophia Antipolis, France.
3rd Generation Partnership Project, Technical Specification Group Radio Access Network, Evolved Universal Terrestrial Radio Access (E-UTRA), Radio Resource Control (RRC), Protocol specification, Mar. 2017, 638 pages, 3GPP TS 36.331 V13.5.0, Release 13.
3rd Generation Partnership Project, Technical Specification Group Radio Access Network, Evolved Universal Terrestrial Radio Access (E-UTRA), User Equipment (UE), radio transmission and reception, Mar. 2017, 1151 pages, 3GPP TS 36.101 V13.7.0, Release 13.
3rd Generation Partnership Project, Technical Specification Group Radio Access Network, Evolved Universal Terrestrial Radio Access (E-UTRA), Physical layer procedures, Mar. 2017, 387 pages, 3GPP TS 36.213 V13.5.0, Release 13.
3rd Generation Partnership Project, Technical Specification Group Radio Access Network, Evolved Universal Terrestrial Radio Access (E-UTRA), Medium Access Control (MAC) protocol specification, Mar. 2017, 93 pages, 3GPP TS 36.321 V13.5.0, Release 13.
Office Action issued for U.S. Appl. No. 16/649,993 dated Jun. 30, 2021, 13 pages (for informational purposes only).

\* cited by examiner

|     | $UL_1$ | $UL_2$ | $UL_3$ | $UL_4$ |
|-----|-----|-----|-----|-----|
| $f_1$ | -4  | -10 | -12 | -6  |
| $f_2$ | 0   | -2  | -2  | -4  |
| $f_3$ | 0   | 0   | -10 | -16 |
| $f_4$ | -8  | -2  | -8  | -4  |
| $f_5$ | -16 | -20 | -16 | -10 |
| $f_6$ | -4  | -12 | -14 | -18 |
| $f_7$ | -2  | 0   | -2  | -2  |
| $f_8$ | -10 | -18 | -10 | -10 |

METHODS AND DEVICES FOR NARROWBAND COMMUNICATIONS

CROSS-REFERENCE TO RELATED APPLICATIONS

This application is a national stage entry, according to 35 U.S.C. § 371, of PCT Application No. PCT/EP2017/081000 filed on Nov. 30, 2017, which is incorporated by reference herein in its entirety.

TECHNICAL FIELD

Various aspects relate generally to methods and devices for frequency scan and cell search.

BACKGROUND

Narrowband Internet of Things (NB-IoT) is a cellular technology introduced by the $3^{rd}$ Generation Partnership Project (3GPP) in Release 13 of the 3GPP specification. NB-IoT is generally directed towards usage cases that involve low complexity, low power consumption, and extended range of coverage (e.g., Signal-to-Noise Ratios (SNRs) from −12 to −15 dB).

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 23 shows an exemplary power reduction table according to some aspects;

DESCRIPTION

Figure 1:
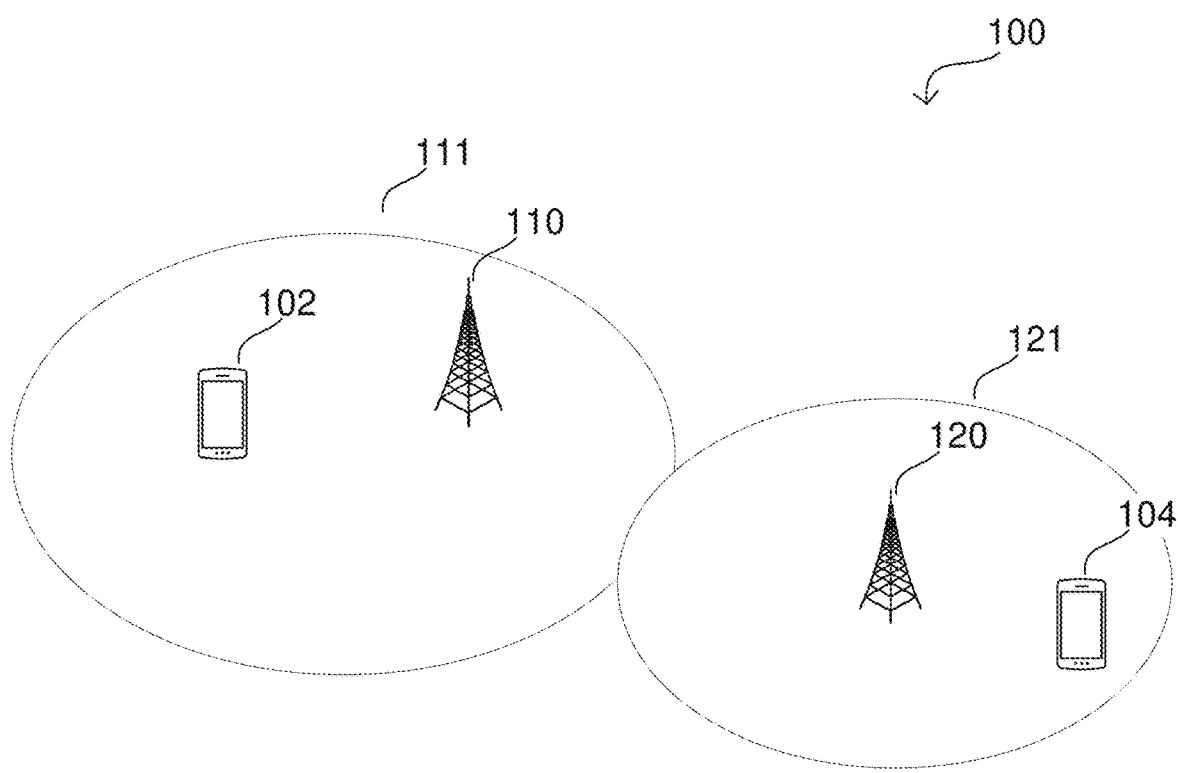
FIG. 1 shows an exemplary network diagram according to some aspects.

The following detailed description refers to the accompanying drawings that show, by way of illustration, specific details and aspects in which the disclosure may be practiced.

The word "exemplary" is used herein to mean "serving as an example, instance, or illustration". Any aspect or design described herein as "exemplary" is not necessarily to be construed as preferred or advantageous over other aspects or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, "memory" are understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component comprising one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components, which are directed to functionality other than wireless communications. Terminal devices can optionally support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, mobile cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, etc. Certain communication devices can act as both terminal devices and network access nodes, such as a terminal device that provides network connectivity for other terminal devices.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network" and "wireless network" as utilized herein encompasses both an access section of a network (e.g., a radio access network (RAN) section) and a core section of a network (e.g., a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

Similar to other 3GPP standards such as Long Term Evolution (LTE), terminal devices operating using NB-IoT may perform detection of synchronization signals to detect nearby NB-IoT cells. As these NB-IoT cells are configured to periodically transmit NB-IoT Primary Synchronization Signals (NPSS), a terminal device using NB-IoT can detect and process NPSSs to acquire time and frequency synchronization with NB-IoT cells. After obtaining time and frequency synchronization, the terminal device can establish a connection with the NB-IoT cell, thus enabling the terminal device to exchange user data using a radio access interface provided by the NB-IoT cell.

Accurate NPSS detection techniques can help to avoid false detections, where a terminal device mistakenly identifies a cell when none is actually present, and/or missed detections, where a terminal device fails to detect a nearby cell. Various existing NPSS detection techniques use autocorrelation techniques for NPSS detections. While effective in some cases, autocorrelation-based NPSS detection techniques often suffer from the inclusion of a "noise-times-noise" term in the processed signals, which can be particularly problematic in extremely low SNR conditions. Other NPSS detection techniques can partially address this drawback with long accumulation times, where multiple frames of data are processed and the results averaged to try to mitigate for random noise. However, this can introduce other problems in system performance, including added latency and/or power consumption.

Accordingly, aspects of this disclosure present synchronization signal detection techniques that offer better performance without prohibitive increases in complexity. As described in detail herein, terminal devices may utilize a two-stage detection procedure with synchronization signals to obtain accurate time and frequency offset estimates for a nearby network access node.

Figure 2:
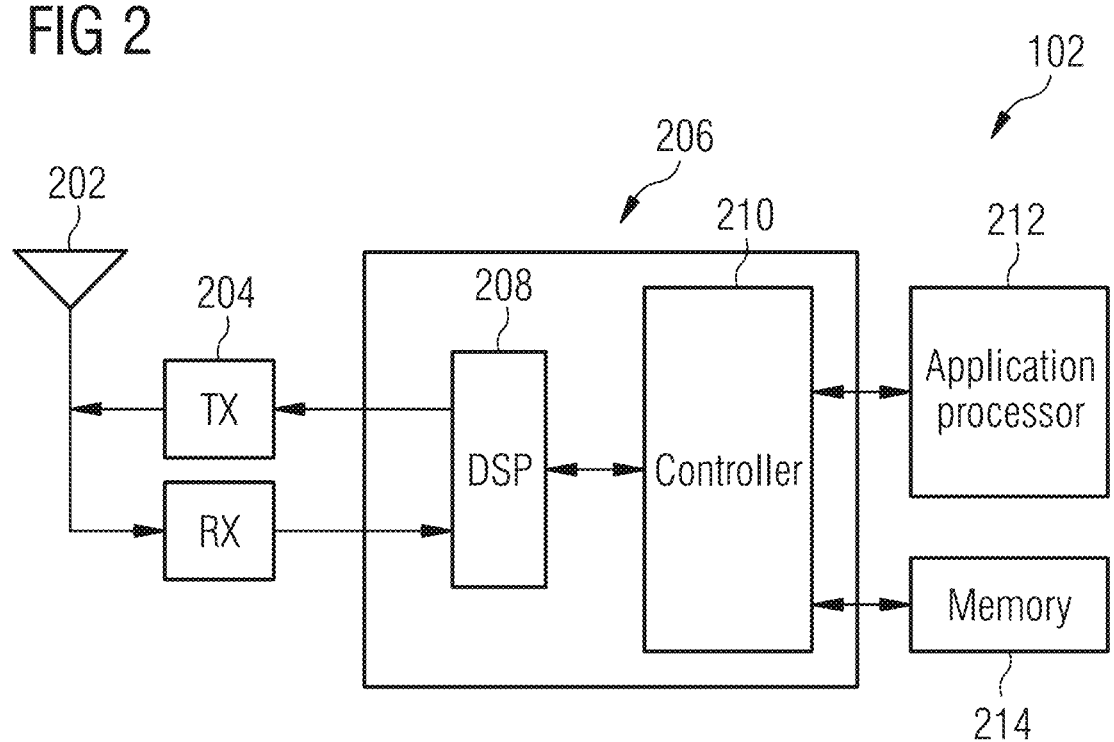
FIG. 2 shows an exemplary internal configuration of a terminal device according to some aspects.

Although some examples provided herein may relate to NB-IoT and NPSS use cases, these processing techniques are applicable to detection and processing of any type of synchronization signal, including those from both 3GPP and non-3GPP standards. FIGS. 1 and 2 depict the general underlying network and device architecture for wireless communications. FIG. 1 shows exemplary radio communication network 100 according to some aspects, which may include terminal devices 102 and 104 in addition to network access nodes 110 and 120. Communication network 100 may communicate via network access nodes 110 and 120 with terminal devices 102 and 104 via various mechanisms. Although certain examples described herein may refer to a particular radio access network context (e.g., LTE, UMTS, GSM, other 3rd Generation Partnership Project (3GPP) networks, WLAN/WiFi, Bluetooth, 5G, mmWave, etc.), these examples are demonstrative and may therefore be analogously applied to any other type or configuration of radio access network.

In an exemplary cellular context, network access nodes 110 and 120 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, e.g. for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an internal configuration of terminal device 102 according to some aspects, which may include antenna system 202, radio frequency (RF) transceiver 204, baseband modem 206 (including digital signal processor 208 and controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 in order to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the RF transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by controller 210 for transmission via RF transceiver 204, and, in the receive path, prepare incoming received data provided by RF transceiver 204 for processing by controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions of the radio communication technologies, while controller 210 may be responsible for upper-layer protocol stack functions. Controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum (AS) and Non-Access Stratum (NAS) (also encompassing Layer 2 and Layer 3) of each supported radio communication technology. Controller 210 may be structurally embodied as a protocol processor configured to execute protocol software (retrieved from a controller memory) and subsequently control the radio communication components of terminal device 102 in order to transmit and receive communication signals in accordance with the corresponding protocol control logic defined in the protocol software. Controller 210 may include one or more processors configured to retrieve and execute program code that defines the upper-layer protocol stack logic for one or more radio communication technologies, which can include Data Link Layer/Layer 2 and Network Layer/Layer 3 functions. Controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 210 may include executable instructions that define the logic of such functions.

In some aspects, terminal device 102 may be configured to transmit and receive data according to multiple radio communication technologies. Accordingly, in some aspects one or more of antenna system 202, RF transceiver 204, digital signal processor 208, and controller 210 may include separate components or instances dedicated to different radio communication technologies and/or unified components that are shared between different radio communication technologies. For example, in some aspects controller 210 may be configured to execute multiple protocol stacks, each dedicated to a different radio communication technology and either at the same processor or different processors. In some aspects, digital signal processor 208 may include separate processors and/or hardware accelerators that are dedicated to different respective radio communication technologies, and/or one or more processors and/or hardware accelerators that are shared between multiple radio communication technologies. In some aspects, RF transceiver 204 may include separate RF circuitry sections dedicated to different respective radio communication technologies, and/or RF circuitry sections shared between multiple radio communication technologies. In some aspects, antenna system 202 may include separate antennas dedicated to different respective radio communication technologies, and/or antennas shared between multiple radio communication technologies. Accordingly, while antenna system 202, RF transceiver 204, digital signal processor 208, and controller 210 are shown as individual components in FIG. 3, in some aspects antenna system 202, RF transceiver 204, digital signal processor 208, and/or controller 210 can encompass separate components dedicated to different radio communication technologies.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor 208 may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive and cache or other volatile memory. Although not explicitly depicted in FIG. 2, the various other components of terminal device 102 shown in FIG. 2 may additionally each include integrated permanent and non-permanent memory components, such as for storing software program code, buffering data, etc.

In some aspects, terminal device 102 may operate using NB-IoT, while network access nodes 110 and 120 may be NB-IoT cells. Accordingly, terminal device 102 may be configured to perform NPSS detection to detect nearby NB-IoT cells, including network access nodes 110 and 120. Network access nodes 110 and 120 may be configured to periodically transmit NPSSs (e.g., in accordance with an NB-IoT standard), which terminal device 102 may detect as part of NPSS detection. Terminal device 102 may obtain time and frequency synchronization with network access nodes 110 and/or 120 and use this time and frequency synchronization to monitor, camp, and/or connect to network to network access nodes 110 and/or 120.

According to various aspects of this disclosure, terminal device 102 may perform a specialized synchronization signal detection procedure to obtain such time and frequency synchronization with nearby cells. Terminal device 102 may perform this synchronization signal detection in a two-stage process: a first stage to determine a rough time offset estimate $\hat{\tau}_{rough}$, and a second stage to determine a refined time offset estimate $\hat{\tau}_{fine}$ and a frequency offset estimate $\hat{f}$. Terminal device 102 may then be able to use the refined time offset estimate $\hat{\tau}_{fine}$ and the frequency offset estimate $\hat{f}$ to acquire time and frequency synchronization with one or more cells, such as by using the refined time offset estimate $\hat{\tau}_{fine}$ to synchronize with a time schedule used by a cell and using the frequency offset estimate $\hat{f}$ to match a downmixing frequency of terminal device 102 with the carrier frequency used by the cell. In some cases, terminal device 102 may select a cell to connect to, and may use the refined time offset estimate $\hat{\tau}_{fine}$ and the frequency offset estimate $\hat{f}$ to transmit and receive data with the cell.

Figure 3:
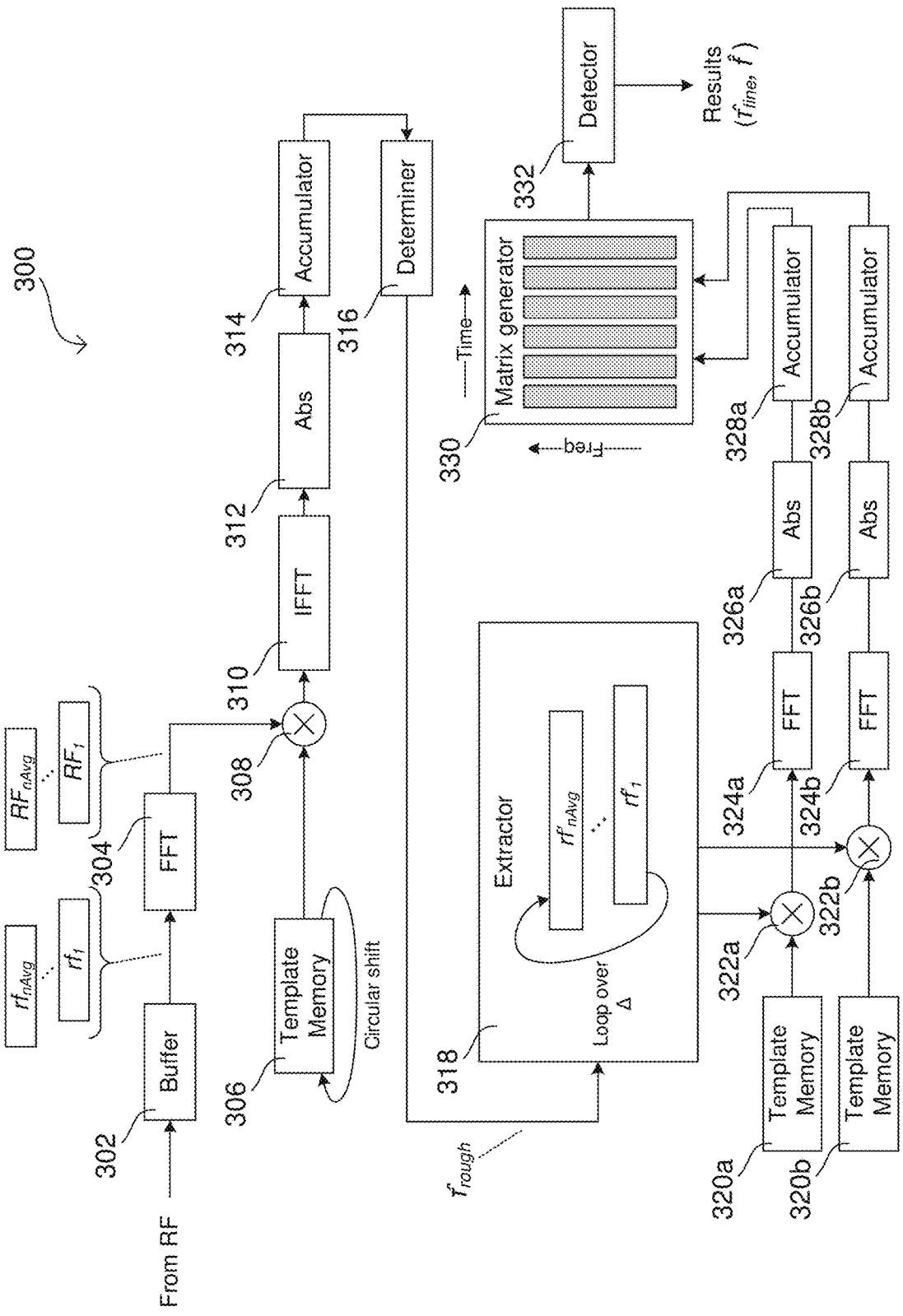
FIG. 3 shows an exemplary internal configuration of a cell searcher according to some aspects.

Terminal device 102 may execute the synchronization signal detection at a cell searcher, which may be configured to receive and process signals to attempt to detect nearby active cells. FIG. 3 shows an exemplary internal configuration of cell searcher 300 according to some aspects, which may be an internal component of terminal device 102. In some aspects, cell searcher 300 may be an internal component of digital signal processor 208 (as introduced in FIG. 2). For example, digital signal processor 208 may receive baseband samples from RF transceiver 204, which may be provided to a receive chain internal to digital signal processor 208 that is configured to perform receive direction physical layer processing on the baseband samples. Cell searcher 300 may be located within the receive chain or run parallel to the receive chain, and may receive and process the baseband samples provided by RF transceiver 204.

In various aspects, cell searcher 300 may be implemented as an integrated circuitry component, and may include a mixture of software and hardware components. For example, one or more of elements 302-332 (as further described below) can be realized as a dedicated hardware circuit that defines the respective functionality of the element with digital logic. In another example, one or more of elements 302-332 can be realized as a processor configured to retrieve and execute program code from a local memory, where the program code defines the respective functionality of the element with executable instructions. In some aspects, the various elements 302-332 of cell searcher 300 may be mounted together on one or more chips that collectively form cell searcher 300.

As described here, cell searcher 300 may be configured to utilize a specialized two-stage process to determine timing and frequency offset estimates based on synchronization signals, which terminal device 102 may then use to connect to and interact with nearby cells Terminal device 102 may be configured to initiate the cell search process at cell searcher 300 based on a triggering condition, such as after power-on, after re-entry into coverage, or when current radio conditions warrant the detection and identification of neighbor cells (e.g., due to poor serving cell performance). Controller 210 may identify a target center frequency for cell searcher 300 to search, and may control RF transceiver 204 to tune to the target center frequency (e.g., EARFCN in LTE and NB-IoT, for example by setting its downmixing frequency equal to the target center frequency). RF transceiver 204 may wirelessly receive signals on the target center frequency (via antenna system 202), process the signals to obtain baseband samples, and provide resulting baseband samples to digital signal processor 208. In some aspects, controller 210 may identify a plurality of target center frequencies for cell searcher 300 to search (e.g., a plurality of EARFCNs in LTE), in which case cell searcher 300 may sequentially perform the synchronization detection procedure on each of the plurality of target center frequencies to detect cells on each center frequency.

Cell searcher 300 may be configured to perform its cell searching on these baseband samples. As the baseband samples are representative of the radio signals originally received by antenna system 202, cell searcher 300 may be able to process the baseband samples to detect the presence of synchronization signals (e.g., NPSSs, or other synchronization signals depending on the particular use case) transmitted by nearby cells. Accordingly, cell searcher 300 may attempt to identify the time and frequency location of synchronization signals in the wireless signals received by RF transceiver 204. For example, in aspects where terminal device 102 is an NB-IoT, cell searcher 300 may attempt to detect NPSSs in the wireless signals, and to identify the time location as well as the exact carrier frequency at which the corresponding NB-IoT cell transmitted the NPSSs.

As shown in FIG. 3, cell searcher 300 may store the baseband samples (which are time-domain samples) provided by RF transceiver 204 in buffer 302. In some aspects, buffer 302 may store time-domain baseband samples from nAvg radio frames (where the time-domain baseband samples from the first radio frame are denoted as $rf_1$ and the time-domain samples from the $nAvg^{th}$ radio frame are denoted as $rf_{nAvg}$), which may enable cell searcher 300 to use accumulation over multiple radio frames to improve detection performance. In some aspects, buffer 302 may store the time-domain baseband samples from the nAvg radio frames simultaneously, while in other aspects buffer 302 may store the time-domain baseband samples from the nAvg radio frames sequentially (e.g., storing time-domain samples for only some of the nAvg radio frames until cell searcher 300 has fully processed these time-domain samples, discarding these time-domain samples, and then storing time-domain samples for other of the nAvg radio frames until cell searcher 300 has fully processed these time-domain samples).

Buffer 302 may provide the time-domain baseband samples to Fast Fourier Transform (FFT) engine 304 (e.g., either for all nAvg radio frames at once, or sequentially), which may perform an FFT operation on the time-domain baseband samples to produce frequency-domain baseband samples. As shown in FIG. 3, FFT engine 304 may therefore produce respective frequency-domain baseband samples for each of the nAvg radio frames (where the frequency-domain baseband samples from the first radio frame are denoted as $RF_1$ and the frequency-domain baseband samples from the $nAvg^{th}$ radio frame are denoted as $RF_{nAvg}$).

FFT engine 304 may provide the frequency-domain baseband samples to multiplier 308. Multiplier 308 may also receive a synchronization signal template from template memory 306, where the synchronization signal template may be a local copy (i.e., samples) of the complex conjugate of the predefined synchronization signal that cell searcher 300 is trying to detect (in other words, the target synchronization signal). In some aspects, the synchronization signal template may be in the frequency domain, i.e., the complex conjugate of the frequency-domain predefined synchronization signal. For example, in aspects where terminal device 102 is an NB-IoT terminal device, template memory 306 may store a local copy of the complex conjugate of the frequency-domain NPSS as the synchronization signal template (in other words, the samples of the complex conjugate of the frequency-domain NPSS).

Multiplier 308 may then perform, for each of the nAvg radio frames, an element-by-element multiplication between the frequency-domain baseband samples of the radio frame from FFT engine 304 and the synchronization signal template from template memory 306. Multiplier 308 may then provide the resulting product to inverse FFT (IFFT) engine 310, which may determine the inverse FFT of the product. Due to the relationship between FFTs and cross-correlation, the resulting signal is the time-domain cross-correlation between the radio frame and the synchronization signal (as the cross-correlation of two signals in the time domain is equal to the inverse Fourier transform of the element-by-element multiplication of one signal by the complex conjugate of the other signal in the frequency-domain). Accordingly, for each radio frame, IFFT engine 310 may produce the time-domain cross-correlation between the radio frame and the synchronization signal template stored in template memory 306. The combination of buffer 302, FFT engine 304, multiplier 308, and IFFT engine 310 may therefore form a cross-correlation calculator, and may be configured to calculate the time domain cross-correlation between two inputs (e.g., the baseband samples from RF transceiver 204 and the synchronization signal template from template memory 306). While the cross-correlation calculator shown in FIG. 3 may be an FFT-based cross-correlation calculator (e.g., that performs an element-by-element multiplication of two frequency-domain signals, one of which being a complex conjugate, and computes the IFFT of the product to obtain a time-domain cross-correlation), in other aspects cell searcher 300 may use a cross-correlation calculator that calculates a time-domain cross-correlation using the time-domain baseband samples from RF transceiver 204 and a time-domain synchronization signal template stored in template memory 306 (e.g., without performing a frequency-domain element-by-element multiplication and subsequent IFFT).

Absolute value determiner 312 may then determine the absolute value of the time-domain cross-correlations produced by IFFT engine 310, and may provide the resulting time-domain cross-correlation magnitudes to accumulator 314. Accumulator 314 may then sum these inputs over each of the nAvg radio frames to obtain an accumulated time-domain cross-correlation magnitude. As this accumulated time-domain cross-correlation magnitude is the sum of the time-domain cross-correlation magnitudes from each of the nAvg radio frames, the impacts of acute noise events may be mitigated.

Furthermore, in some aspects cell searcher 300 may also consider the impact of frequency offsets during the first stage. As shown in FIG. 3, template memory 306 may be configured to apply a plurality of circular shifts to the synchronization signal template, and to provide a plurality of shifted synchronization signal templates to multiplier 308. Each of the plurality of circular shifts may correspond to a different carrier frequency offset (as the shifted synchronization signals are in the frequency domain and are offset by some circular shift). Multiplier 308 may then be configured to determine an element-by-element multiplication for each of the plurality of circular shifts, namely by multiplying the frequency-domain baseband samples (of each of the nAvg radio frames) by each of the plurality of shifted synchronization signal templates. Multiplier 308 may then provide these products to IFFT engine 310 and absolute value determiner 312.

As a result, IFFT engine 310 and absolute value determiner 312 may be configured to produce a time-domain cross-correlation magnitude for each of the plurality of circular shifts and each of nAvg radio frames. Accumulator 314 may be configured to accumulate the time-domain cross-correlation magnitudes, and may therefore obtain an accumulated time-domain cross-correlation magnitude that is accumulated over each of the nAvg radio frames and each of the plurality of circular shifts. The use of these circular shifts allows for cell searcher 300 to evaluate over all frequency offsets in a desired range (governed by the number and relative offsets of the plurality of circular shifts). In some aspects, template memory 306 may apply the circular shifts to the synchronization signal template using memory pointer offsets (e.g., virtual circular shifts), where template memory 306 provides the shifted synchronization signal templates to multiplier 308 by starting at a different memory location. In some aspects, cell searcher 300 may utilize these circular shifts, while in other aspects cell searcher 300 may not utilize these circular shifts.

Determiner 316 may therefore receive an accumulated time-domain cross-correlation magnitude from accumulator 314. Determiner 316 may evaluate the accumulated time-domain cross-correlation magnitude to identify its maximum value and the time sample (e.g., by time sample index within a radio frame) at which the maximum value appears. Determiner 316 may take this time sample as the rough time offset estimate $\hat{\tau}_{rough}$, thus concluding the first stage of the synchronization signal detection by cell searcher 300. As determiner 316 may in effect identify the largest value of the time-domain cross-correlation magnitude, determiner 316 may identify the time sample of the radio frames that has the highest cross-correlation with the synchronization signal template. Rough time offset estimate $\hat{\tau}_{rough}$ may therefore be a rough guess as to the time sample of the radio frames where a synchronization signal (transmitted by a nearby cell) appears. This may conclude the first stage of the synchronization signal detection.

After obtaining rough time offset estimate $\hat{\tau}_{rough}$, cell searcher 300 may begin the second stage of the synchronization signal detection. In some aspects, cell searcher 300 may re-use the nAvg radio frames from the first stage in the second stage, where buffer 302 may provide the sample data from these radio frames to extractor 318 for the second stage. In other aspects, buffer 302 may receive a new set of nAvg radio frames for the second stage, and may provide this new sample data to extractor 318. As shown in FIG. 3, determiner 316 may provide $\hat{\tau}_{rough}$ to extractor 318, which may then begin the second stage with $\hat{\tau}_{rough}$ and the nAvg radio frames. As rough time offset estimate $\hat{\tau}_{rough}$ gives the general location (by time sample index) of a detected synchronization signal in the nAvg radio frames, extractor 318 may extract windows of samples from each of the nAvg radio frames that are based around $\hat{\tau}_{rough}$ as a window starting point.

For example, in some aspects extractor 318 may be configured to loop over a set of values of a delay parameter Δ, and extract a window of samples starting at $\hat{\tau}_{rough}$+Δ (the window starting point) for each value of Δ. Each extracted window may have the same length as the synchronization signal that cell searcher 300 is attempting to detect (e.g., an NPSS), and the resulting extracted windows may therefore each contain a potential synchronization signal. For example, NPSS sequences may be 189 time samples in length, and consequently extractor 318 may be configured to extract windows of 189 time samples in length starting at $\hat{\tau}_{rough}$+Δ for each value of Δ. This can be generalized to any type of synchronization signal, where extractor 318 may be configured to extract windows having length (in number of time samples) equal to the synchronization signal starting at $\hat{\tau}_{rough}$+Δ for each value of Δ (where the total number of resulting windows is given by the number of values of Δ).

Figure 4:
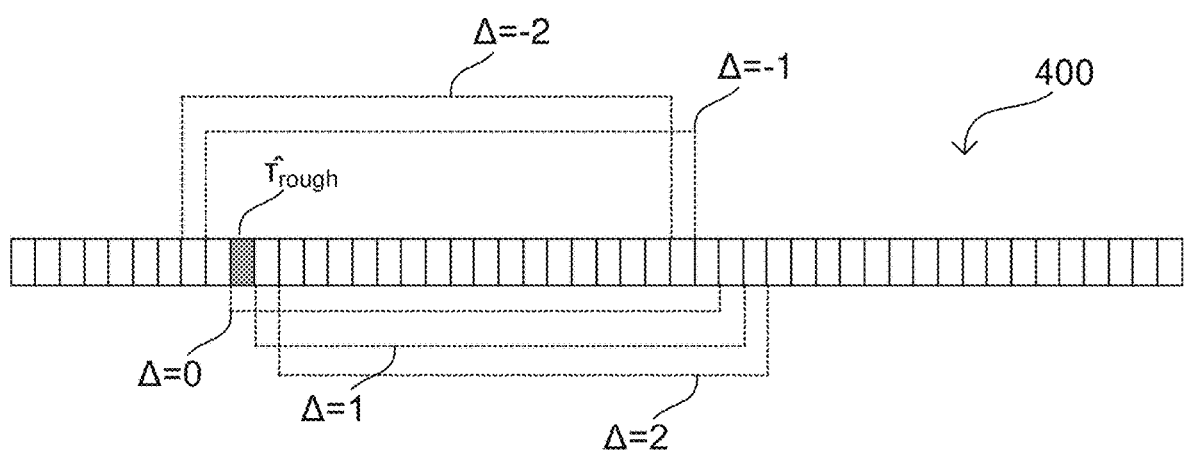
FIG. 4 shows an exemplary time diagram for selecting windows to perform cell search on according to some aspects.

In one example, extractor 318 may iterate Δ from −2 to 2. Accordingly, extractor 318 may produce five extracted windows of samples from each of the nAvg radio frames that respectively start from $\hat{\tau}_{rough}$+Δ, i.e., $\hat{\tau}_{rough}$−2, $\hat{\tau}_{rough}$−1, $\hat{\tau}_{rough}$, $\hat{\tau}_{rough}$+1, and $\hat{\tau}_{rough}$+2 (the windows starting points). Given a window length of nLength, extractor 318 may therefore extract windows of samples $rf_n$ ($\hat{\tau}_{rough}$+Δ: $\hat{\tau}_{rough}$+Δ+nLength−1) from each radio frame $rf_n$ of the nAvg radio frames. FIG. 4 shows an example of windows extracted from radio frame 400, where Δ is iterated from −2 to 2 and nLength is 20. This range of Δ is exemplary, and any other range of Δ can equivalently be used (where larger ranges of Δ yield a larger potential time offset estimation range).

Extractor 318 may loop over Δ and perform this window extraction for each radio frame. As shown in FIG. 3, extractor 318 may provide each extracted window to multipliers 322a and 322b (which may be the same as multiplier 308, i.e. through re-use, or may be different from multiplier 308). Multipliers 322a and 322b may also receive synchronization signal templates from template memories 320a and 320b, respectively. Template memories 320a and 320b may store the complex conjugate of the time-domain synchronization signal template (versus the complex conjugate of the frequency-domain synchronization signal template stored by template memory 306) of the synchronization signal that cell searcher 300 is attempting to detect (e.g., NPSS). The first synchronization signal template stored by template memory 320a, however, may be offset from the second synchronization signal template stored in template memory 320b. For example, the first synchronization signal template may be offset from the second synchronization template by a half-sample. In other examples, the first synchronization signal template may be offset from the second synchronization template by another sub-sample offset (i.e., less than a full sample). The use of this sub-sample offset may enable cell searcher 300 to determine the refined time offset estimate $\hat{\tau}_{fine}$ with a higher resolution.

As shown in FIG. 3, when extractor 318 provides a first extracted window (for the first value of Δ and the first radio frame rf1) to multipliers 322a and 322b, multipliers 322a and 322b may perform an element-by-element multiplication between the extracted window and the respective synchronization signal templates stored in template memories 320a and 320b. Multipliers 322a and 322b may then provide the resulting products to FFT engines 324a and 324b (which may the same as FFT engine 304, i.e., through re-use, or may be different from FFT engine 304), which may then calculate the FFT of the resulting products. As the synchronization signal template provided by template memory 320a is offset from the synchronization signal template provided by template memory 320b (e.g., by a half-sample), the resulting FFTs produced by FFT engines 324a and 324b will also be offset by the same amount.

After FFT engines 324a and 324b have calculated the FFTs for the first extracted window, FFT engines 324a and 324b may provide the FFTs to absolute value determiners 326a and 326b (which may be the same as absolute value determiner 312, i.e. through re-use, or may be different from absolute value determiner 312). Absolute value determiners 326a and 326b may then determine the magnitude of the FFTs to obtain respective FFT magnitudes, which absolute value determiners 326a and 326b may provide the accumulators 328a and 328b. Accumulators 328a and 328b may hold the FFT magnitudes from this first extracted window (from the first radio frame rf1) for accumulation with upcoming FFTs.

Similar to accumulator 314, accumulators 328a and 328b may accumulate over multiple radio frames (i.e., nAvg radio frames) during the second stage. Accordingly, extractor 318 may hold Δ to the same value used for the first extracted window (e.g., −2), and may then extract a second extracted window from the next radio frame (e.g., rf2) using the same Δ. The second extracted window may therefore be from a different radio frame from the first extracted window, but may use the same window starting point (i.e., the same Δ, which is used to offset from $\hat{\tau}_{rough}$ by a corresponding number of samples). Template memories 320a and 320b may then provide the same synchronization signal templates to multipliers 322a and 322b, which may perform an element-by-element multiplication between the synchronization signal templates and the second extracted window. Multipliers 322a and 322b may then provide the respective resulting products to FFT engines 324a and 324b, which may apply an FFT and provide the respective resulting FFTs to absolute value determiners 326a and 326b. Absolute value determiners 326a and 326b may determine the magnitude of the FFTs and provide the resulting FFT magnitudes to accumulators 328a and 328b, which may then accumulate these FFT magnitudes from the second radio frame rf2 with the FFTs from the first radio frame rf2.

Extractor 318, template memories 320a and 320b, multipliers 322a and 322b, and FFT engines 324a and 324b, absolute value determiners 326a and 326b, and accumulators 328a and 328b may continue this process for each of the nAvg radio frames, thus accumulating the FFTs over the nAvg radio frames. As extractor 318 holds Δ constant, each of the extracted windows (e.g., nAvg extracted windows for each value of Δ) may have the same window starting point within their respective radio frames (e.g., may be the same block of time samples but each from a different radio frame).

Once accumulators 328a and 328b have accumulated over the nAvg radio frames, accumulators 328a and 328b may provide the accumulated FFT magnitudes to matrix generator 330. Matrix generator 330 may then begin generating a matrix (e.g., a "Q-matrix") by placing the accumulated FFT magnitude from accumulator 328a in the first column of the matrix, and the accumulated FFT magnitude from accumulator 328b in the second column of the matrix.

Extractor 318 may then iterate Δ to the next value (e.g., from −2 to −1), and generate another extracted window from the first radio frame rf1. Template memories 320a and 320b, multipliers 322a and 322b, FFT engines 324a and 324b, and absolute value determiners 326a and 326b may then respectively process this extracted window (using the same synchronization signal templates provided by template memories 320a and 320b) to generate FFT magnitudes for accumulators 328a and 328b. Extractor 318 may then generate another extracted window from the second radio frame rf2 using the same Δ (e.g., −1), which template memories 320a and 320b, multipliers 322a and 322b, FFT engines 324a and 324b, and absolute value determiners 326a and 326b may again process to generate FFT magnitudes for accumulators 328a and 328b. Accumulators 328a and 328b may then accumulate these FFT magnitudes from the second radio frame rf2 with the FFT magnitudes from the first radio frame rf2 to obtain accumulated FFT magnitudes. Extractor 318, template memories 320a and 320b, multipliers 322a and 322b, FFT engines 324a and 324b, absolute value determiners 326a and 326b, and accumulators 328a and 328b may continue this process over each of the nAvg radio frames (using the same Δ, e.g., −1) to obtain accumulated FFT magnitudes at accumulators 328a and 328b. Accumulators 328a and 328b may provide these accumulated FFT magnitudes to matrix generator 330. As previously described, matrix generator 330 may have previously inserted the accumulated FFT magnitudes from the first Δ (e.g., −2) into the first and second columns of the matrix. Matrix generator 330 may therefore insert the new accumulated FFT magnitudes from the second Δ (e.g., −1) into the third and fourth columns of the matrix.

Extractor 318 may then iterate Δ again (e.g., from −1 to 0), and, for each of the nAvg radio frames, generate an extracted window. Template memories 320a and 320b, multipliers 322a and 322b, FFT engines 324a and 324b, absolute value determiners 326a and 326b, and accumulators 328a and 328b may again produce accumulated FFT magnitudes for this Δ, which matrix generator 330 may respectively insert into the fifth and sixth columns of the matrix. Extractor 318 may continue to iterate Δ in this manner over each of the remaining values of Δ, and template memories 320a and 320b, multipliers 322a and 322b, FFT engines 324a and 324b, absolute value determiners 326a and 326b, and accumulators 328a and 328b may continue to produce accumulated FFT magnitudes for each of these values of Δ. Matrix generator 330 may likewise continue to insert these accumulated FFT magnitudes into the next available columns of the matrix, where the accumulated FFT magnitude produced with the synchronization signal template from template memory 320a goes into an odd column and the accumulated FFT magnitude produced with the synchronization signal template from template memory 320b goes into an even column.

Detector 332 may then utilize the resulting matrix to determine a refined time offset estimate $\hat{\tau}_{fine}$ and a frequency offset estimate $\hat{f}$. As previously described, each column of the matrix may hold the accumulated absolute value of the Fourier transform of the element-by-element multiplication of a synchronization signal template with an extracted window. The FFTs calculated by FFT engines 324a and 324b (namely, the FFT of the time-domain element-by-element multiplication of an extracted window and a synchronization signal template) may be mathematically equivalent to the frequency-domain cross-correlation between the corresponding synchronization signal template and a frequency-shifted version of the extracted window.

This derives from the same relationship between FFTs and cross-correlation described earlier, where the element-by-element multiplication of two signals in the frequency domain is equal to the Fourier transform of the time-domain cross-correlation of the first signal and the complex conjugate of the second signal. Likewise, the element-by-element multiplication of two signals in the time domain is equal to the inverse Fourier transform of the frequency-domain cross-correlation of the first signal and the complex conjugate of the second signal.

Cell searcher 300 may therefore be able to use the frequency-domain cross-correlation calculated by FFT engines 324a and 324b to identify the carrier frequency offset between the received signal and the transmitted synchronization signal. The transmitted synchronization signal can be denoted as x(t) (corresponding to the synchronization signal templates) and the received signal as y(t) (corresponding to the radio frames). However, the received signal y(t) may have some frequency offset, which cell searcher 300 may attempt to estimate as frequency offset estimate $\hat{f}$. Cell searcher 300 may therefore evaluate a range of different potential frequency offsets to y(t), denoted as $y(t)e^{-j\omega t}$ (where ω gives the frequency offset). The cross-correlation computation is therefore given as $\int x(t)y(t)e^{-j\omega t}dt$, which is in turn equal to the Fourier transform of x(t)y(t).

Accordingly, as the synchronization signal templates stored by template memories 320a and 320b are the complex conjugate of the time-domain synchronization signal that cell searcher 300 is looking for, the FFTs calculated by FFT engines 324a and 324b give the frequency-domain cross-correlation between the target synchronization signal and the extracted window. The elements of the magnitude FFTs produced by absolute value determiners 326a and 326b therefore each correspond to an FFT bin, where the FFT bin with the highest magnitude identifies the most likely frequency offset.

The column-wise dimension of the matrix therefore corresponds to the frequency-domain cross-correlation between the target synchronization signal and the received signal. The elements of each column having the highest values therefore correspond to the strongest frequency offset candidates (e.g., where the FFT bin matched to each element gives the corresponding frequency offset).

Furthermore, as each column of the matrix is generated with a different Δ (i.e., a different window starting point in the radio frames, on in other words, a different timing offset from the rough time offset estimate $\hat{\tau}_{rough}$) or a different synchronization signal template (which are each offset by some amount, e.g., a half-sample), each column of the matrix corresponds to a different candidate timing offset. For example, if the synchronization signal templates in template memories 320a and 320b are offset by 0.5 samples, and Δ is iterated over [−2,2], the first column corresponds to a timing offset of −2 (relative to the rough time offset estimate $\hat{\tau}_{rough}$), the second column corresponds to a timing offset of −1.5, the third column corresponds to a timing offset of −1, the fourth column corresponds to a timing offset of −0.5, and so forth, with the tenth column corresponding to a timing offset of +2.5. Accordingly, the use of the sub-sample offset (e.g., of 0.5 samples) between the synchronization signal templates enables a higher resolution when estimating the timing offset. Various other examples may use other sub-sampling offsets. For example, a sub-sample offset of 0.25 samples could also be used, which would generate four columns per value of Δ. Smaller sub-sample offsets therefore produce a higher resolution for timing offset estimates, while larger values of Δ produce a higher range of timing offset estimates.

Each column of the matrix therefore considers a different candidate time offset estimate (e.g., a number of samples relative to rough time offset estimate $\hat{\tau}_{rough}$). As the elements of each column give the frequency-domain cross-correlation between the corresponding synchronization signal template and the received signal, each row of the matrix considers a different candidate frequency offset estimate (e.g., a frequency offset relative to 0).

Given this bi-directional distribution of the matrix over candidate time offset estimates (by column) and candidate frequency offset estimates (by row), detector 332 may utilize the matrix to determine the refined time offset estimate $\hat{\tau}_{fine}$ and the frequency offset estimate $\hat{f}$. For example, in some aspects detector 332 may perform a bi-directional search over the elements of the matrix to identify the element of the matrix with the highest value, where the column of the identified element gives the refined time offset estimate $\hat{\tau}_{fine}$ (given by the corresponding Δ and the offset of the corresponding synchronization signal template, which give the offset relative to the rough time offset estimate $\hat{\tau}_{rough}$) and the row of the identified element gives the frequency offset estimate $\hat{f}$ (given by the corresponding FFT bin).

In some aspects, detector 332 may simply utilize the column and row of the identified element to determine the corresponding time offset and frequency offset estimate candidates, and use these values for the refined time offset estimate $\hat{\tau}_{fine}$ and the frequency offset estimate $\hat{f}$. In other aspects, detector 332 may apply interpolation around the identified element to determine the refined time offset estimate $\hat{\tau}_{fine}$ and the frequency offset estimate $\hat{f}$. For example, detector 332 may be configured to identify the element with the highest value. Detector 332 may then use a multi-point interpolation around the identified element in the row direction to determine the refined time offset estimate $\hat{\tau}_{fine}$ and around the identified element in the column direction to determine the frequency offset estimate $\hat{f}$. For example, if using three-points, detector 332 may take the identified element and its right and left neighbors in the row direction and generate a three-point parabolic. Detector 332 may then determine the peak of the three-point parabolic, and use this peak as refined time offset estimate $\hat{\tau}_{fine}$. Likewise, detector 332 may take the identified element and its upper and lower neighbors in the column direction and generate another three-point parabolic. Detector 332 may then determine the peak of this three-point parabolic, and use this peak as the frequency offset estimate $\hat{f}$. Other types of interpolation, using different numbers of points, are also within the scope of this disclosure.

Accordingly, detector 332 may determine the refined time offset estimate $\hat{\tau}_{fine}$ and the frequency offset estimate $\hat{f}$ from the matrix, which indicate the carrier frequency offset and timing position of the detected synchronization signal within the received radio frames. This may complete the second stage of the synchronization signal detection by cell searcher 300. In some aspects, cell searcher 300 may report the refined time offset estimate $\hat{\tau}_{fine}$ and the frequency offset estimate $\hat{f}$ to the protocol stack of terminal device 102, which may then utilize the refined time offset estimate $\hat{\tau}_{fine}$ and the frequency offset estimate $\hat{f}$ to transmit and/or receive signals with the corresponding cell (that transmitted the detected synchronization signal). For example, terminal device 102 may utilize the refined time offset estimate $\hat{\tau}_{fine}$ and the frequency offset estimate $\hat{f}$ to receive further data from the cell (e.g., system information), to camp on the cell, to establish a connection with the cell, and/or to transmit and receive user data with the cell.

In some aspects, cell searcher 300 may utilize the synchronization signal detection procedure to detect synchronization signals from multiple cells, and to determine a refined time offset estimate $\hat{\tau}_{fine}$ and a frequency offset estimate $\hat{f}$ for each of the cells. For example, cell searcher 300 may determine multiple rough timing offset estimates $\hat{\tau}_{trough}$ in the first stage, such as where determiner 316 identifies multiple samples of the accumulated time-domain cross-correlation magnitude (produced by accumulator 314). For instance, determiner 316 may identify a predefined quantity of the samples of the accumulated time-domain cross-correlation magnitude having the highest values, or may identify each sample of the accumulated time-domain cross-correlation magnitude that have a value exceeding a predefined detection thresholds. Cell searcher 300 may then treat each of the rough timing offset estimates $\hat{\tau}_{trough}$ as a candidate synchronization signal (e.g., the potential time location of a synchronization signal). Cell searcher 300 may then execute the second stage on each of the rough timing offset estimates $\hat{\tau}_{rough}$ to determine a refined time offset estimate $\hat{\tau}_{fine}$ and a frequency offset estimate $\hat{f}$ for each of the candidate synchronization signals. Assuming that the corresponding synchronization signals were transmitted by different cells, cell searcher 300 may obtain time and frequency synchronization information for each of the cells (which may each be candidates that terminal device 102 can further communicate and/or interact with). For example, the physical layer of digital signal processor 208 may utilize the refined time offset estimate $\hat{\tau}_{fine}$ to determine a timing schedule with a particular cell, which the physical layer may then use to time transmission and reception (e.g., to position radio frames) with the cell. In another example, the physical layer of digital signal processor 208 may use the frequency offset estimate $\hat{f}$ to determine a carrier frequency, which the physical layer may provide to RF transceiver 204 to use when transmitting or receiving with the cell.

As previously indicated, in some aspects terminal device 102 may be an NB-IoT terminal device, and cell searcher 300 may perform the synchronization signal detection to attempt to find NPSSs (e.g., where template memories 306, 320a, and 320b hold NPSSs). In some cases, this synchronization signal detection may enable terminal device 102 to detect NPSSs even in very poor radio conditions, such as where SNR is very low (e.g., up to −12 to −15 dB). This can be an important feature for coverage extension in NB-IoT, which may see many use cases where the terminal devices are expected to operate in poor conditions. This synchronization signal detection is not limited to NB-IoT and NPSS, however, and can therefore be implemented to perform synchronization signal detection for any radio access technology.

Additionally, in some cases the two-stage synchronization signal detection described herein can alleviate memory requirements. For example, cell searcher 300 may only store 2400 values (10 radio frames at 240 kHz; e.g. stored in buffer 302) to determine the fine timing offset estimate $\hat{\tau}_{fine}$ and the frequency offset estimate $\hat{f}$. This memory storage size can be considerably less than other single-stage procedures, which may integrated over all carrier frequencies in a single stage and thus require, for example, a memory capacity of 2400 times the number of FFT bins.

Figure 5:
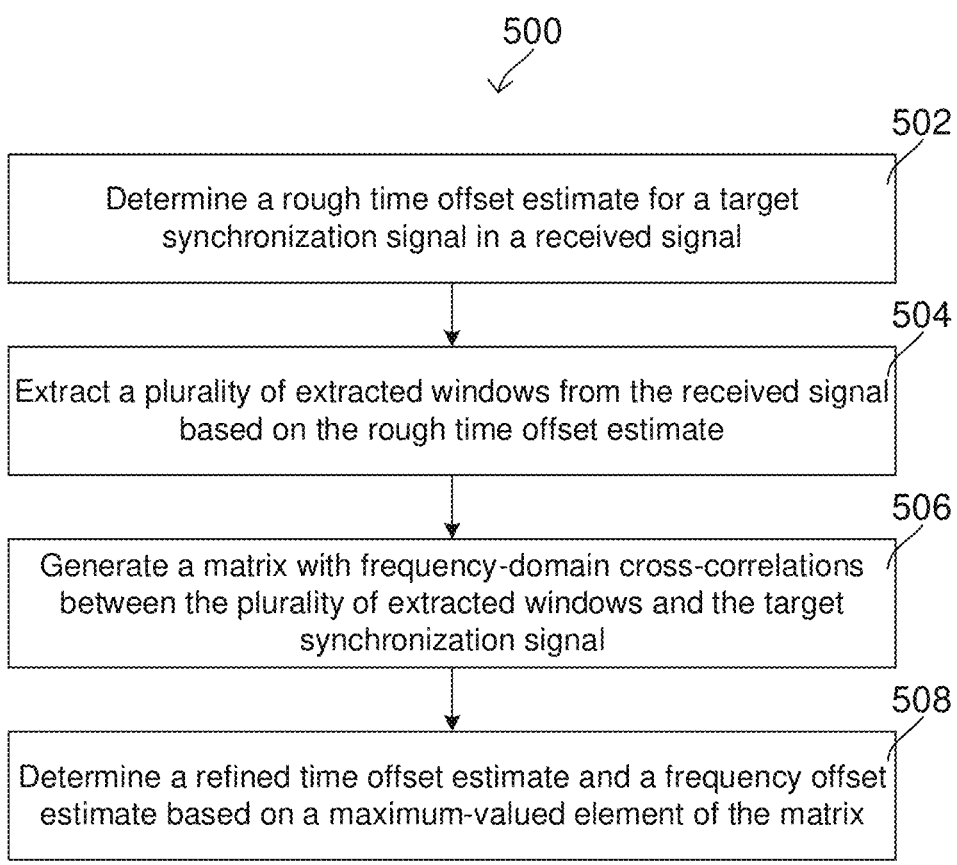
FIG. 5 shows an exemplary method of determining time offset and frequency offset estimates according to some aspects.

FIG. 5 shows method 500 of detecting signals. As shown in FIG. 5, method 500 includes determining a rough time offset estimate for a target synchronization signal in a received signal (502), extracting a plurality of extracted windows from the received signal based on the rough time offset estimate (504), generating a matrix with frequency-domain cross-correlations between the plurality of extracted windows and the target synchronization signal (506), and determining a refined time offset estimate and a frequency offset estimate based on a maximum-valued element of the matrix (508).

Various aspects of this disclosure provide a wireless communication device including a determiner (e.g., determiner 316) configured to determine a rough time offset estimate for a target synchronization signal in a received signal, an extractor (e.g., extractor 318) configured to extract a plurality of extracted windows from the received signal based on the rough time offset estimate, a matrix generator (e.g., matrix generator 330) configured to generate a matrix with frequency-domain cross-correlations between the plurality of extracted windows and the target synchronization signal, and a detector (e.g., detector 332) configured to determine a refined time offset estimate and a frequency offset estimate based on a maximum-valued element of the matrix. This wireless communication device can include various other internal components as described above for FIGS. 1-4. In some aspects, the wireless communication device may be configured as an integrated circuit component for a terminal device, while in other aspects the wireless communication device may include, for example, a radio transceiver and one or more antennas and may be configured as a terminal device.

In some aspects, terminal device 102 may additionally or alternatively be configured to perform channel raster offset detection with oscillator correction as described herein. While these aspects are described below in the exemplary context of NB-IoT, these same concepts can be readily implemented for various other (3GPP and non-3GPP) radio access technologies, in particular those that use channel raster offsets.

As described above, the 3GPP has introduced NB-IoT with intention to target use cases with low complexity, low power consumption, and extended coverage (e.g., SNRs from −12 to −15 dB). As reflected in its name, NB-IoT uses much narrower bandwidth than other 3GPP systems, specifying a minimum bandwidth of only 180 kHz (versus, for example, the scalable 1.4 to 20 MHz bandwidth of standard LTE). The 3GPP has proposed deploying NB-IoT channels around the existing 100 kHz raster used for LTE (where each candidate LTE center frequency (EARFCN) can appear on a grid of frequencies each spaced by 100 kHz, i.e., a 100 kHz raster).

Figure 6:
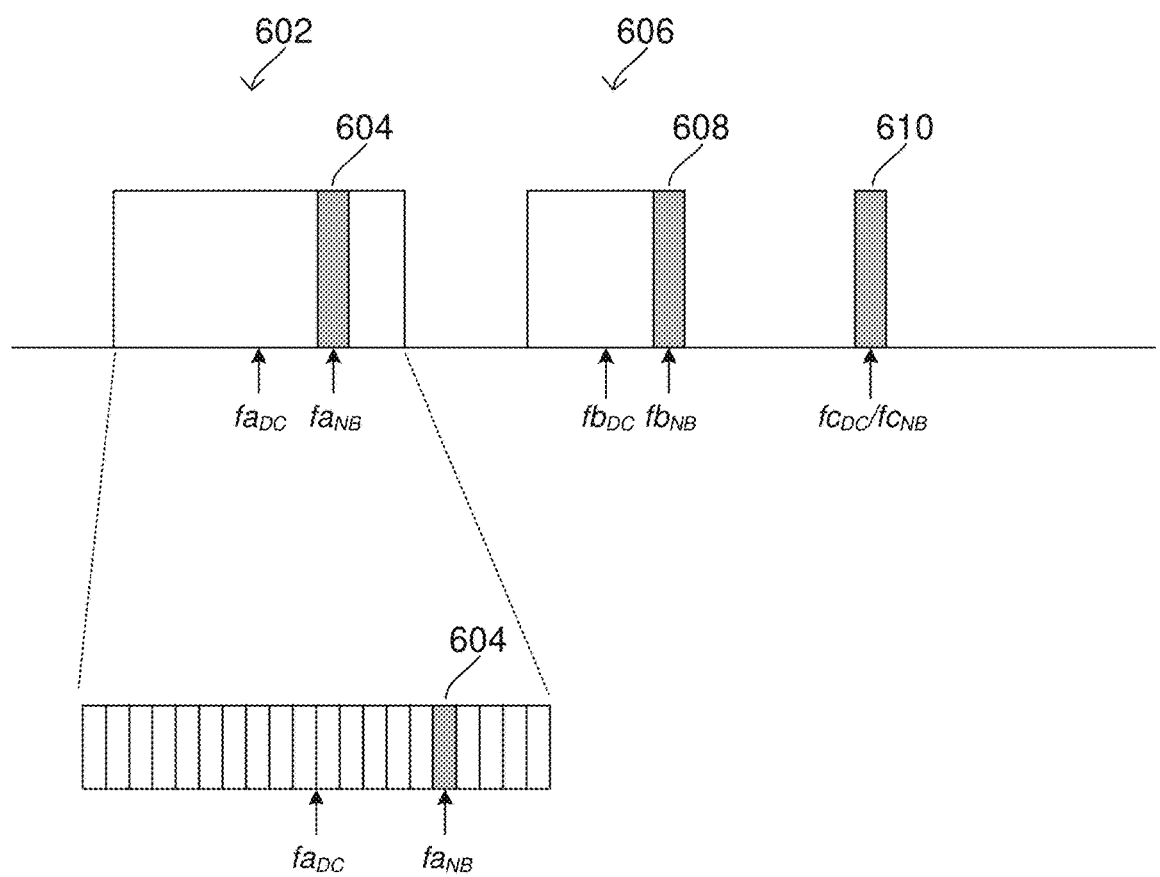
FIG. 6 shows an exemplary frequency plot of NB-IoT systems according to some aspects.

FIG. 6 shows various exemplary deployments for NB-IoT as specified by the 3GPP. As shown in FIG. 6, in some cases an NB-IoT system can be deployed with an inband configuration, such as for NB-IoT system 604 deployed within the system bandwidth of wideband system 602 (which may be, for example, an LTE system). As shown in the expanded diagram of FIG. 6, NB-IoT system 604 may be deployed within the bandwidth of wideband system 602 (for example, in the bandwidth of a single 180 kHz LTE resource block of wideband system 602). Accordingly, wideband system 602 may utilize the surrounding bandwidth for wideband communications, while NB-IoT system 604 (e.g., the NB-IoT cell(s) and NB-IoT terminal device(s)) may use the narrow-band bandwidth for NB-IoT. Wideband system 602 may be placed on a channel raster (e.g., a 100 kHz channel raster), where the center frequency/ape is centered at one of the raster points. NB-IoT system 604 may be centered at center frequency $fa_{NB}$, which is offset from the channel raster by a channel raster offset.

FIG. 6 also shows a guardband deployment for NB-IoT, namely NB-IoT system 608 deployed in the guardband of wideband system 606. Accordingly, instead of being surrounded by the bandwidth of wideband system 606, NB-IoT system 608 may be placed at the edge of wideband system 606 (e.g., directly next to wideband system 606, or with a small separation with wideband system 606). As shown in FIG. 6, wideband system 606 may be centered at center frequency $fb_{DC}$, which may be positioned on the same channel raster as center frequency $fa_{DC}$ of wideband system 602. NB-IoT system 608 may be centered at center frequency $fb_{NB}$, which is offset from the channel raster by a channel raster offset.

Lastly, FIG. 6 shows a standalone deployment for NB-IoT, where NB-IoT system 610 may be deployed without any surrounding or neighboring wideband system. NB-IoT system may be centered at center frequency $fc_{NB}$. In the example shown in FIG. 6, center frequency $fc_{NB}$ may be placed on the channel raster (e.g., at a channel raster center frequency $fc_{DC}$); however, in other examples, center frequency $fc_{NB}$ may be offset from the channel raster by a channel raster offset.

The NB-IoT systems in the various deployment configurations may therefore either be on the channel raster, or offset from the channel raster by some channel raster offset. In the exemplary case of LTE, the 3GPP specified that the NB-IoT center frequency can be either on the raster (channel raster offset of 0 kHz) or offset by any of −2.5 kHz, +2.5 kHz, −5 kHz, +5 kHz, −7.5 kHz, or +7.5 kHz. The specific channel offset raster for a given NB-IoT system may be broadcast by the NB-IoT cell as a channel offset raster parameter in the NB-IoT Master Information Block (MIB-NB) (namely, as the parameter ChannelRasterOffset-NB).

As recognized by this disclosure, this broadcast of the channel raster offset parameter in the MIB-NB can be problematic. In particular, a NB-IoT UE may need to be tuned to the NB-IoT center frequency (which is either on or off the raster per the channel offset) to decode the MIB-NB; however, the channel raster offset parameter that identifies the NB-IoT center frequency is in fact broadcast in the MIB-NB. NB-IoT UEs may therefore be expected to determine the channel offset raster parameter prior to receiving and decoding the MIB-NB.

In recognition of this, various aspects of this disclosure provide methods and devices for channel raster offset detection with oscillator correction. This channel raster offset detection with oscillator correction may not only determine the channel raster offset, but may also correct for oscillator error. While not limited to such, the channel raster offset detection with oscillator correction may therefore be particularly useful for NB-IoT UEs that have unreliable oscillators. The channel raster offset detection with oscillator correction may, however, be applied in various other use cases, such as any use case to determine an offset between a synchronization signal and channel raster and/or to perform oscillator correction.

Figure 7:
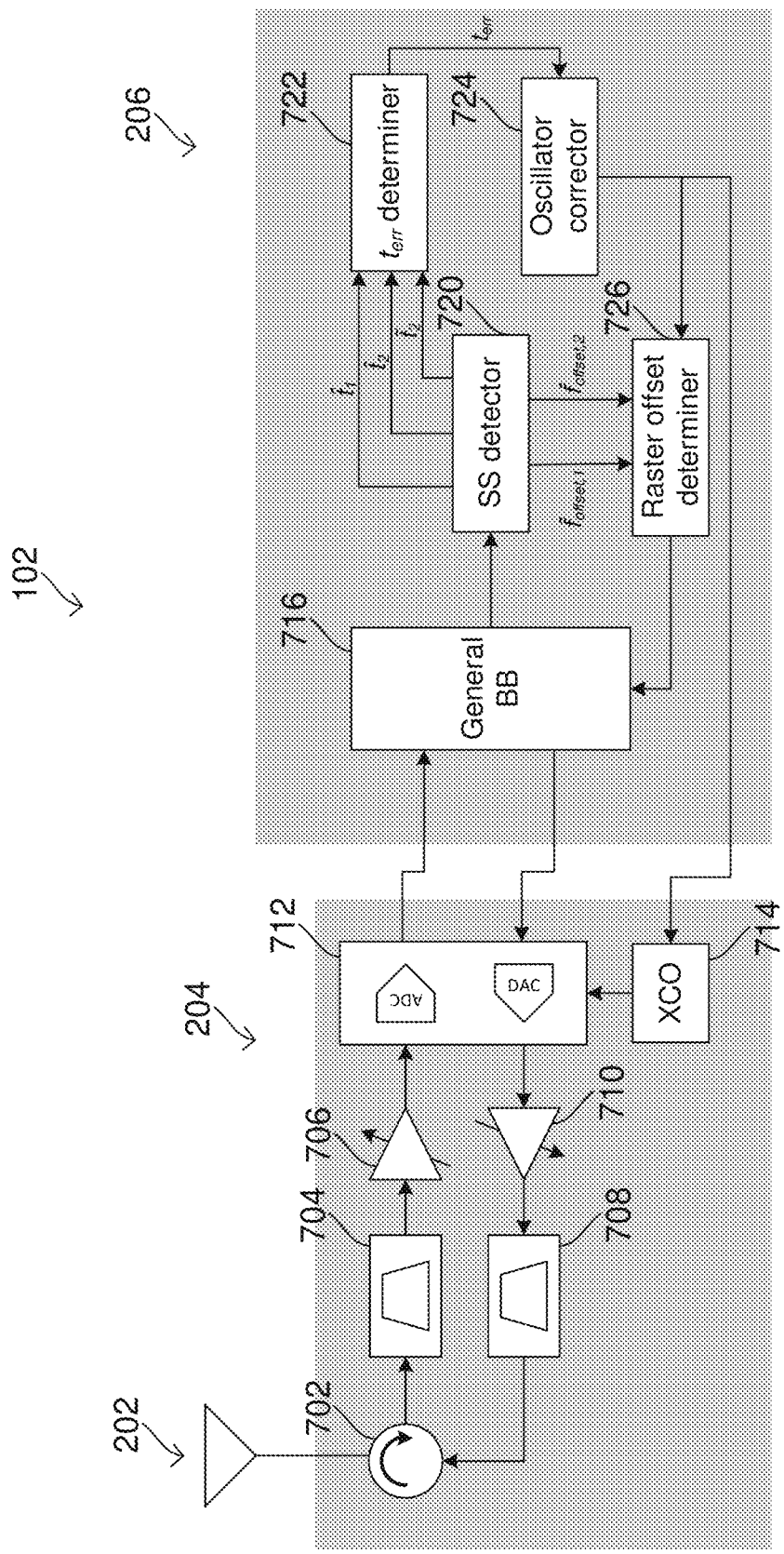
FIG. 7 shows an exemplary internal configuration of a terminal device for performing channel raster offset detection with oscillator correction according to some aspects.

FIG. 7 shows an exemplary diagram illustrating an internal configuration of terminal device 102 for performing channel raster offset detection with oscillator correction. As previously shown in FIG. 2, terminal device 102 may include antenna system 202, RF transceiver 204, and baseband modem 206. As shown in FIG. 7, terminal device 102 may wirelessly transmit and receive signals with antenna system 202. Antenna system 202 may be connected to duplexer 702, which, in the receive direction, may provide incoming received signals to bandpass filter 704. Bandpass filter 704 may filter the incoming received signals to isolate the frequencies in a receive band of interest, and may provide the filtered signal to low-noise amplifier (LNA) 706. LNA 706 may amplify the filtered signal and provide the amplified signal to IQ modulator 712. IQ modulator 712 may then perform IQ demodulation on the amplified signal to obtain a baseband signal (e.g., IQ samples), namely performing analog-to-digital conversion (ADC) on the amplified signal and down-mixing the resulting digital signal (which is originally at radio frequencies) using in-phase and quadrature carriers provided by oscillator 714 to respectively produce the I and Q samples that form the baseband signal. IQ modulator 712 may then provide the baseband signal to baseband modem 206.

In the transmit direction, IQ modulator 712 may receive an outgoing baseband signal (IQ samples) from baseband modem 206. IQ modulator 712 may then perform IQ modulation on the baseband signal, namely by up-mixing the baseband signal using the in-phase and quadrature carriers from oscillator 714 and performing digital-to-analog conversion (DAC) to produce a radio signal. IQ modulator 712 may provide the resulting radio signal to power amplifier (PA) 710, which may amplify the radio signal and provide the amplified signal to bandpass filter 708. Bandpass filter 708 may isolate the frequencies in a transmit band of interest, and provide the filtered signal to duplexer 702. Duplexer 702 may then provide the filtered signal to antenna system 202 for wireless transmission.

Accordingly, baseband modem 206 may receive a baseband signal from RF transceiver 204 in the receive direction. Baseband modem 206 may then receive and process the baseband signal to perform various baseband processing functions. As shown in FIG. 7, baseband modem 206 may include general baseband components 716, synchronization signal detector 720, time difference determiner 722, oscillator corrector 724, and raster offset determiner 726. This configuration of baseband modem 206 shown in FIG. 7 is primarily focused on its components configured to perform channel raster offset detection with oscillator correction (synchronization signal detector 720, time difference determiner 722, oscillator corrector 724, and raster offset determiner 726). For purposes of brevity, the remaining baseband functionality of baseband modem 206 is represented by general baseband components 716, which can include components of digital signal processor 208 and/or controller 210. In some aspects, synchronization signal detector 720, time difference determiner 722, oscillator corrector 724, and raster offset determiner 726 may be included as components of digital signal processor 208 (e.g., may be PHY components). In various aspects, synchronization signal detector 720, time difference determiner 722, oscillator corrector 724, and raster offset determiner 726 may be implemented as an integrated circuitry component, and may include a mixture of software and hardware components. For example, one or more of elements synchronization signal detector 720, time difference determiner 722, oscillator corrector 724, and raster offset determiner 726 (as further described below) can be realized as a dedicated hardware circuit that defines the respective functionality of the element with digital logic. In another example, one or more of synchronization signal detector 720, time difference determiner 722, oscillator corrector 724, and raster offset determiner 726 can be realized as a processor configured to retrieve and execute program code from a local memory, where the program code defines the respective functionality of the element with executable instructions. In some aspects, synchronization signal detector 720, time difference determiner 722, oscillator corrector 724, and raster offset determiner 726 may be mounted together on one or more chips.

In some cases, terminal device 102 may perform channel raster offset detection with oscillator correction procedure when terminal device 102 is searching for cells. For example, the protocol stack (e.g., executed as software by controller 210) may identify a frequency band for terminal device 102 to search for cells on. As the protocol stack may not have prior knowledge of the cells, the protocol stack may not know the channel raster offset of the cells. For instance, when terminal device 102 is performing a cell search on a given frequency band for NB-IoT cells, there may be a predefined set of center frequencies (e.g., EARFCNs) in the frequency band. While terminal device 102 may be able to cycle through the predefined set of center frequencies (e.g., sequentially tuning to each center frequency and processing the resulting signals to try to detect NPSSs), some of the NB-IoT cells may have a channel raster offset and therefore may not be centered exactly at one of the center frequencies. As terminal device 102 has also not read any NB-MIBs from the NB-IoT cells, terminal device 102 may not know the channel raster offsets. This example may similarly hold for other radio access technologies, such as those involving a narrowband system placed with a channel raster offset relative to a predefined channel raster.

Terminal device 102 may therefore perform the channel raster offset detection with oscillator correction procedure to detect cells on the frequency band and to determine their channel raster offsets. Furthermore, in some cases terminal device 102 may have an unreliable oscillator. For example, many IoT devices may have simple and/or inexpensive designs, and therefore may not be outfitted with a high-accuracy oscillator. Accordingly, as oscillator 714 of terminal device 102 may not be accurate in some cases, the radio modulation and demodulation by IQ modulator 712 may be imperfect. When terminal device 102 attempts to tune to a particular center frequency to perform a cell search, RF transceiver 204 may not actually tune to the proper frequency and may not have an accurate time reference (which is derived from an oscillator). Unreliable oscillators can therefore be detrimental to the accuracy of time and frequency offsets, which in turn negatively impacts later transmission and reception with the corresponding cells. While the channel raster offset detection with oscillator correction procedure may be beneficial for terminal devices having unreliable oscillators, its application is not so limited and the channel raster offset detection with oscillator correction procedure may be applied in any case regardless of oscillator reliability.

Figure 8:
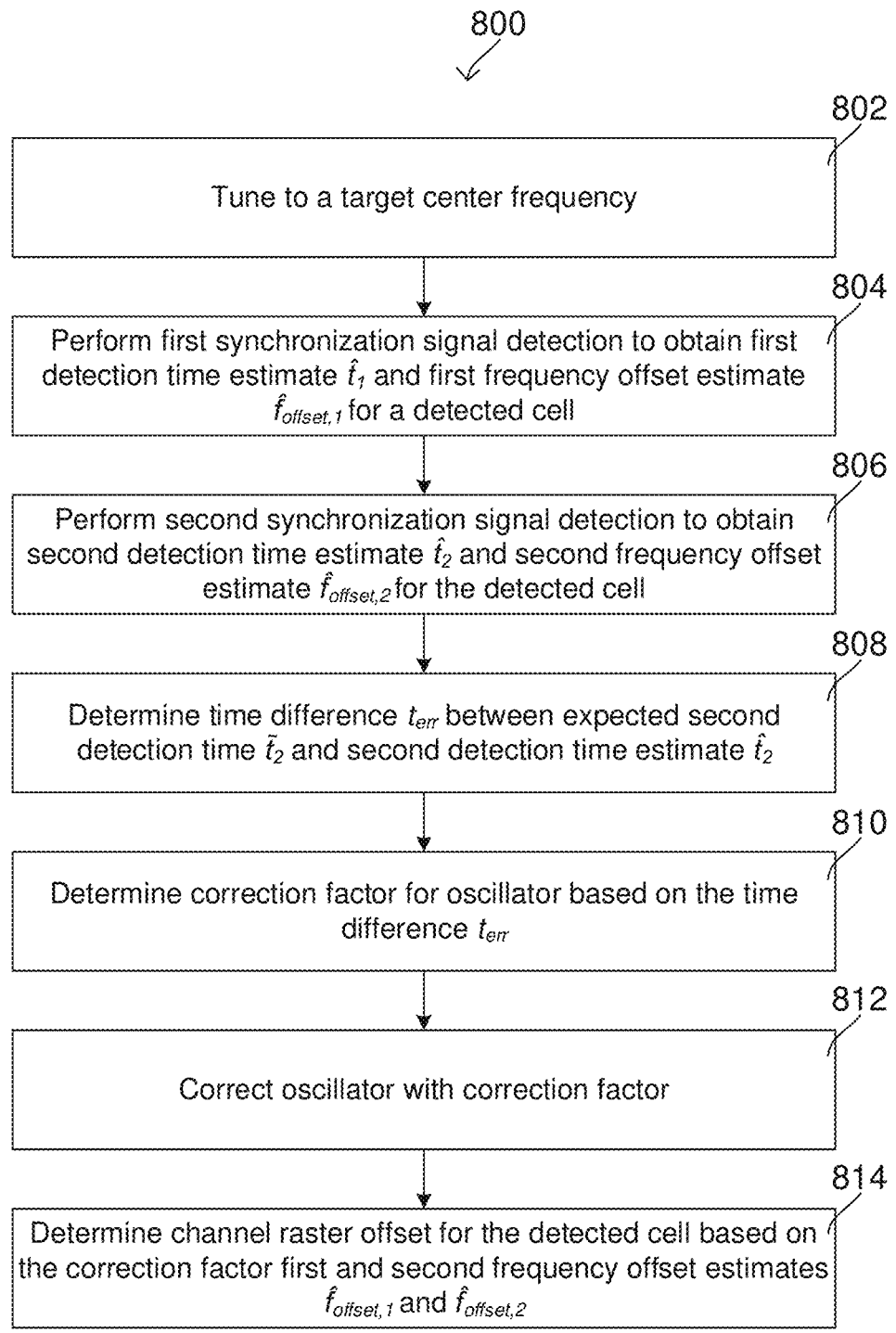
FIG. 8 shows an exemplary method of channel raster offset detection with oscillator correction according to some aspects.

Terminal device 102 may therefore use the channel raster offset detection with oscillator correction procedure to both determine channel raster offsets of cells and to correct for errors in oscillator 714. FIG. 8 shows an exemplary method 800 describing the channel raster offset detection with oscillator correction procedure according to some aspects. As shown in FIG. 8, terminal device 102 may first tune to a target downmixing frequency in stage 802. For example, controller 210 may instruct RF transceiver 204 to tune to and receive signals at the target center frequency (e.g., set the target downmixing frequency equal to the target downmixing frequency). In some cases, the target center frequency can be one center frequency (e.g., an EARFCN) of a predefined set of center frequencies in a particular communication band.

RF transceiver 204 may then provide a baseband signal to baseband modem 206, which synchronization signal detector 720 may receive (following optional processing by general baseband components 716, where applicable). Synchronization signal detector 720 may then perform a first synchronization signal detection to obtain first detection time estimate $\hat{t}_1$ and first frequency offset estimate $\hat{f}_{offset,1}$ for a detected cell (e.g., a cell whose transmitted synchronization signal is detected in the baseband signal). In some aspects, synchronization signal detector 720 may perform a similar synchronization signal detection process to that of cell searcher 300. For example, synchronization signal detector 720 may be configured in the same manner as cell searcher 300, or may include similar components, and may process the baseband signal using the synchronization signal detection described above regarding FIG. 3 to obtain the first detection time estimate $\hat{t}_1$ (e.g., the refined time offset estimate $\hat{\tau}_{fine}$) and first frequency offset estimate $\hat{f}_{offset,1}$ (e.g., the frequency offset estimate $\hat{f}$). In other aspects, synchronization signal detector 720 may utilize cross-correlation-and/or autocorrelation-based detection with the baseband signal and synchronization signal templates to determine the first detection time estimate $\hat{t}_1$ and first frequency offset estimate $\hat{f}_{offset,1}$.

Synchronization signal detector 720 may perform this first synchronization signal detection under the assumption that the oscillation frequency of oscillator 714 is correct. As further described, terminal device 102 may then "go back" to correct the oscillation frequency based on further processing. In particular, as cells may broadcast synchronization signals according to a fixed periodic schedule, the detected cell can be expected to transmit another synchronization signal according to the fixed period (e.g., repeatedly where each repeated transmission is separated from the previous by the fixed period). Accordingly, synchronization signal detector 720 may then perform a second synchronization signal detection in stage 804 to obtain a second detection time estimate $\hat{t}_2$ and a second frequency offset estimate $\hat{f}_{offset,2}$ for the detected cell. In some aspects, synchronization signal detector 720 may specifically target the detected cell. As previously indicated, the detected cell may be configured to transmit synchronization signal according to a fixed period (for example, a fixed 10 ms period for NPSS). Accordingly, synchronization signal detector 720 may be configured to determine an expected second detection time $\tilde{t}_2$ based on the first detection time estimate $\hat{t}_1$ and the fixed period, such as by adding the fixed period (or some multiple of the fixed period) to the first detection time estimate $\hat{t}_1$ to obtain the expected second detection time $\tilde{t}_2$. Synchronization signal detector 720 may then focus its synchronization signal around the expected second detection time $\tilde{t}_2$, such as by performing synchronization signal detection on the samples around the expected second detection time $\tilde{t}_2$ (e.g., before and after, such as by performing a cross-correlation between the target synchronization signal (e.g., NPSS) and the baseband signal starting at several samples prior to the expected second detection time $\tilde{t}_2$). Stated generally, synchronization signal detector 720 may be configured to determine the expected second detection time $\tilde{t}_2$ based on the schedule of the target synchronization signal, where in some cases the schedule can be a fixed periodic schedule.

Following stage 806, synchronization signal detector 720 may have determined first and second frequency offset estimates $\hat{f}_{offset,1}$ and $\hat{f}_{offset,2}$, first and second detection time estimates $\hat{t}_1$ and $\hat{t}_2$, and an expected second detection time $\tilde{t}_2$. The first and second frequency offset estimates $\hat{f}_{offset,1}$ and $\hat{f}_{offset,2}$ may indicate the estimated difference (offset) in frequency between the downmixing frequency used by RF transceiver 204 to tune to the center frequency while the first and second detection time estimates $\hat{t}_1$ and $\hat{t}_2$ may indicate the estimated time of arrival of the synchronization signal at terminal device 102. The expected second detection time $\tilde{t}_2$ may indicate the expected time of arrival of the synchronization signal for the second synchronization signal detection.

Synchronization signal detector 720 may then provide the first and second frequency offset estimates $\hat{f}_{offset,1}$ and $\hat{f}_{offset,2}$ to raster offset determiner 726, and may provide the first and second detection time estimates $\hat{t}_1$ and $\hat{t}_2$ as well as the expected second detection time $\tilde{t}_2$ to time difference determiner 722. Time difference determiner 722 may then determine the time difference $t_{err}$ between the expected second detection time $\tilde{t}_2$ and the second detection time estimate $\hat{t}_2$ in stage 808. This time difference $t_{err}$ is (at least partially) due to the error of oscillator 714. More specifically, terminal device 102 may use oscillator 714 to both generate carrier frequencies as well as to track time. Accordingly, when synchronization signal detector 720 calculates the expected second detection time $\tilde{t}_2$, for example by adding the synchronization signal period to the first detection time offset estimate $\hat{t}_1$, the error in oscillator 714 will cause the expected second detection time $\tilde{t}_2$ to be incorrect (as time-keeping based on oscillator 714 will be inaccurate due to its internal error).

Figure 9:
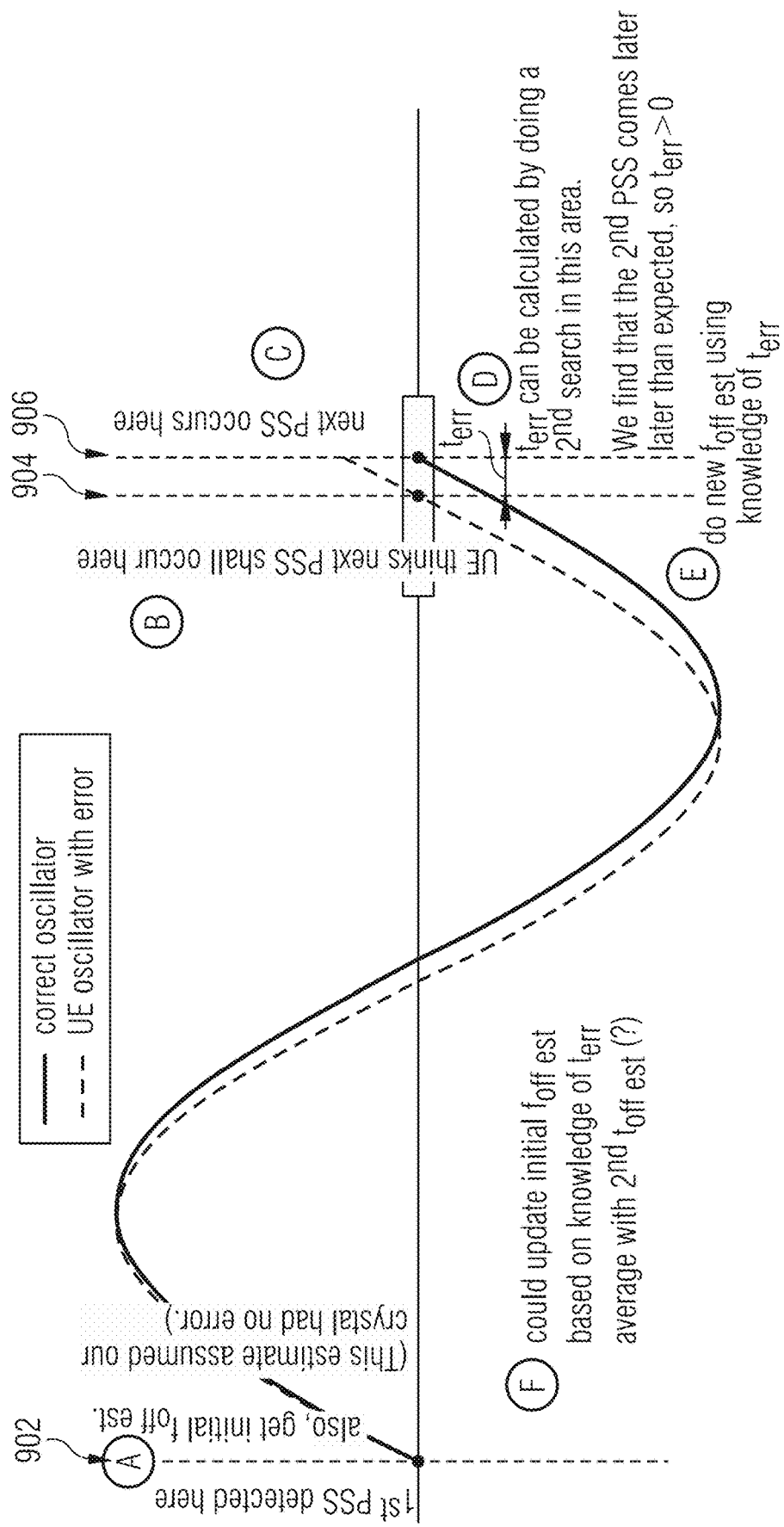
FIG. 9 shows an exemplary diagram illustrating oscillator error and the resulting time difference according to some aspects.

FIG. 9 shows an exemplary diagram illustrating this oscillator error and the resulting time difference $t_{err}$ according to some aspects. As shown in FIG. 9, synchronization signal detector 720 may detect synchronization signal at point 902, and determine the first detection time estimate $\hat{t}_x$ to be at point 902. Using the synchronization signal period, synchronization signal detector 720 may then determine the expected second detection time $\tilde{t}_2$ as point 904. However, error in oscillator 714 may cause this calculation to be off, as the inaccuracy of oscillator 714 will cause timekeeping (for example, as involved in adding the synchronization signal period to the first detection time estimate $\hat{t}_1$) to be off. Accordingly, the synchronization signal may actually arrive at point 906, thus meaning that the second detection time estimate $\hat{t}_2$ occurs after the expected second detection time $\tilde{t}_2$ (in other cases, this could reversed). This means that oscillator 714 is running fast (or running slow in the converse case). Accordingly, time difference determiner 722 may determine the difference between the second detection time estimate $\hat{t}_2$ and the expected second detection time $\tilde{t}_2$ as the time difference $t_{err}$ (where $t_{err}>0$ in this case).

Returning to FIGS. 7 and 8, following stage 808 time difference determiner 722 may provide the time difference $t_{err}$ to oscillator corrector 724. Oscillator corrector 724 may then determine a correction factor for oscillator 714 in stage 810 based on the time difference $t_{err}$. For example, the time difference $t_{err}$ may indicate how fast or slow the oscillation frequency of oscillator 714 is running, such as the number of clock ticks (of the oscillation frequency) that the expected second detection time $\tilde{t}_2$ was off by. Using this number of clock ticks, oscillator corrector 724 can determine, for example, a parts per million (ppm) correction factor by which the oscillation frequency of oscillator 714 should be corrected. As shown in FIG. 7, oscillator corrector 724 may provide this correction factor to oscillator 714, which may correct its oscillation frequency in stage 812 with the correction factor (e.g., by increasing or decreasing its oscillation frequency by the correction factor). Accordingly, oscillator 714 may be re-set to use an accurate oscillation frequency (although it may again drift due to the unreliability of oscillator 714). This can improve communication performance by enabling generation of accurate carrier frequencies and keeping of precise time (for example, in later transmission and/or reception with the detected cell or other cells).

Raster offset determiner 726 may also receive the correction factor in addition to the first and second frequency offset estimates $\hat{f}_{offset,1}$ and $\hat{f}_{offset,2}$, and may then determine the channel raster offset for the detected cell in stage 814. As previously described regarding FIG. 6, various communication standards such as NB-IoT may deploy wireless systems with a channel raster offset from a fixed channel raster. In the exemplary case of NB-IoT, NB-IoT cells may be deployed with a channel raster offset of 0 kHz (on the raster), 2.5 kHz, +2.5 kHz, −5 kHz, +5 kHz, −7.5 kHz, or +7.5 kHz.

As previously indicated, the first and second frequency offset estimates $\hat{f}_{offset,1}$ and $\hat{f}_{offset,2}$ are estimates of the frequency difference between the downmixing frequency used by RF transceiver 204 and the center frequency of the detected cell. If the downmixing frequency used by RF transceiver 204 is perfectly accurate, raster offset determiner 726 could determine the channel raster offset by averaging the first and second frequency offset estimates $\hat{f}_{offset,1}$ and $\hat{f}_{offset,2}$. As the resulting averaged frequency offset estimate would give the difference between the perfect downmixing frequency and the center frequency of the detected cell, the averaged frequency offset estimate would also give the channel raster offset.

However, since the downmixing frequency used by RF transceiver 204 may be inaccurate (e.g., may not actually be equal to the desired target downmixing frequency, and thus may not be equal to the target center frequency RF transceiver 204 is attempting to tune to) due to its reliance on oscillator 714, raster offset determiner 726 may also consider the correction factor when determining the channel raster offset. In particular, by knowing the correction factor, raster offset determiner 726 can determine what the actual downmixing frequency used by RF transceiver 204 was (e.g., adjusting the desired target downmixing frequency according to the correction factor gives the actual downmixing frequency). As raster offset determiner 726 now knows the actual downmixing frequency, raster offset determiner 726 may add the frequency offset estimate of the detected cell (e.g., an average of the $\hat{f}_{offset,1}$ and $\hat{f}_{offset,2}$, or a corrected version of $\hat{f}_{offset,1}$ and $\hat{f}_{offset,2}$ obtained by applying the correction factor) to the actual downmixing frequency to determine the center frequency of the detected cell (e.g., as in $fa_{NB}$, $fb_{NB}$, and $fc_{NB}$). Raster offset determiner 726 may then determine the difference between the center frequency of the detected cell and the desired target downmixing frequency, which gives the channel raster offset. In some aspects, raster offset determiner 726 may average the first and second frequency offset estimates $\hat{f}_{offset,1}$ and $\hat{f}_{offset,2}$ to obtain the frequency offset estimate for the detected cell. In other aspects, raster offset determiner 726 may correct the first and second frequency offset estimates using the correction factor (as the oscillator error may impact frequency offset estimation error), and then average the corrected estimates. As shown later in the numerical example, this may not be necessary due to the relatively small error caused to the frequency offset estimates by oscillator error.

Accordingly, following stages 810 and 814 terminal device 102 may obtain a correction factor for correcting the oscillation frequency of oscillator 714 and a channel raster offset for identifying the center frequency of the detected cell. As described above, terminal device 102 may use a channel raster offset detection with oscillator correction procedure that obtains both of these parameters in a single procedure. These techniques can be applied to any radio access technology, including NB-IoT based on detecting NPSSs, and can particularly be useful for radio access technologies where a wireless system (e.g., a narrowband system) is deployed with a channel raster offset from a predefined channel raster. This can also be useful for terminal devices having unreliable oscillators.

In some aspects, terminal device 102 may perform method 800 multiple times, such as to determine a channel raster offset for multiple cells (e.g., while tuned to the same or different center frequencies as the initial detected cell). In some cases, terminal device 102 may perform oscillator correction each time, while in other aspects terminal device 102 may not perform oscillator correction each time (for example, may perform oscillator correction every other time, or once every predefined sequence of times).

A numerical example of the channel raster offset detection with oscillator correction procedure will now be explained. Assuming that the desired oscillator frequency (the base frequency used as a clock, and from which carrier frequencies and times are derived) of oscillator 714 is 30,720,000 Hz, and the time between the first and second synchronization signal detections is 4 seconds. The expected number of clock ticks between the first and second synchronization signal detections (giving the expected second detection time $t_2$) is 122,880,000 (i.e., four times the desired oscillator frequency). However, synchronization signal detector 720 may determine the second detection time estimate $\hat{t}_2$ as occurring 122,880,370 clock ticks. This is 370 more clock tickets than expected with an accurate clock. Time difference determiner 722 may therefore calculate the time difference $t_{err}$ as 370 clock ticks too many (although $t_{err}$ may be calculated and operated on in units of clock ticks or seconds).

Accordingly, oscillator 714 is running fast. Using this time difference $t_{err}$, oscillator corrector 724 may calculate the correction factor as 370/122880000*1e6=3.011 (expressed in ppm, although other units can equivalently be used). This means that oscillator 714 can be corrected by reducing its oscillation frequency by 3.0111 ppm. Oscillator correction 724 may therefore provide this correction factor to oscillator 714, which may correct its oscillation frequency accordingly.

Raster offset determiner 726 may then determine the channel raster offset for the detected cell based on the first and second frequency offset estimates $\hat{f}_{offset,1}$ and $\hat{f}_{offset,2}$. In this example, the desired target downmixing frequency (that RF transceiver 204 was attempting to tune to) is 1,200,000,000 Hz, which is a raster point on the 100 kHz raster (e.g., an integer multiple of 100 kHz). However, based on the newly acquired knowledge of oscillator error and the corresponding 3.0111 ppm correction factor, raster offset determiner 726 can determine that the actual downmixing frequency used by RF transceiver 204 was 1,200,003,613 Hz. the 100 kHz raster has therefore not been moved to DC by the mixdown, but actually to −3,613 Hz.

Assuming that the average of the first and second frequency offset estimates $\hat{f}_{offset,1}$ and $\hat{f}_{offset,2}$ was 4000 Hz, which is the estimate of the center frequency of the downconverted synchronization signal with respect to the baseband. Based on the knowledge of the oscillator error, a more accurate frequency offset estimate would be 4,000.012 Hz. However, this difference is relatively insignificant with respect to the existing estimation error. Accordingly, in some aspects, raster offset determiner 726 may simply use the average of the first and second frequency offset estimates $\hat{f}_{offset,1}$ and $\hat{f}_{offset,2}$ (or, alternatively, pick one of the first and second frequency offset estimates $\hat{f}_{offset,1}$ and $\hat{f}_{offset,2}$ to use), while in other aspects raster offset determiner 726 may perform the correction.

To summarize, the actual downmixing frequency in the example is 1,200,003,613 Hz, while the frequency offset estimate was 4000 Hz. Raster offset determiner 726 can therefore conclude that the actual center frequency of the NPSS transmission (and likewise of the NB-IoT cell) was at 1,200,003,613+4000=1,200,007,613 Hz, and consequently that the channel raster offset is +7.5 kHz. In various aspects, raster offset determiner 726 may be configured to find the closest predefined channel raster offset to the estimated channel raster offset (7.613 kHz in this example), and take this closest predefined channel raster offset as the channel raster offset of the detected cell.

Figure 10:
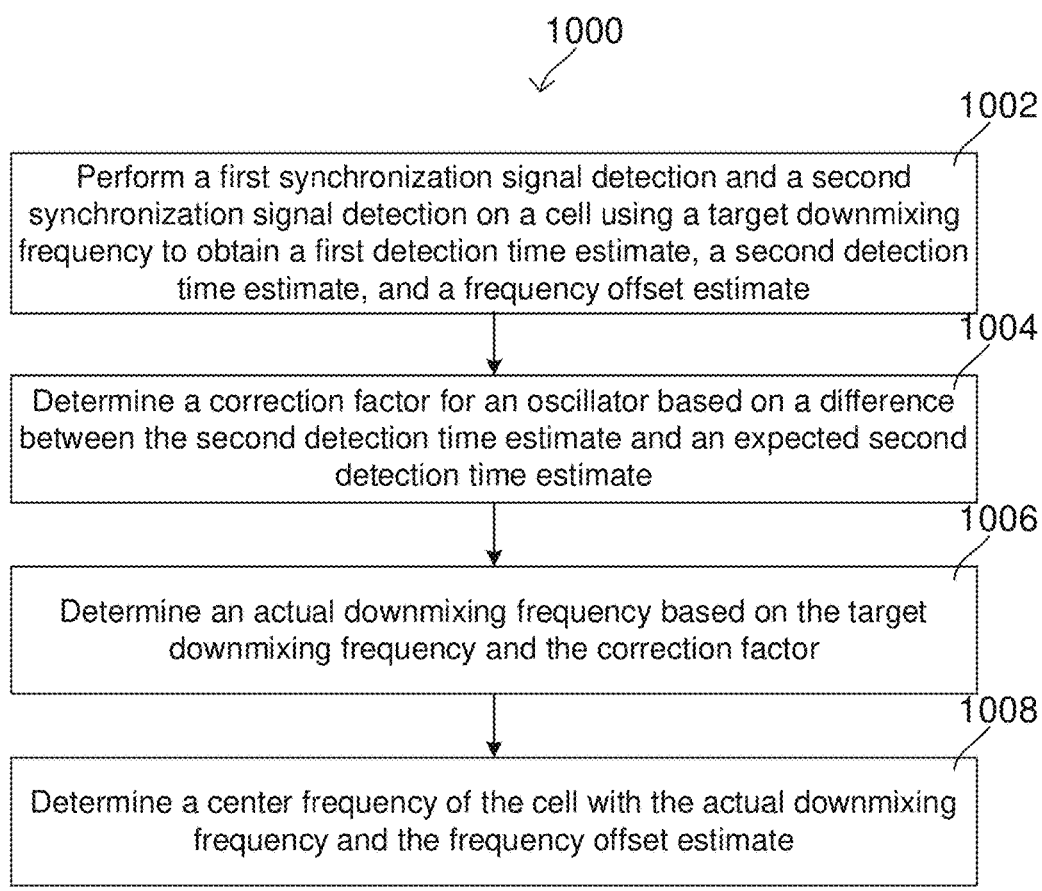
FIG. 10 shows an exemplary method of performing wireless communications according to some aspects.

FIG. 10 shows method 1000 of performing wireless communications, the method including performing a first synchronization signal detection and a second synchronization signal detection on a cell using a target downmixing frequency to obtain a first detection time estimate, a second detection time estimate, and a frequency offset estimate (1002), determining a correction factor for an oscillator based on a difference between the second detection time estimate and an expected second detection time estimate (1004), determining an actual downmixing frequency based on the target downmixing frequency and the correction factor (1006), and determining a center frequency of the cell with the actual downmixing frequency and the frequency offset estimate (1008).

Various aspects of this disclosure provide a communication device including a synchronization signal detector (e.g., synchronization signal detector 720) configured to perform a first synchronization signal detection and a second synchronization signal detection on a cell using a target downmixing frequency to obtain a first detection time estimate, a second detection time estimate, and a frequency offset estimate, an oscillator corrector (e.g., oscillator corrector 724) configured to determine a correction factor for an oscillator based on a difference between the second detection time estimate and an expected second detection time estimate, and a raster offset determiner (e.g., raster offset determiner 724) configured to determine an actual downmixing frequency based on the target downmixing frequency and the correction factor, and to determine a center frequency of the cell with the actual downmixing frequency and the frequency offset estimate. In some aspects, this communication device can include various other internal components as described above for FIGS. 6-9. In some aspects, the communication device may be configured as an integrated circuit component for a terminal device, while in other aspects the wireless communication device may include, for example, a radio transceiver and one or more antennas and may be configured as a terminal device.

In some aspects, terminal device 102 may additionally or alternatively be configured to perform target frequency selection that includes both a "signal present"/"signal not present" determination and a statistical measurement of possible signal quality. Herein, such a statistical measure is given the name "alpha statistics." Incorporating such alpha statistics allows improved decisions regarding which center frequencies (e.g., EARFCNs for LTE and NB-IoT) to perform cell search on. For example, terminal devices (including NB-IoT and non-NB-IoT terminal devices) may be configured to perform both frequency scans and cell searches to detect available cells. The frequency scan may be a wideband procedure, where the terminal device uses a scan engine to 'scan' through a set of scan target frequencies (on one or more frequency bands that each include multiple scan target frequencies, such as EARFNCs) and to perform a wideband measurement on each of the scan target frequencies. The protocol stack running on the terminal device can then examine the wideband measurements to determine which scan target frequencies are likely to contain an active cell (e.g., an NB-IoT cells that is actively transmitting), and can then send these selected search target frequencies to a cell searcher. As previously described above in relation to FIGS. 1-5, the cell searcher can then evaluate the search target frequencies to identify any active cells that are present. This type of approach may therefore use the frequency scan as a type of filter that can narrow down the list of search target frequencies, which can save time compared to the brute-force alternative in which a terminal device performs a cell search on each center frequency.

The ability of a terminal device to accurately identify the most viable candidate center frequencies may be important in NB-IoT use cases. As previously described in relation to FIG. 5, NB-IoT may be deployed in any of a stand-alone (e.g., deployed separately and outside of the guardband of from an active LTE system), inband (e.g., within the bandwidth of an active LTE system), or guardband (e.g., configuration. As such, NB-IoT signals (e.g., occupying a single LTE Physical Resource Block (PRB)) can be found on almost any center frequency. A terminal device may therefore perform a large number of NPSS searches during frequency scans. Moreover, NB-IoT is expected to be deployed in a wide range of deployment scenarios, including extreme coverage conditions (which may have SNR in the order of −12 dB). NB-IoT terminal devices may perform frequency scans in these conditions by accumulating scan results from multiple individual radio frames. The combination of many possible NPSS locations as well as higher averaging times may lead to excessively long frequency scan times. This may increase connection latency as well as reduce battery lifetime.

Accordingly, aspects of this disclosure present improved methods and devices for performing target frequency selection with alpha statistics. These methods and devices may enable a terminal device to effectively identify search target frequencies based on detection metrics obtained during a frequency scan. The terminal device may then proceed to perform the cell searches on only the search target frequencies as identified in the initial frequency scan. In various cases, this can improve the efficiency of the frequency scan, leading to reduced connection latency and lower battery consumption. While some examples may be presented in an NB-IoT context, the methods and devices describe herein are not so limited, and may be applied for frequency scans and cell searches for any type of synchronization signals or radio access technology.

Figure 11:
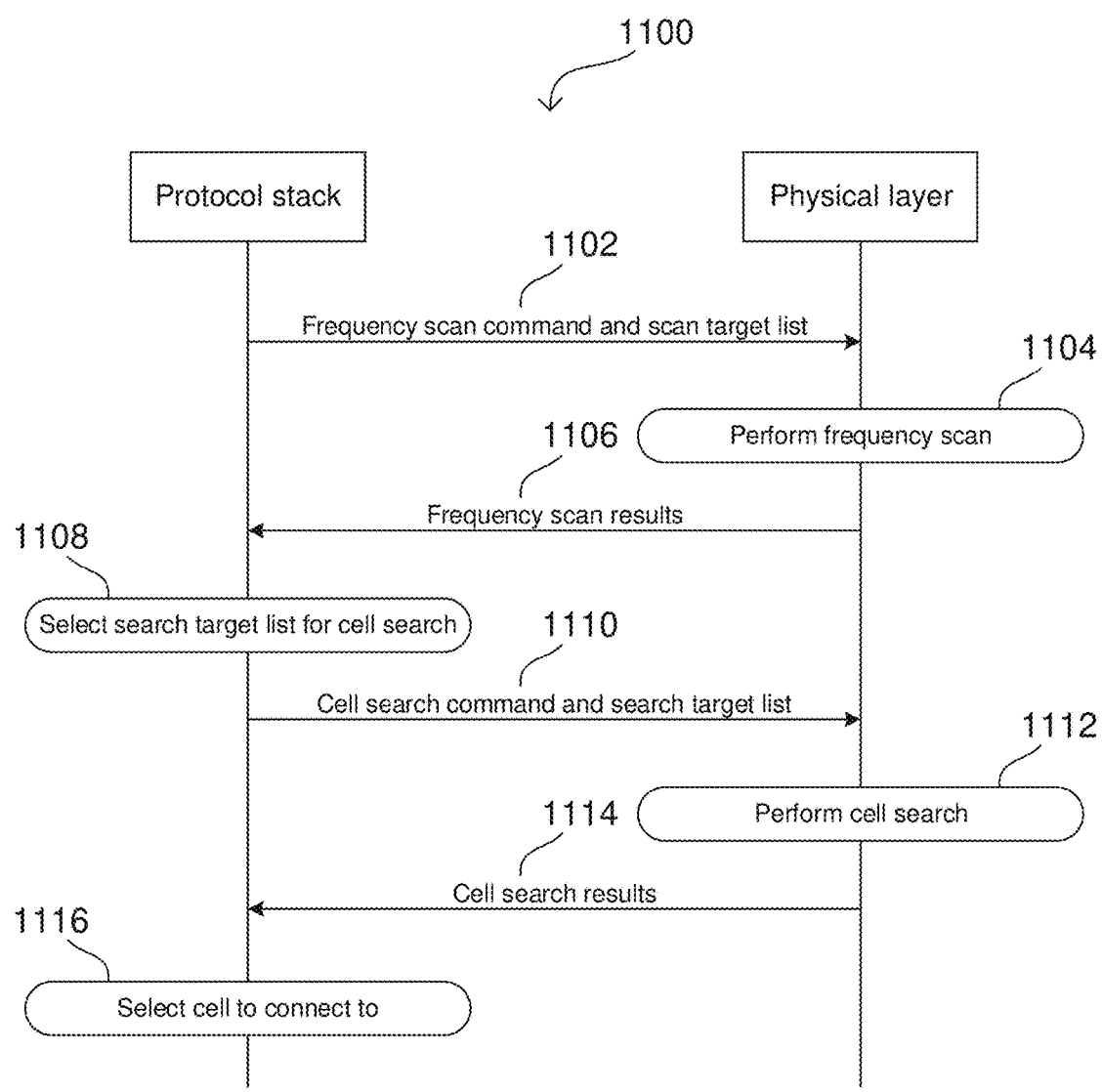
FIG. 11 shows an exemplary signal flow for a frequency scan and cell search according to some aspects.

FIG. 11 shows an exemplary signal flow for a frequency scan and cell search according to some aspects. As previously described regarding FIG. 2, terminal device 102 may include controller 210 configured to execute a protocol stack and digital signal processor 208 configured to perform physical layer processing. The protocol stack executed by controller 210 may manage the execution of frequency scans and cell searches, including determining when to perform frequency scans and cell searches and determining which targets (center frequencies) to perform the frequency scans and cell searches on.

Accordingly, as shown in message sequence chart 1100 in FIG. 11, the protocol stack (e.g., an Access Stratum (AS) of the protocol stack) executed at controller 210 may, in stage 1102, send a frequency scan command to the physical layer at digital signal processor 208. The protocol stack may also send a scan target list that specifies scan target frequencies for the physical layer to scan during the frequency scan (e.g., specified by either identifying frequency bands, which each include multiple center frequencies, or by identifying individual center frequencies). The physical layer may then perform the frequency scan (e.g., at a cell searcher of digital signal processor 208, such as cell searcher 300) on the scan target list as assigned in stage 1104 and report the frequency scan results back to the protocol stack in stage 1106. The protocol stack may then evaluate the frequency scan results to narrow down the scan target frequencies to identify search target frequencies in stage 1108. The protocol stack may then send a cell search command back to the physical layer in stage 1110 that instructs the physical layer to perform a cell search on a search target list, which specifies the search target candidate center frequencies. The physical layer may then perform the cell search as assigned in stage 1112 and may then report the cell search results back to the protocol stack in stage 1114. As previously described regarding cell searcher 300 of FIG. 3, the cell search results may include time and frequency synchronization information and/or a cell identity of any cells detected during the cell search. The protocol stack may then decide whether to connect with (e.g., establish an active connection with or camp on) one of the detected cells based on the cell search results in stage 1116.

As previously indicated, the cell search performed by the physical layer in stage 1112 may be an intensive procedure in which a cell searcher of digital signal processor 208 receives and processes multiple radio frames (e.g., for accumulation purposes) to detect the presence of synchronization signals (in addition to identifying the time and frequency offset thereof). Accordingly, if the protocol stack assigns a large search target list to the physical layer with the cell search command, it may take the physical layer a considerable amount of time to finish performing the cell search on each of the search target frequencies. However, if the protocol stack only provides a small search target list, other center frequencies that contain active cells but are not specified in the target list may go unsearched. As they are not searched, these center frequencies and their active cells will not be considered for later connection purposes. It can therefore be beneficial for the physical layer to obtain accurate frequency scan results and for protocol stack to effectively evaluate these frequency scan results to identify a suitable list of search target frequencies.

Accordingly, in various aspects of this disclosure terminal device 102 may be configured to perform a frequency scan in stage 1104 that determines a detection metric for the scan target frequencies with which terminal device 102 can accurately identify search target frequencies for the search target list. Terminal device 102 may therefore be able to identify the most viable (e.g., probabilistically likely to contain an active cell) center frequencies for cell search while omitting other center frequencies that have a low probability of having active cells.

Figure 12:
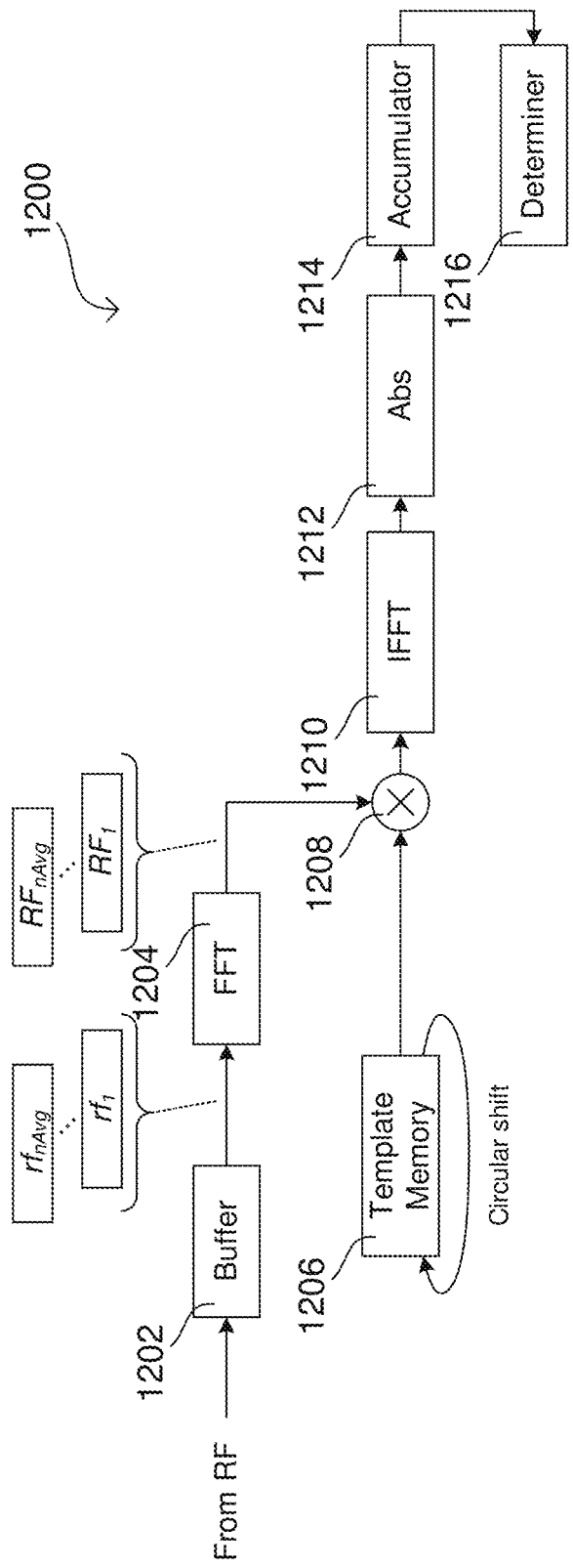
FIG. 12 shows an exemplary internal configuration of a scan engine according to some aspects.

In particular, in some aspects terminal device 102 may include scan engine 1200 as shown in FIG. 12, which may be configured to perform the frequency scan in stage 1104 of message sequence chart 1104. Scan engine 1200 may be an internal component of digital signal processor 208, and may act as part of the physical layer. Similar to cell searcher 300, scan engine 1200 may be configured to receive baseband samples (forming a baseband signal) from RF transceiver 204 of terminal device 102, and may process the baseband samples with its various internal components to perform a frequency scan.

Although not explicitly shown in FIG. 12, scan engine 1200 may be configured to provide control signals to RF transceiver 204 to tune the downmixing frequency of RF transceiver 204 to the various scan target frequencies in the scan target list provided by the protocol stack. Scan engine 1200 may therefore be configured to iterate through each of the scan target frequencies in the scan target list, and to process baseband samples for each scan target frequency to perform the scan processing thereon.

As shown in FIG. 12, scan engine 1200 may receive time-domain baseband samples from RF transceiver 204, and may store the time-domain baseband samples in buffer 1202. Similar to the manner previously described for cell searcher 300, scan engine 1200 may calculate the cross-correlation between the time-domain baseband samples and a synchronization signal template by performing a frequency-domain element-by-element multiplication (where one of the frequency-domain inputs is a complex conjugate). Accordingly, FFT engine 1204 may compute the FFT of the time-domain baseband samples to produce frequency-domain baseband samples (a frequency-domain baseband signal), and may provide the frequency-domain baseband samples to multiplier 1208. Multiplier 1208 may also receive the frequency-domain complex conjugate of the synchronization signal (that scan engine 1200 is scanning for; e.g., NPSS) from template memory 1206. Multiplier 1208 may then perform an element-by-element multiplication on these inputs, and provide the product to IFFT engine 1210.

IFFT engine 1210 may then perform the IFFT on the product, which will produce the time-domain cross-correlation between the time-domain baseband samples and the time-domain synchronization signal. The combination of buffer 1202, FFT engine 1204, multiplier 1208, and IFFT engine 1210 may therefore form a cross-correlation calculator, and may be configured to calculate the time domain cross-correlation between two inputs (e.g., the baseband samples from RF transceiver 204 and the synchronization signal template from template memory 1206). While the cross-correlation calculator shown in FIG. 12 may be a cross-correlation calculator that calculates a time-domain cross-correlation with frequency-domain calculations (e.g., that performs an element-by-element multiplication of two frequency-domain signals, one of which being a complex conjugate, and computes the IFFT of the product to obtain a time-domain cross-correlation), in other aspects scan engine 1200 may use a cross-correlation calculator that calculates a time-domain cross-correlation with time-domain calculation (e.g., a time-domain cross-correlation calculation using the time-domain baseband samples from RF transceiver 204 and a time-domain synchronization signal template stored in template memory 1206).

Absolute value determiner 312 may then determine the absolute value of the time-domain cross-correlation to produce the time-domain cross-correlation magnitude. Scan engine 1200 may perform this calculation of the time-domain cross-correlation magnitude over multiple radio frames. Accumulator 1214 may therefore receive the time-domain cross-correlation magnitude from absolute value determiner 1212 for each radio frame, and may sum the time-domain cross-correlation magnitudes to obtain the accumulated time-domain cross-correlation magnitude. In some aspects, and similar to as described above for FIG. 3, template memory 1206 may be configured to perform multiple circular shifts on the synchronization signal template, where the circular shifts correspond to different frequency offsets. Accumulator 1214 may then also accumulate the time-domain cross-correlation magnitudes over these frequency offsets, which can help alleviate the impacts of frequency offset.

Accumulator 1214 may then provide the accumulated time-domain cross-correlation magnitude to determiner 1216. Determiner 1216 may then be configured to calculate a detection metric with the accumulated time-domain cross-correlation magnitude, where the detection metric is a quantitative indicator of the probability that the scan target frequency currently being evaluated contains an active cell. For example, determiner 1216 may calculate the detection metric as an "alpha statistic," which as referenced herein is a detection metric that is the ratio of the peak of the accumulated time-domain cross-correlation magnitude to the mean of the accumulated time-domain cross-correlation magnitude. Accordingly, to determine the detection metric, determiner 1216 may identify a peak value $pk_m$ of the accumulated time-domain cross-correlation magnitude (in other words, by identifying the sample of the accumulated time-domain cross-correlation magnitude that has the highest value). Determiner 1216 may also determine a mean value $\mu_m$ of the accumulated time-domain cross-correlation magnitude (in other words, the average value of all the samples of the accumulated time-domain cross-correlation magnitude). Determiner 1216 may then determine the alpha statistic a as the peak value $pk_m$ divided by the mean value $\mu_m$, i.e.

$$\alpha = \frac{pk_m}{\mu_m},$$

or in other words, the peak-to-mean ratio. This specific example of a detection metric is therefore referred to herein as an alpha statistic a.

These alpha statistics can be indicative of the probability that a given scan target frequency contains an active cell, in particular when used a relative probability in comparing the alpha statistics obtained for different scan target frequencies. For example, when the alpha statistic for a first scan target frequency is higher than the alpha statistic for a second scan target frequency, the first scan target frequency can be assumed to have a higher probability of containing an active cell than the second scan target frequency.

This results from the fact that the alpha statistics are derived from noisy data (the received radio signals), which is composed of the signals transmitted by any active cells (if any) and noise. Considering first the case when there is an active cell and the noise has low power relative to the transmitted signal, the time-domain cross-correlation (calculated by the cross-correlation calculator of scan engine 1200) will have a single peak (at the sample which is the starting point of the synchronization signal in the received signal) while the rest of the cross-correlation function will have very low magnitude. However, when the noise has higher power, random noise events can cause the time-domain cross-correlation to have high values, and even other peaks, at samples other than the actual "true" peak. Accordingly, instead of only having a single peak and negligible correlation metrics elsewhere, the high noise power case will cause higher correlation metrics at samples other than the peak.

Considering also cases where there is no active cell, the alpha statistics will be relatively low. When the noise is low power, the resulting cross-correlation would be low or negligible across all samples, as the noise would likely be too insignificant to exhibit any meaningful statistical similarities to the target synchronization signal. This lack of strong peaks would therefore yield a low alpha statistic. The alpha statistic would also be low for higher power noise cases as any peaks would be relatively small given the lack of meaningful similarities between the noise and target synchronization signal. Furthermore, the mean would also be higher as multiple samples of the cross-correlation may have non-negligible correlation metrics.

Accordingly, the alpha statistic is probabilistically likely to be higher when there is an active cell with strong power relative to the noise, and probabilistically likely to be lower when there is no active cell and/or the received signal is noisy. Scan engine 1200 may therefore utilize these alpha statistics as its detection metric, and may therefore perform this processing (determination of the ratio of the peak to the mean) on each of the scan target frequencies in the scan target list provided by the protocol stack of controller 210 in stage 1102 of message sequence chart 1100. For example, scan engine 1200 may iterate through the scan target frequencies in the scan target list, and determine alpha statistics α (via calculation and evaluation of a cross-correlation) for each scan target frequency. After determining the, determiner 1216 may then report the alpha statistics back to the protocol stack in stage 1106 as the frequency scan results.

As shown in FIG. 11, the protocol stack may then be configured to select search target frequencies for a search target list in stage 1108. The protocol stack may be configured select the search target list based on the alpha statistics reported by scan engine 1200. For example, the protocol stack may use the alpha statistics to select the scan target center frequencies that have the highest probability of containing an active cell for inclusion in the search target list. For instance, the protocol stack may be configured to use the alpha statistics as representative of relative probabilities, where scan target center frequencies having higher alpha statistics are assumed to have a higher probability of having an active than other scan target center frequencies with lower alpha statistics.

Figure 13:
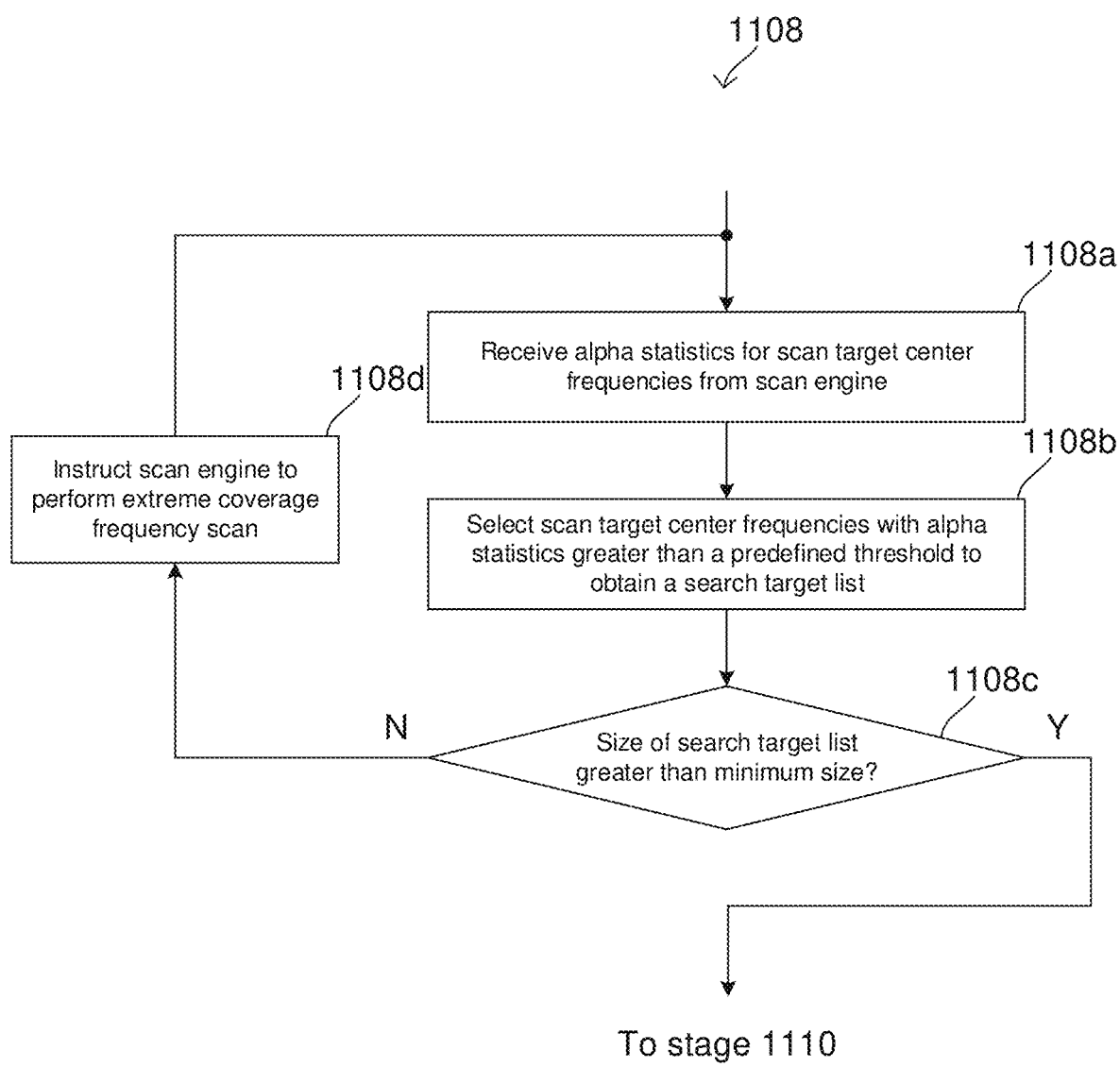
FIG. 13 shows an exemplary flow chart illustrating selection of search target center frequencies according to some aspects.

In various aspects, the protocol stack may be configured to select search target center frequencies from the scan target center frequencies based on the alpha statistics in stage 1108. FIG. 13 shows exemplary flow chart 1300 describing this example of stage 1108 according to some aspects. As shown in FIG. 13, the protocol stack may first receive the scan results from scan engine 1200 in stage 1108a, which includes the alpha statistics for the scan target center frequencies obtained by scan engine 1200 in stage 1104. The protocol stack may then select the scan target center frequencies that have alpha statistics greater than a predefined threshold to obtain a search target list in stage 1108b (for example, may select only the scan target center frequencies with alpha statistics greater than the predefined threshold; e.g., by comparing the alpha statistic of each scan target center frequency to the predefined threshold). Accordingly, the protocol stack may select a reduced subset of the scan target center frequencies as the search target center frequencies. This may enable the protocol stack to narrow down the original scan target list into only the scan target center frequencies that have alpha statistics (or, equivalently, relative probabilities of having an active cell) above some predefined threshold (which can be, for example, set by a designer offline). In some aspects, the protocol stack may first generate a ranked list from the scan target center frequencies that is ordered based on their alpha statistics (e.g., from high to low), and may then select only the top section of the ranked list having alpha statistics greater than the predefined threshold. In other aspects, the protocol stack may iterate through each of the scan target center frequencies, evaluate their respective alpha statistics, and select the scan target center frequencies with alpha statistics higher than the predefined threshold for the search target list.

In some aspects, the protocol stack may use these search target center frequencies as the final search target list, and may send a cell search command with the search target list to a cell searcher of the physical layer (e.g., configured in the manner of cell searcher 300). The cell searcher may then perform the cell search in stage 1112 (e.g., by performing a cell search on the search target center frequencies in the search target list and determining which cells are detected on each search target center frequency) and report the cell search results (e.g. a list of detected cells, if any, for each search target center frequency, optionally in addition to detection metrics that indicate the strength of the detected cells) to the protocol stack in stage 1116. The protocol stack may then select a cell to connect to based on the search results in stage 1116.

In other aspects, such as that described in FIG. 13, the protocol stack may determine whether the search target list obtained in stage 1108b is large enough (e.g., whether it contains a sufficient number of search target center frequencies). For example, as shown in FIG. 13, the protocol stack may determine in stage 1108c whether the search target list is greater than a predefined minimum size (e.g., whether the number of search target center frequencies selected in stage 1108b is greater than the predefined minimum size, where the predefined minimum size can be set by a designer offline). If the protocol stack determines that the search target list is greater than the predefined minimum size in stage 1108c, the protocol stack may continue to stage 1110 to issue a cell search command to the cell searcher that specifies the search target list.

Conversely, if the protocol stack determines that the search target list is not greater than the minimum size in stage 1108c, the protocol stack may proceed to stage 1108d. In stage 1108d, the protocol stack may instruct scan engine 1200 to perform a frequency scan for extreme coverage candidates. By way of background, the amount of accumulation (done by, for example, accumulator 1214) may dictate whether scan engine 1200 can evaluate center frequencies having weak cells or not. Accordingly, if scan engine 1200 performs no accumulation, scan engine 1200 only be able to evaluate center frequencies to determine whether they have strong active cells or not (e.g., cells with high SNR and/or received signal strength). If scan engine 1200 performs a large amount of accumulation (for example, accumulation over a large number of radio frames, e.g., more than 10 radio frames), the scan engine 1200 may also be able to determine whether center frequencies have weak active cells (e.g., extreme coverage candidates). This may be particularly applicable for NB-IoT use cases, where terminal devices are expected to be able to operate in deep coverage.

Accordingly, when the protocol stack determines that the search target list is too small, the protocol stack may instruct scan engine 1200 to expand its frequency scan to target extreme coverage candidates in stage 1108d. Scan engine 1200 may then execute an extreme coverage frequency scan (e.g., a frequency scan using more accumulation than the frequency scan of stage 1104). In some aspects scan engine 1200 may execute the extreme coverage frequency scan on the same scan target list as stage 1104 (but with more accumulation), such as if the protocol stack provides the same scan target list as in stage 1102, or if the protocol stack provides no scan target list. In other aspects, the protocol stack may select a new scan target list (e.g., a new set of scan target center frequencies) to provide to scan engine 1200 in stage 1108d. Scan engine 1200 may then perform the extreme coverage frequency scan on the new scan target list.

Once scan engine 1200 has completed the extreme coverage frequency scan and provided the resulting scan results back to the protocol stack, the protocol stack may then repeat stages 1108a-1108c. For example, the protocol stack may receive the alpha statistics for the scan target center frequencies of the extreme coverage frequency scan in stage 1108a. The protocol stack may then compare the alpha statistics of the scan target center frequencies of the extreme coverage frequency scan to the predefined threshold, and select the scan target center frequencies with alpha statistics greater than the predefined threshold to add to the initial search target list. The protocol stack may then determine in stage 1108c whether the size of the updated search target list (including those scan target center frequencies of the extreme coverage scan with alpha statistics greater than the predefined threshold) is greater than the predefined minimum size in stage 1108c.

If the protocol stack determines that the size of the updated search target list is less than the predefined minimum size, the protocol stack may return to stage 1108d to instruct scan engine 1200 to perform another extreme coverage frequency scan. For example, the protocol stack may instruct scan engine 1200 to perform an extreme coverage frequency scan with more accumulation than the initial extreme coverage frequency scan (e.g., to target candidates in even more extreme coverage). Scan engine 1200 may then perform the extreme coverage frequency scan as instructed, and report back the scan results in stage 1108a.

If the protocol stack determines that the size of the updated search target list is greater than the predefined minimum size, the protocol stack may send the updated search target list to the cell searcher of the physical layer with a cell search command in stage 1110. The protocol stack and physical layer may then execute stages 1112-1116 as previously described.

In these aspects described immediately above, the protocol stack may select the scan target center frequencies with alpha statistics greater than the predefined threshold for the search target list in stage 1108b. In other aspects, the protocol stack may select the protocol stack may instead select a quantity equal to the predefined minimum size of the scan target center frequencies that have the highest alpha statistics. Accordingly, the protocol stack may not trigger an extreme coverage frequency scan, but rather may select a predefined quantity of the scan target center frequencies having the highest alpha statistics for the search target list. The protocol stack may then proceed to stage 1110 with this search target list.

Figure 14:
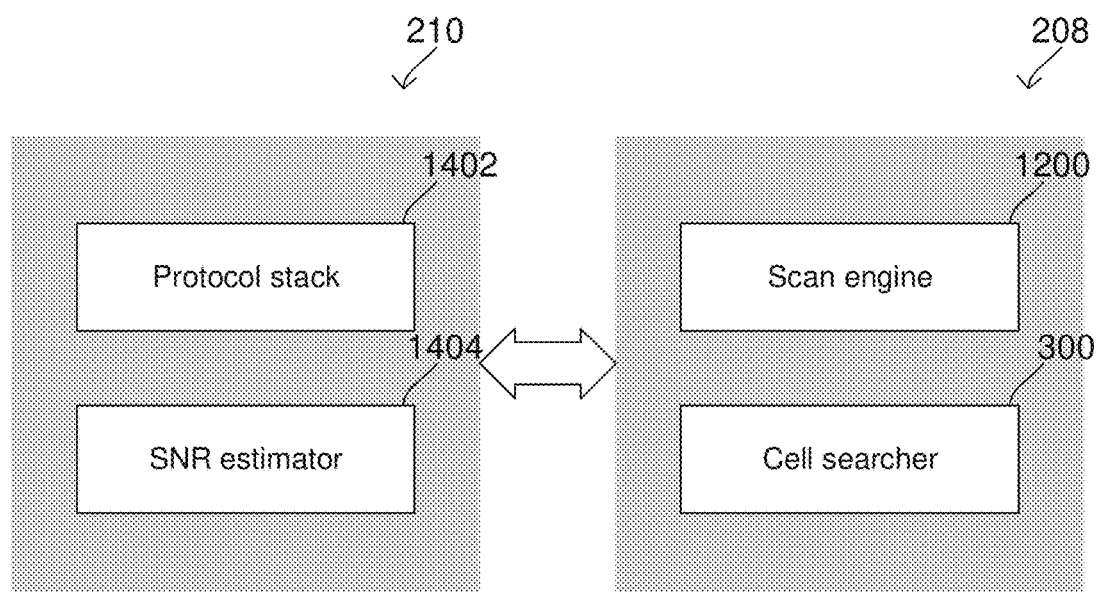
FIG. 14 shows an exemplary internal diagram of the components of a terminal device related to a candidate frequency selection procedure according to some aspects.

FIG. 14 shows an exemplary internal diagram of the components of terminal device 102 related to the candidate frequency selection procedure described above. As shown in FIG. 14, controller 210 may include protocol stack 1402, configured as described above, which may controller 210 may execute as program code. In some aspects, controller 210 may also include SNR estimator 1404, as further described below. Digital signal processor 208 may include scan engine 1200 and cell searcher 300 (although, in some aspects, digital signal processor 208 may use a conventional cell searcher in place).

In some aspects, the protocol stack may additionally or alternatively derive SNRs from the alpha statistics, and use the SNRs to select the search target list. As previously indicated, the alpha statistics may exhibit a strong correlation with SNR, where center frequencies with high alpha statistics are generally expected to have high SNRs. Accordingly, in some aspects the protocol stack may be configured to estimate the SNR of the scan target center frequencies, and to use the estimated SNRs of the scan target center frequencies to select the search target center frequencies.

For example, as shown in FIG. 14, controller 210 may include SNR estimator 1404, which may be a software instruction set that is retrieved and executed by controller 210 of terminal device 102. SNR estimator 1404 may be configured to map alpha statistics to estimated SNR values, or in other words, may be configured to receive an alpha statistic for a given center frequency as input and to produce a corresponding estimated SNR for the center frequency as output. This mapping function can be based on offline testing. For example, a designer can use offline testing by simulating center frequencies with known SNR values and subsequently calculating the alpha statistic for the center frequency. The designer may vary the testing conditions over multiple different scenarios, and the offline testing results will therefore form the basis of a mapping function between alpha statistic and SNR. SNR estimator 1404 may also be configured to receive other secondary parameters as input, such as the number of accumulated radio frames, the center frequency, other center frequencies near the center frequency, and certain dependencies on the normalization hardware, which the designer may also cover during the offline testing.

Accordingly, as SNR estimator 1404 is configured to map alpha statistics to estimated SNRs, protocol stack 1402 may use SNR estimator 1404 to estimate the SNRs of the alpha statistics provided by scan engine 1200 as scan results. Accordingly, protocol stack 1402 may be configured to provide the alpha statistics and corresponding scan target center frequencies to SNR estimator 1404. SNR estimator 1404 may then use its mapping function (e.g., preprogrammed into SNR estimator 1404) to obtain estimated SNRs for each alpha statistic. SNR estimator 1404 may then provide the estimated SNRs back to protocol stack 1402. Protocol stack 1402 may then select the search target center frequencies from the scan target center frequencies based on the estimated SNRs using any selection logic described above. For example, in some aspects protocol stack 1402 may be configured to select scan target center frequencies with estimated SNRs greater than a predefined threshold (e.g., a predefined SNR threshold) as the search target center frequencies of the search target list. Protocol stack 1402 may then determine whether the size of the search target list is greater than the predefined minimum size and, if not, instruct scan engine 1200 to perform an extreme coverage frequency scan and report back the resulting alpha statistics. Protocol stack 1402 may continue repeating this (e.g., with more accumulation used by scan engine 1200 in each successive extreme coverage frequency scan) until the size of the search target list is greater than the predefined minimum size. In other aspects, the protocol stack may select a quantity equal to the minimum size of scan target center frequencies having the highest SNRs as the search target center frequencies. To generalize, protocol stack 1402 may therefore use a detection metric to select the search target center frequencies from the scan target center frequencies, where the detection metric is an alpha statistic or an estimated SNR.

In some aspects, protocol stack 1402 may additionally or alternatively be configured to use the SNR estimates for purposes other than search target list selection. For example, protocol stack 1402 may use the SNR estimates as part of its higher layer state machine, such as to determine whether the SNR is sufficient to successfully support communications with a detected cell, what transmit parameters or power to use, and/or whether to continue executing frequency scans elsewhere in the spectrum.

In the various aspects described above, the protocol stack may use the alpha statistics to narrow down scan target center frequencies to obtain the search target center frequencies (which may be a reduced subset of the scan target center frequencies). As the alpha statistics can offer a suitable indication of the statistical likelihood that a given center frequency contains an active cell, this use of alpha statistics may enable the protocol stack to reduce the scan target list down to search target center frequencies that have higher relative probabilities of having active cells than the excluded scan target center frequencies. Terminal device 102 may therefore be able to reduce the overall frequency scan time and/or reduce power consumption while reducing the risk that strong center frequencies are inadvertently excluded from the cell search.

Figure 15:
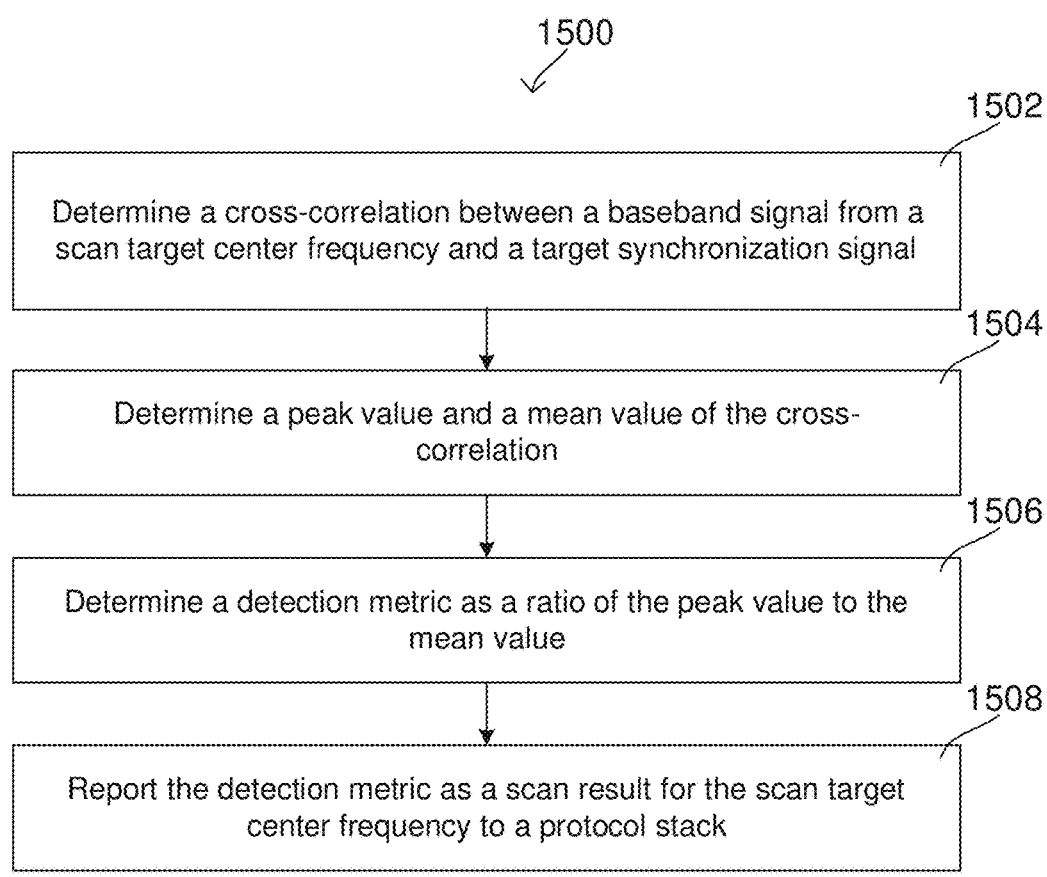
FIG. 15 shows an exemplary method of performing a frequency scan according to some aspects.

FIG. 15 shows exemplary method 1500 of performing a frequency scan according to some aspects. As shown in FIG. 15, method 1500 includes determining a cross-correlation between a baseband signal from a scan target center frequency and a target synchronization signal (1502), determining a peak value and a mean value of the cross-correlation (1504), determining a detection metric as a ratio of the peak value to the mean value (1506), and reporting the detection metric as a scan result for the scan target center frequency to a protocol stack (1508).

Figure 16:
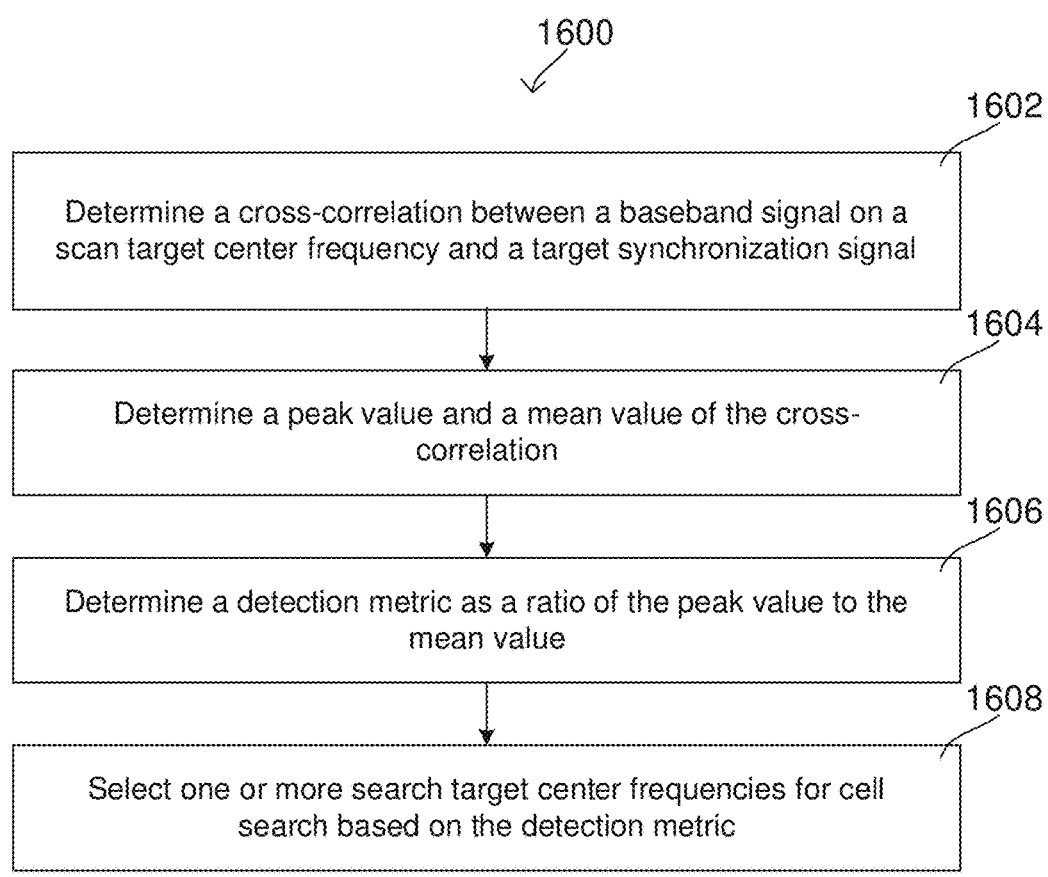
FIG. 16 shows an exemplary method of performing a frequency scan according to some aspects.

FIG. 16 shows exemplary method 1600 of performing a frequency scan according to some aspects. As shown in FIG. 16, method 1600 includes determining a cross-correlation between a baseband signal on a scan target center frequency and a target synchronization signal (1602), determining a peak value and a mean value of the cross-correlation (1604), determining a detection metric as a ratio of the peak value to the mean value (1606), and selecting one or more search target center frequencies for cell search based on the detection metric (1608).

Various aspects of this disclosure provide a scan engine including a cross-correlation calculator (e.g., buffer 1202, FFT engine 1204, multiplier 1208, and IFFT engine 1210) configured to determine a cross-correlation between a received signal on a scan target center frequency and a target synchronization signal, and a determiner (e.g., determiner 1216) configured to determine a peak value and a mean value of the cross-correlation, determine a detection metric as a ratio of the peak value to the mean value, and report the detection metric as a scan result for the scan target center frequency to a protocol stack.

Various aspects of this disclosure provide a communication device including a protocol stack (e.g., protocol stack 1402), a scan engine (e.g., scan engine 1200) configured to determine a cross-correlation between a baseband signal on a scan target center frequency and a target synchronization signal, determine a peak value and a mean value of the cross-correlation, determine a detection metric as a ratio of the peak value to the mean value, and report the detection metric as a scan result for the scan target center frequency to the protocol stack, the protocol stack configured to select one or more search target center frequencies for cell search based on the detection metric. In some aspects, this communication device can include various other internal components as described above for FIGS. 11-14. In some aspects, the communication device may be configured as an integrated circuit component for a terminal device, while in other aspects the communication device may include, for example, a radio transceiver and one or more antennas and may be configured as a terminal device.

In some aspects, terminal device 102 may also be configured to apply ghost cell filtering with the alpha statistics described above. Alpha statistics for different center frequencies may be dependent on each other, and accordingly an active cell at a given center frequency may cause the alpha statistics (and/or corresponding SNRs) for its neighboring center frequencies to be artificially high. Accordingly, even if a center frequency (e.g., an EARFCN) does not have an active cell (e.g., an active NB-IoT cell), the presence of an active cell at neighboring center frequencies may cause the center frequency to artificially produce an alpha statistic that shows some statistical likelihood that the center frequency has an active cell. This phenomenon is due to the fact that many synchronization signals, including NPSS, can exhibit correlations across frequency offset versions of itself. Accordingly, when performing a cross-correlation-based detection on one center frequency, a synchronization signal at a different center frequency may cause a correlation to show up (due to its appearance as a frequency-shifted version of the synchronization signal).

Figure 17:
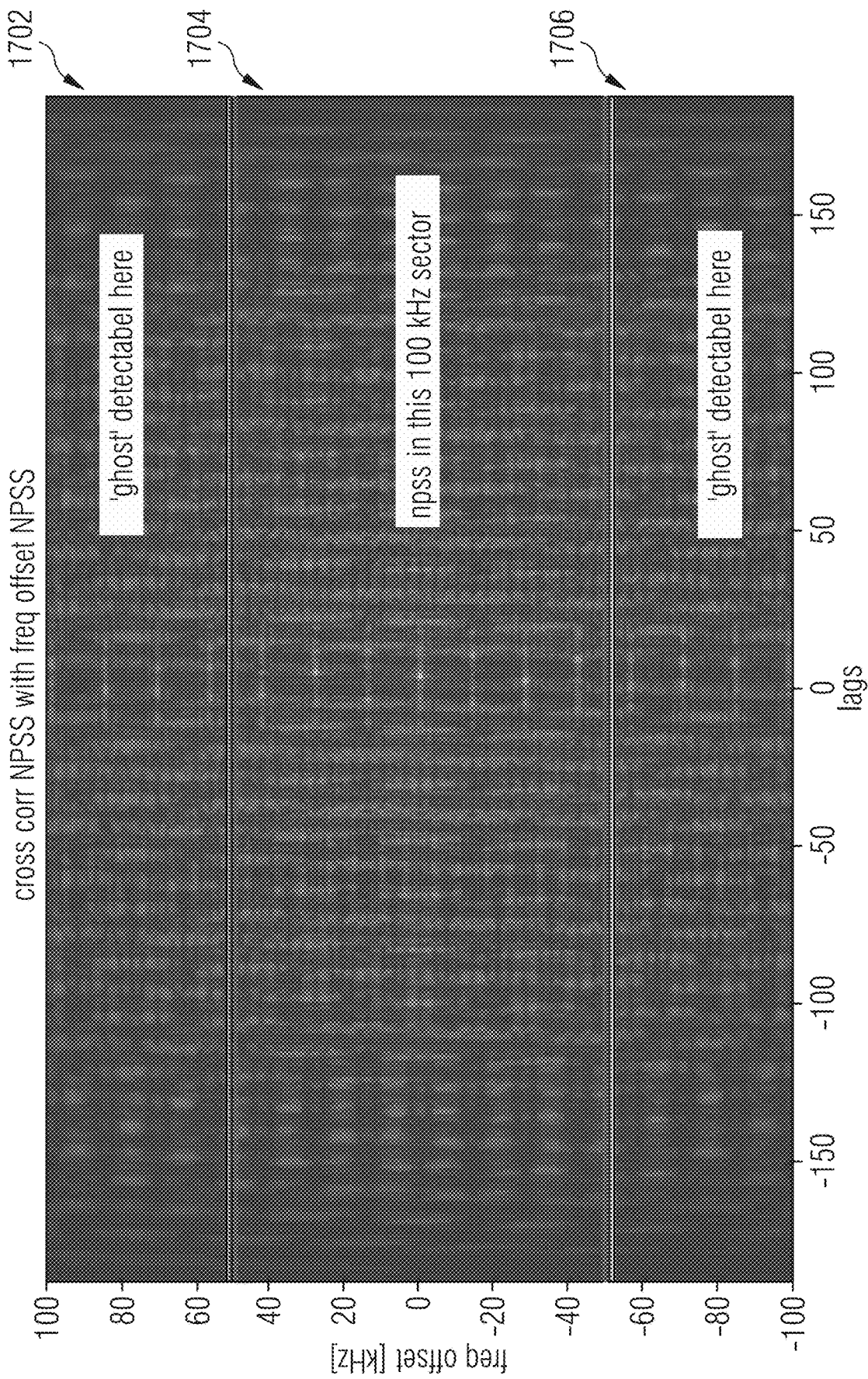
FIG. 17 shows an exemplary plot of ghost frequencies according to some aspects.

FIG. 17 shows an example with NPSS according to some aspects. As shown in FIG. 17, a first center frequency (centered at frequency offset 0 kHz on the Y axis) in region 1704 may have an active cell transmitting an NPSS (e.g., centered at 0 frequency offset). Accordingly, when a scan engine, such as scan engine 1200, evaluates the first center frequency, the cross-correlation will indicate a high likelihood that there is an active cell. The alpha statistic will also generally be high, as there will be a high peak value (due to the presence of an NPSS at some time sample) and a relatively low mean value (although the presence of significant noise may impact this).

However, when the scan engine evaluates a second center frequency in region 1702 (e.g., set at frequency offset+100 kHz, which may be the immediately neighboring EARFCN), the resulting cross-correlation and alpha statistic will also be artificially high even when the second center frequency has no active cell. As the NPSS at the first center frequency will appear as a frequency-shifted NPSS at the second center frequency, the cross-correlation will pick up some correlation between the frequency-shifted NPSS and the target synchronization signal. As the cross-correlation and/or the alpha statistics may be artificially high, there may be a 'ghost' cell at the second center frequency (e.g., a non-existent cell appears real due to measurement phenomenon). A third center frequency in region 1706 (e.g., at frequency offset −100 kHz, which may be the other immediately neighboring EARFCN to the first center frequency) may likewise appear as a ghost cell due to this phenomenon.

However, as recognized by this disclosure, while the alpha statistics and/or SNRs for the second and third center frequencies may be artificially high, in most cases they will nevertheless not be as high as the alpha statistic/SNR for the first center frequency (as their cross-correlations may result from correlation between the target synchronization signal with a frequency-shifted versions of itself, while the cross-correlation for the first center frequency will result from correlation between the target synchronization signal and a non-shifted version of itself). Alpha statistics and SNRs for center frequencies with active cells can therefore generally be assumed to be higher than that of center frequencies that only have ghost cells (although this can change in extreme cases).

In recognition of this, in some aspects the protocol stack of terminal device 102 may be configured to apply ghost cell filtering on the scan results from frequency scans. In some cases, this can help terminal device 102 avoid performing cell search on center frequencies that likely only have ghost cells. Terminal device 102 can therefore focus its cell search on the center frequencies that are likely to have actual active cells.

With reference back to FIG. 11, the protocol stack (e.g., protocol stack 1402 as shown in FIG. 14) may be configured to apply this ghost cell filtering in stage 1108, namely after receiving the frequency scan results from the physical layer (e.g., from the scan engine, such as scan engine 1200). The protocol stack may therefore use the ghost cell filtering to select the search target frequencies (for the search target list) from the scan target frequencies.

Figure 18:
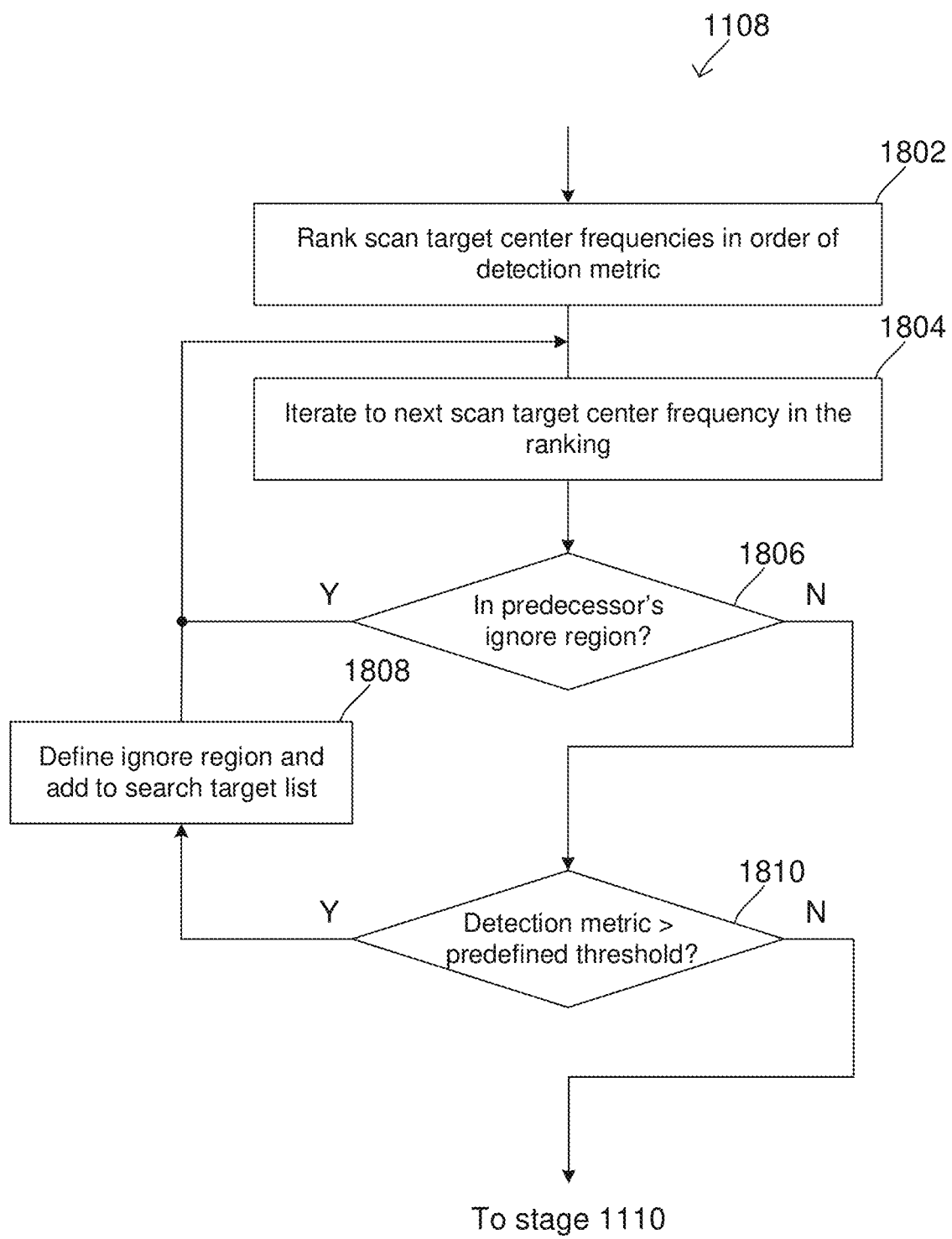
FIG. 18 shows an exemplary flow chart illustrating ghost cell filtering according to some aspects.

FIG. 18 shows an exemplary flow chart illustrating the ghost cell filtering of stage 1108 according to some aspects. After receiving the scan results for the scan target center frequencies from the scan engine (e.g., scan engine 1200), the protocol stack may rank the scan target center frequencies in order of detection metric in stage 1802. In some aspects, the protocol stack may use the alpha statistics (provided by the scan engine in the scan results) as the detection metric. In other aspects, the protocol stack may determine estimated SNRs for the scan target center frequencies based on the alpha statistics (e.g., with SNR estimator 1404), and may then use the estimated SNRs as the detection metric.

The protocol stack may then begin iterating through the ranking in stage 1804 by iterating to the next scan target center frequency in the ranking. The protocol stack may determine in stage 1806 whether the current scan target center frequency is in a predecessor's ignore region in stage 1806. As the current scan target center frequency is the first scan target center frequency in the ranking, the current scan target center frequency will not be in a predecessor's ignore region, and the protocol stack may continue to stage 1810.

In stage 1810, the protocol stack may determine whether the detection metric of the current scan target center frequency is greater than a predefined threshold (e.g., a predefined threshold for alpha statistics, or a predefined threshold for SNR depending on which is being used as the detection metric). As the ranking is ordered according to detection metric, once the current scan target center frequency has a detection metric that is not greater than the predefined threshold there will not be any other scan target center frequencies with a detection metric greater than the predefined threshold. Accordingly, if the detection metric is not greater than the predefined threshold, the protocol stack may end stage 1108 and proceed to stage 1110. In some aspects, the protocol stack may also be configured to determine whether the size of the search target list is greater than a predefined minimum size, such as previously described regarding FIG. 13, and to trigger an extended coverage frequency scan to get further scan results if the size of the search target list is greater than a predefined minimum size.

If the protocol stack determines that the detection metric for the current scan target center frequency is greater than the predefined threshold in stage 1810, the protocol stack may proceed to stage 1808 to define an ignore region and add the current scan target center frequency to the search target list. As previously described regarding FIG. 17, center frequencies with active cells can cause ghost cells to appear at neighboring center frequencies that do not have active cells. However, center frequencies with active cells will in most cases have higher detection metrics (alpha statistic and/or estimated SNR) than center frequencies that only have ghost cells. As the ranking is ordered according to detection metric, the protocol stack will reach the scan target center frequency with an active cell before reaching any of its neighboring center frequencies that only have ghost cells. Accordingly, the protocol stack may define an ignore region as one or more neighboring center frequencies to the current scan target center frequency in stage 1808. When the protocol stack reaches the neighboring center frequencies in the ignore region during a later iteration, the protocol stack will determine that they are in a predecessor's ignore region in stage 1806, and will consequently not add them to the search target list.

Accordingly, after defining the ignore region for the current scan target center frequency and adding it to the search target list in stage 1808, the protocol stack may return to stage 1804 to iterate to the next scan target center frequency in the ranking. The protocol stack may then repeat stage 1806 to determine if the current scan target center frequency is in a predecessors' ignore region. If so, the protocol stack may return to stage 1804 to iterate and evaluate the next scan target center frequency in the ranking. If not, the protocol stack may proceed to stage 1810 to determine whether the detection metric for the current scan target center frequency is greater than the predefined threshold. The protocol stack may then either define the ignore region for the current scan target center frequency and add it to the search target list in stage 1808 if the detection metric is greater than the predefined threshold, or end stage 1108 if the detection metric is not greater than the predefined threshold.

Once the protocol stack has completed stage 1108, it may send the search target center frequencies in the search target list to the cell searcher with a cell search command in stage 1110. As previously described regarding FIG. 11, the cell searcher may perform the cell search in stage 1112 report the cell search results back to the protocol stack in stage 1114. The protocol stack may then select a cell to connect to based on the cell search results in stage 1116.

The protocol stack may use different ignore regions in various different aspects. For example, in some aspects the protocol stack may define the ignore region for a given scan target center frequency as its two immediately neighboring predefined center frequencies (e.g., on a predefined channel raster), or in other words, the immediately higher and immediately lower center frequencies on a predefined channel raster. In some aspects, the protocol stack may define the ignore region for a given scan target center frequency as its X closest neighboring center frequencies higher than the scan target center frequency and the Y closest neighboring center frequencies lower than the scan target center frequency (where X and Y can be equal or different).

In some aspects, the protocol stack may use an ignore region database to track the current ignore regions. For example, each time the protocol stack defines an ignore region for a scan target center frequency, the protocol stack may identify the center frequencies (e.g., on the channel raster) that are within the ignore region, and may then store these center frequencies in the ignore region database (e.g., by channel number, or by center frequency). Whenever the protocol stack is determining whether a current scan target center frequency is in a predecessor's ignore region in stage 1806, the protocol stack may check the ignore region database to determine whether the current scan target center frequency is stored in the ignore region database (e.g., by referring the database with the current scan target center frequency, or with its channel number). If the current scan target center frequency is stored in the ignore region database, the protocol stack may conclude that it is in a predecessor's ignore region in stage 1806.

In other aspects, the protocol stack may update the ranking of scan target center frequencies each time an ignore region is defined. For example, each time the protocol stack iterates to a current scan target center frequency, the protocol stack may check whether its detection metric is greater than the predefined threshold. If so, the protocol stack may add the current scan target center frequency to the search target list, and then search through the ranking to determine whether any of the other scan target center frequencies fall within its ignore region. If so, the protocol stack may remove these other scan target center frequencies from the ranking.

These various aspects may therefore help the protocol stack to avoid including center frequencies in the search target list that are likely to contain ghost cells, such as those center frequencies that neighbor a scan target center frequency with a higher detection metric. This can consequently reduce the chance that the cell searcher performs a cell search/on a center frequency that only has ghost cells.

Figure 19:
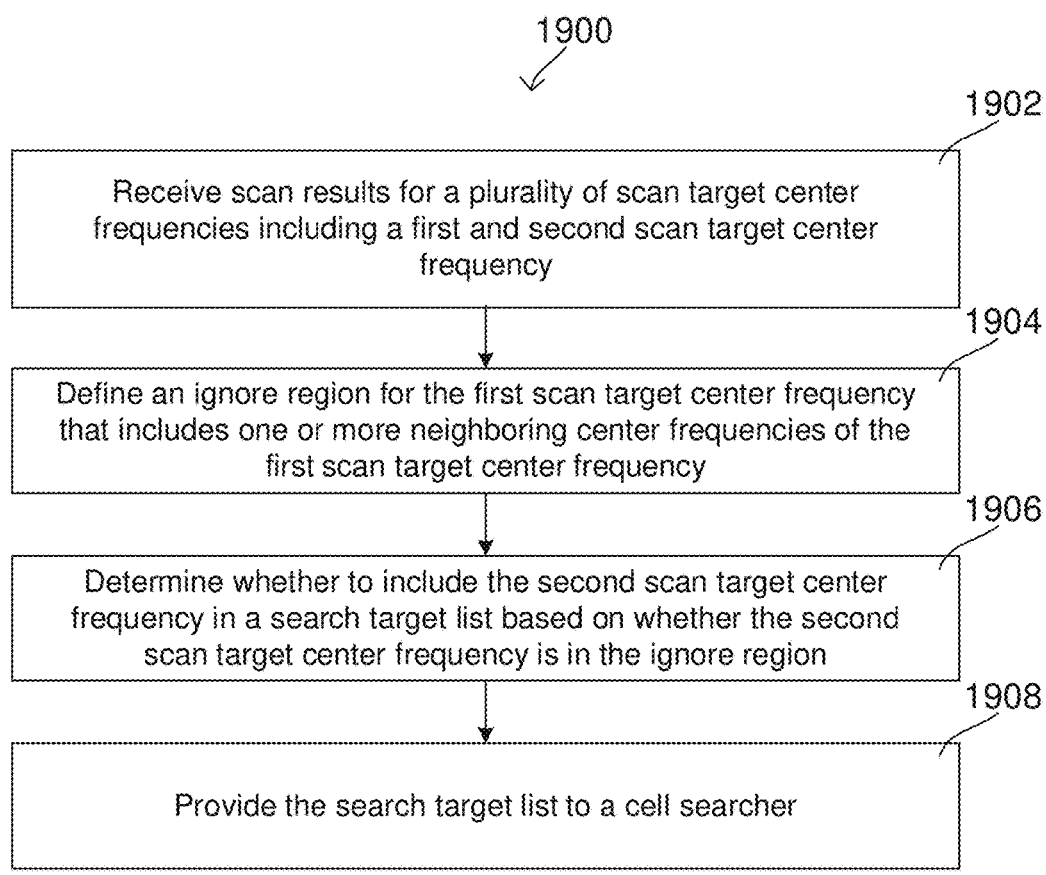
FIG. 19 shows an exemplary method of performing wireless communications according to some aspects.

FIG. 19 shows method 1900 of performing wireless communications according to some aspects. As shown in FIG. 19, method 1900 includes receiving scan results for a plurality of scan target center frequencies including a first and second scan target center frequency (1902), defining an ignore region for the first scan target center frequency that includes one or more neighboring center frequencies of the first scan target center frequency (1904), determining whether to include the second scan target center frequency in a search target list based on whether the second scan target center frequency is in the ignore region (1906), and providing the search target list to a cell searcher (1908).

Figure 20:
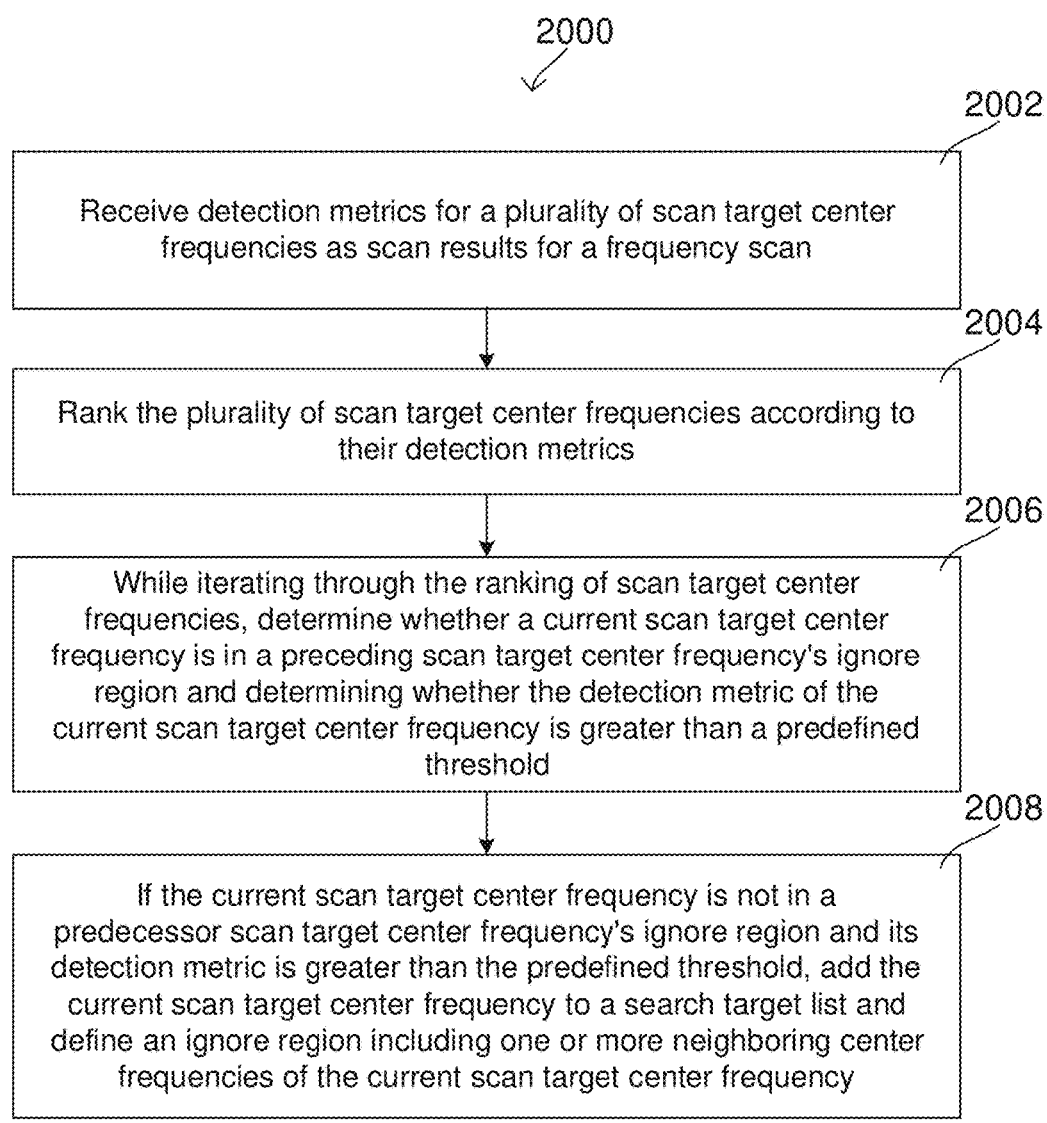
FIG. 20 shows an exemplary method of performing wireless communications according to some aspects.

FIG. 20 shows method 2000 of performing wireless communications according to some aspects. As shown in FIG. 20, method 2000 includes receiving detection metrics for a plurality of scan target center frequencies as scan results for a frequency scan (2002), ranking the plurality of scan target center frequencies according to their detection metrics (2004), while iterating through the ranking of scan target center frequencies, determining whether a current scan target center frequency is in a preceding scan target center frequency's ignore region and determining whether the detection metric of the current scan target center frequency is greater than a predefined threshold (2006), and if the current scan target center frequency is not in a predecessor scan target center frequency's ignore region and its detection metric is greater than the predefined threshold, adding the current scan target center frequency to a search target list and defining an ignore region including one or more neighboring center frequencies of the current scan target center frequency (2008).

Various aspects of this disclosure provide a communication device comprising a protocol stack (e.g., protocol stack 1402) configured to receive scan results for a plurality of scan target center frequencies including a first and second scan target center frequency, define an ignore region for the first scan target center frequency that includes one or more neighboring center frequencies of the first scan target center frequency, determine whether to include the second scan target center frequency in a search target list based on whether the second scan target center frequency is in the ignore region, and provide the search target list to a cell searcher. Various aspects of this disclosure also provide a communication device including a protocol stack (e.g., protocol stack 1402) configured to receive detection metrics for a plurality of scan target center frequencies as scan results for a frequency scan, rank the plurality of scan target center frequencies according to their detection metrics, while iterating through the ranking of scan target center frequencies, determine whether a current scan target center frequency is in a preceding scan target center frequency's ignore region and determining whether the detection metric of the current scan target center frequency is greater than a predefined threshold, and if the current scan target center frequency is not in a predecessor scan target center frequency's ignore region and its detection metric is greater than the predefined threshold, add the current scan target center frequency to a search target list and defining an ignore region including one or more neighboring center frequencies of the current scan target center frequency. In some aspects, these communication devices can include various other internal components as described above. In some aspects, the communication devices may be configured as an integrated circuit component for a terminal device, while in other aspects the wireless communication device may include, for example, a radio transceiver and one or more antennas and may be configured as a terminal device.

The 3GPP standard also uses the concept of coverage classes for NB-IoT terminal devices. For example, the 3GPP specifies predefined coverage classes for NB-IoT: enhanced coverage levels 0, 1, 2, and 3. NB-IoT terminal devices with enhanced coverage level 0 are those operating in normal radio conditions, while enhanced coverage classes 1-3 may be for NB-IoT terminal devices in progressively worse radio conditions. NB-IoT assigns different transmit powers and transmit repetition counts for transmissions for each coverage class, where NB-IoT terminal devices with enhanced coverage level 3 will have the most repetitions and highest transmit powers (which can help compensate for the poor radio conditions). Other radio access technologies may use similar concepts to these NB-IoT coverage classes, such as any predefined framework where terminal devices are assigned to different predefined classes based on their coverage conditions.

Depending on the radio access technology, the selected coverage class can influence various behaviors of the terminal devices. For example, the coverage class of a given terminal device can dictate how many repetitions are used for transmitting and receiving data to and from the terminal device. In the exemplary case of NB-IoT, an NB-IoT terminal device can receive downlink data with up to 2048 repetitions and transmit uplink data with up to 128 repetitions, where the number of repetitions can be configured depending on its coverage class. Terminal devices can also be configured to select their uplink transmit power based on coverage class, where terminal devices in worse coverage classes can be configured to use higher uplink transmit powers than terminal devices in better coverage classes. Terminal devices can also use coverage classes to dictate internal processing functions, such as a number of frames used for aggregation when performing cell search (as previously described above for detection of synchronization signals in cell search). Depending on the particular radio access technology, some of these coverage class-related features can be standardized while others can be proprietary.

In the exemplary case of NB-IoT, a terminal device may select its coverage class based on reception metrics. A terminal device that has not yet connected to the network may perform coverage class evaluation before performing a random access procedure (e.g., before selecting radio resources for the Narrowband Physical Random Access Channel (NPRACH)). For example, a terminal device may perform this coverage class evaluation by performing a Received Signal Strength Power (RSRP) measurement and then selecting its coverage class based on the RSRP measurement. In an example using NB-IoT, if the RSRP is below a lowest threshold, the terminal device may select the enhanced coverage level 3. If the RSRP is above the lowest threshold but second-lowest threshold, the terminal device may select enhanced coverage level 2. If the RSRP is above the second-lowest threshold but lower than a third-lowest threshold, the terminal device may select the enhanced coverage level 1. Finally, if the RSRP is above the third-lowest threshold, the terminal device may select enhanced coverage level 0. This framework can be expanded to other implementations (such as for other radio access technologies, including future variations on NB-IoT) that have different numbers of coverage cases and/or a different reception metric for coverage class evaluation.

After selecting the coverage class, the terminal device may select its transmit parameters to use for random access. This can include selecting a transmit power and/or selecting a transmit repetition count (in other words, transmit parameters including transmit power and/or a transmit repetition count). In some cases, the terminal device may select its transmit power according to the selected coverage class, where more extreme coverage classes may correspond to higher transmit powers. There may also be additional constraints that govern transmit power selection for terminal devices. For example, if there are customized power reductions related to customer or vendor requirements (as further discussed below), the terminal device may be expected to reduce its transmit power accordingly. With respect to transmit reception count, the terminal device may also be configured to select its transmit repetition count according to the selected coverage class. For example, the terminal device can select higher transmit repetition counts for more extreme coverage classes.

After selecting its transmit parameters, the terminal device may select random access resources and transmit a random access preamble on the random access resources using the selected transmit power and/or selected transmit repetition count. If the selected transmit power and/or transmit repetition count is sufficient, the target cell may receive and detect the random access preamble, thus allowing the terminal device to connect to the network. In cases where the selected transmit repetition count is greater than one, the terminal device may select multiple random access occasions (e.g., equal in number to the transmit repetition count) and transmit the random access preamble in each of the multiple random access occasions. The target cell may then receive and aggregate over the multiple random access occasions to detect the random access preamble.

However, problems can occur when the selected transmit power and/or transmit repetition count are too low, as the target cell may not be able to detect the random access preamble. The terminal device may then need to repeat the random access procedure. In particular in extreme coverage conditions, this can have a considerable penalty in terms of wasted time (e.g., seconds or tens of seconds) and associated battery drain.

Transmit power and transmit repetition count for uplink can also be problematic when the terminal device is connected to the network. For example, there may be maximum power reductions (MPR) that the terminal device is expected to use to reduce its transmit power. In the exemplary case of NB-IoT, the 3GPP has provided these MPRs to control leakage to adjacent bands, where terminal devices may reduce their uplink transmit power according to an MPR and thus reduce excessive interference into nearby frequency ranges. Depending on the radio access technology, there may be an MPR table that specifies MPRs for different carrier frequencies and uplink allocations. Accordingly, when a terminal device is performing uplink transmissions on a particular carrier frequency and with a particular uplink allocation (e.g., assigned by the network), the terminal device can check the MPR table to determine what MPR is assigned to the carrier frequency and uplink allocation. The terminal device can then reduce its transmit power for the uplink transmissions according to the MPR.

As introduced above, there can also be customized power reductions. These customized power reductions can be specified by a customer or vendor (e.g., by an entity other than the standardization body), and can be similarly used by terminal devices. For example, a customized power reduction may specify a universal power reduction that dictates that a terminal device should reduce its transmit power in all situations. In another example, a customized power reduction may specify a conditional power reduction that identifies a particular power reduction that is for used in a particular condition (e.g., on a particular frequency band, for a particular uplink allocation, for certain times or locations, or any other conditional scenario). Similar to MPRs, terminal devices may identify such customized power reductions and reduce their transmit power according to the customized power reduction.

In some cases, terminal devices may apply MPRs and/or customized power reductions to their uplink transmissions and still use sufficient transmit power to reach the network (e.g., enough power for cells to receive and decode the transmissions, potentially aided by transmit repetitions). However, in other cases, the reduced transmit power resulting from the power reductions (e.g., MPRs, customized power reductions, and/or any other power reductions applied to uplink transmit power) may not be sufficient, and the terminal device may be power-limited (i.e., may not have sufficient transmit power to reach the network). This can result in failed transmissions and excessive retransmissions, which in turn wastes time and battery power.

Accordingly, in some aspects, a terminal device may be configured to select its transmit parameters in consideration of potential power reductions. For example, as described below for various aspects of this disclosure, a terminal device can perform a measurement to obtain a reception metric used for coverage class evaluation. The terminal device can then access information that indicates the potential power reductions, and can then reduce the reception metric according to the potential power reductions. The terminal device can then use the reduced reception metric to select its coverage class. As the reduced reception metric is lower than the initial reception metric, the coverage class evaluation may be skewed toward more extreme coverage classes. Accordingly, when the terminal device selects transmit parameters (e.g., transmit power and/or transmit repetition count) using the selected coverage class, the transmit powers and/or transmit repetition counts may be higher than the transmit powers and/or transmit repetition counts that would have been selected if using the initial reception metric. In some cases, this compensating boost to transmit power and/or the increase to transmit repetition count can reduce the occurrence of random access failures and/or power-limited scenarios.

Figure 21:
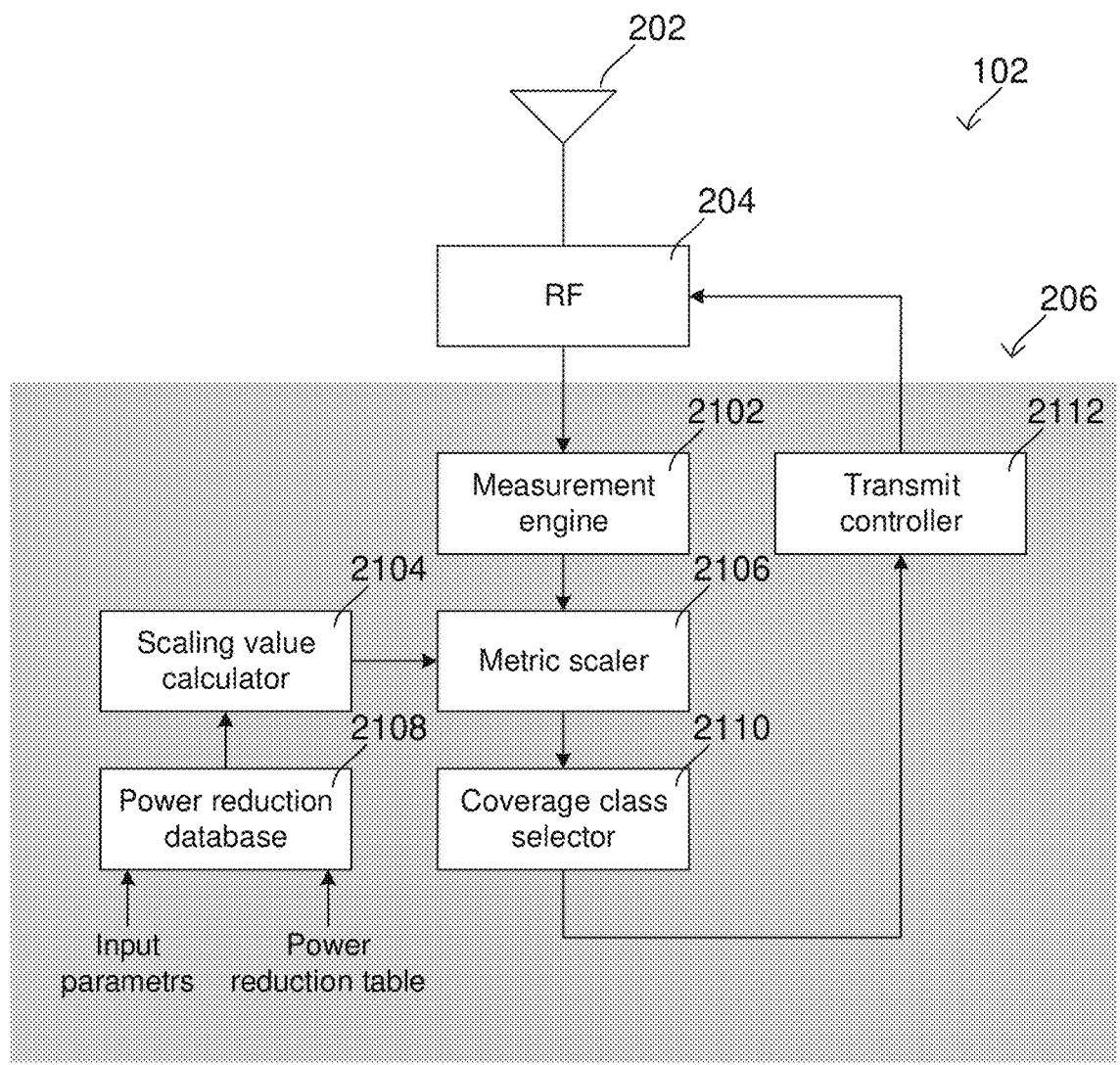
FIG. 21 shows an exemplary internal configuration of a terminal device for performing transmit parameter selection according to some aspects.

FIG. 21 shows an exemplary internal configuration of terminal device 102 according to some aspects. As shown in FIG. 21, terminal device 102 may include antenna system 202, RF transceiver 204, and baseband modem 206, which may be configured in the manner described above for terminal device 102 in FIG. 2.

FIG. 21 also depicts various internal components of baseband modem 206, including measurement engine 2102, scaling value calculator 2104, metric scaler 2106, power reduction database 2108, coverage class selector 2110, and transmit controller 2112. The exemplary depiction of baseband modem 206 shown in FIG. 21 is focused on the components of baseband modem 206 related to transmit parameter selection as introduced above. Baseband modem 206 can therefore include various additional components. Furthermore, as discussed above regarding FIG. 2, baseband modem 206 may include digital signal processor 208 and controller 210. The components of baseband modem 206 shown in FIG. 21 can therefore be internal components of digital signal processor 208 (e.g., physical layer components) or can be internal components of controller 210 (e.g., protocol stack components), but are not expressly limited to being either physical layer or protocol stack components.

Each of measurement engine 2102, scaling value calculator 2104, metric scaler 2106, power reduction database 2108, coverage class selector 2110, and transmit controller 2112 may be structurally realized as hardware (e.g., as one or more digitally-configured hardware circuits, such as ASICs, FPGAs, or another type of dedicated hardware circuit), as software (e.g., one or more processors configured to retrieve and execute program code that defines arithmetic, control, and/or I/O instructions and is stored in a non-transitory computer-readable storage medium), or as a mixed combination of hardware and software. The hardware and/or algorithmic structure of each of ML detector 902, channel estimator (CE) 904, spectrum analyzer 906, selector 908, and demapper 910 is detailed in full in the following descriptions. While measurement engine 2102, scaling value calculator 2104, metric scaler 2106, power reduction database 2108, coverage class selector 2110, and transmit controller 2112 are shown separately in FIG. 21, this depiction generally serves to highlight the operation of baseband modem 206 on a logical level. In some aspects, measurement engine 2102, scaling value calculator 2104, metric scaler 2106, power reduction database 2108, coverage class selector 2110, and transmit controller 2112 can therefore each be implemented as separate hardware and/or software components. In other aspects, multiple of measurement engine 2102, scaling value calculator 2104, metric scaler 2106, power reduction database 2108, coverage class selector 2110, and transmit controller 2112 can be combined into a unified hardware and/or software component (for example, a hardware-defined circuitry arrangement including circuitry to perform multiple functions, or a processor configured to execute program code that defines instructions for multiple functions). In some aspects, measurement engine 2102, scaling value calculator 2104, metric scaler 2106, power reduction database 2108, coverage class selector 2110, and transmit controller 2112 may each be a separate instruction set that collectively form an overall algorithm that each includes instructions defining their respective functionality in software logic. One or more processors of baseband modem 206 may then realize their respective functionality by executing their corresponding instruction sets.

Figure 22:
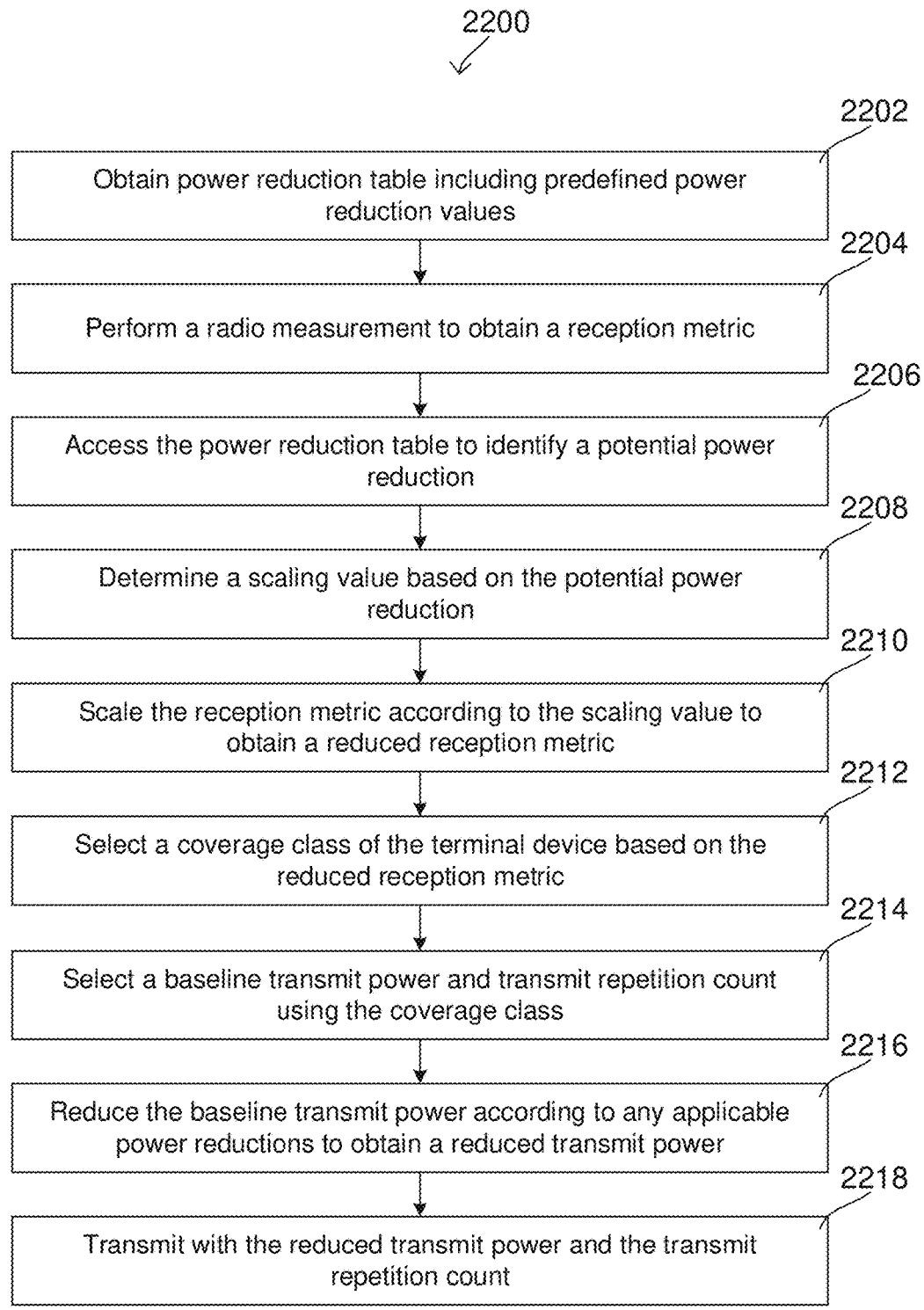
FIG. 22 shows an exemplary flow chart for selecting transmit powers and transmit repetition counts according to some aspects.

FIG. 22 shows exemplary flow chart 2200 according to some aspects. Flow chart 2200 describes the procedure used by terminal device 102 to select coverage classes and/or transmit parameters based on potential power reductions. As shown in FIG. 22, terminal device 102 may first obtain a power reduction table including predefined power reductions in stage 2202. The power reduction table may include a plurality of power reductions each associated with one or more parameters. For example, each of the plurality of power reductions can be associated with a carrier frequency and an uplink allocation, where the power reduction matched with a particular carrier frequency-uplink allocation pair gives the power reduction expected for terminal devices operating with on the carrier frequency with the uplink allocation.

FIG. 23 shows exemplary power reduction table 2300 according to some aspects. In the exemplary context of FIG. 23, the power reductions of power reduction table 2300 are indexed according to carrier frequency (ranging from carrier frequencies $f_1$-$f_8$) and uplink allocation (ranging from uplink allocations $UL_1$-$UL_4$). Each carrier frequency can be a predefined carrier frequency for a radio access technology (for example, an EARFCN), and each uplink allocation can be a set of radio resources that are assignable to terminal devices.

The entries of power reduction table 2300 include power reductions (e.g., expressed in dB), and can be MPRs, customized power reductions, or a combination of MPR and customized power reductions. Terminal device 102 may be configured to select its transmit power using power reduction table 2300. For example, if terminal device 102 is transmitting on carrier frequency $f_3$ and is assigned uplink allocation $UL_4$, terminal device 102 may apply a power reduction of −16 dB to its transmit power. Terminal device 102 may similarly select and apply power reductions according to the parameter used for indexing power reduction table 2300.

With reference to FIG. 22 and stage 2202, power reduction database 2108 may be the component of terminal device 102 that obtains the power reduction table in stage 2202. In some aspects, power reduction database 2108 may obtain the power reduction table by receiving it from an external location, such as from a network access node or a core network server. In these cases, terminal device 102 may wirelessly receive the power reduction table as wireless signals (via RF transceiver 204 and antenna system 202), and may then store the power reduction table in power reduction database 2108.

In other aspects, the power reduction table may be pre-installed into power reduction database 2108, such as by loading the power reduction table into its local memory during manufacture.

In other aspects, power reduction database 2108 may be configured to obtain the power reduction table in stage 2202 by determining the power reductions of the power reduction table. This can be a one-time process, where power reduction database 2108 calculates the power reduction table one time and then stores the power reduction table in a memory. For example, there may be predefined MPRs that are defined by a standardization entity and that give a power reduction for certain parameters (e.g., carrier frequencies and uplink allocations). There may additionally or alternatively be customized power reductions that similarly give a power reduction for certain parameters. In some aspects, power reduction database 2108 may be configured to generate the power reduction table using this information, such as by taking the MPRs and the customized power reductions (which can be wirelessly received and/or preinstalled into power reduction database) and combining this information to obtain the power reduction table. For example, this can include identifying MPRs and customized power reductions that have matching parameter sets (e.g., the same carrier frequency and uplink allocation), and determining a power reduction based on the MPR and customized power reductions, and then entering the power reduction in the entry of the power reduction table for the corresponding parameter set.

In some aspects, power reduction database 2108 may have certain spurious requirements, safety requirements, or other customer requirements that define the customized power reduction. Power reduction database 2108 may therefore be configured to calculate the customized power reductions from this information, and then to determine the power reduction table based on these customized power reductions. While MPRs may in some cases be standardized and thus provided to power reduction database 2108 by an external location or reinstallation, in some aspects power reduction database 2108 may also be configured to calculate the MPRs for use in determining the power reduction table.

Power reduction database 2108 may therefore obtain the power reduction table in stage 2202. Then, measurement engine 2102 may perform a radio measurement to obtain a reception metric in stage 2204. For example, in some aspects measurement engine 2102 may be configured to receive baseband data (e.g., IQ samples) from RF transceiver 204, and to then process the baseband data to perform the radio measurement and obtain the reception metric. In some aspects, the reception metric may be a signal strength metric, such as an RSRP measurement. Measurement engine 2102 may then provide the reception metric to metric scaler 2106.

Power reduction database 2108 may then access the power reduction table to identify a potential power reduction in stage 2206. As shown in FIG. 21, power reduction database 2108 may receive one or more input parameters in stage 2108. The input parameters may correspond to the parameters that are used to index the power reductions in the power reduction table, and therefore may identify one or more power reductions (e.g., those power reductions that are indexed by the input parameters in the power reduction table).

There exist several different ways that power reduction database 2108 can be configured to identify the potential power reduction. For example, in some cases terminal device 102 may know the carrier frequency a priori (for example, per an earlier carrier selection procedure), and therefore may be able to use the carrier frequency as an input parameter to narrow down the potential power reductions. However, terminal device 102 may not know the uplink allocation a priori, and in many cases the uplink allocation can be dynamically assignable (e.g., where the network dynamically assigns different uplink allocations to terminal devices over time). Accordingly, while terminal device 102 may be able to identify a subset of the power reductions in the power reduction table with the carrier frequency (e.g., a particular row in the example of FIG. 23), terminal device 102 may not be able to identify a single power reduction from the power reduction table with certainly. While the example of power reductions indexed by carrier frequency and uplink allocation, other radio access technologies and/or applications may involve similar scenarios where a single power reduction is not deterministically identifiable a priori. These techniques may similarly apply in these cases.

Accordingly, in some aspects power reduction database 2108 may be configured to select a subset of the power reductions based on the input parameters (e.g., carrier frequency), and to then identify the potential power reduction based on the subset of the power reductions in stage 2206. For example, power reduction database 2108 may be configured to select a subset of the power reductions that are indexed by the input parameter. As described immediately below, power reduction database 2108 may then be configured to select one of the subset of power reductions as the potential power reduction, or may then be configured to determine the potential power reduction as a combination of the subset of power reductions.

For example, in some aspects power reduction database 2108 may be configured to select the lowest of the subset of power reductions as the potential power reduction. In an example using power reduction table 2300, the input parameters may indicate that terminal device 102 is operating on carrier frequency $f_5$, but may not indicate the uplink allocation (as it is not yet known or is dynamically assignable and thus subject to change). Power reduction database 2108 may then select the power reductions indexed by carrier frequency $f_5$, i.e. the row {−16, −20,−16,−10} as the subset of power reductions. Power reduction database 2108 may then be configured to identify the lowest of the subset of power reductions (in absolute terms), e.g., −10 (corresponding to uplink allocation $UL_4$), and then select this lowest power reduction as the potential power reduction.

As this potential power reduction will be used to reduce the reception metric before selecting a coverage class, selecting the lowest of the subset of power reductions as the potential lower reduction can be advantageous. If a terminal device doesn't consider applicable power reductions when selecting coverage classes, it could select a coverage class with a transmit power and/or transmit repetition count that, once the transmit power is reduced according to the applicable power reductions, is too low for the terminal device to reach the network. As terminal device 102 in this example knows that it will be transmitting on carrier frequency $f_5$, it can determine that the power reduction will be at least −10 dB. In other words, the applicable power reduction (the one that is actually applied once the uplink allocation is known) could be any of −16, −20, −16, or −10 dB, but it will at a minimum be −10 dB. By selecting the lowest of the subset of power reductions, terminal device 102 may consider the minimum power reduction that could be used as the applicable power reduction. Selecting the minimum power reduction can therefore be a realistic estimation without being overly pessimistic (as it would be the minimum reduction to the maximum transmit power of terminal device 102).

In some aspects where power reduction database 2108 is configured to always select the lowest power reduction from the subset of power reductions, power reduction database 2108 may be configured to only store the lowest power reductions for each carrier frequency. For example, power reduction database 2108 may be configured to identify the lowest power reduction for each carrier frequency in the power reduction table, and to only store these power reductions (as they are selected each time regardless of uplink allocation).

In other aspects, power reduction database 2108 may be configured to select a different power reduction from the subset of power reductions as the potential power reduction. For example, power reduction database 2108 may select the highest power reduction (e.g., −20 dB) in the example above. This can therefore result in terminal device 102 considering the maximum power reduction (that could be used as the applicable power reduction) when selecting its coverage class and corresponding transmit parameters. This can decrease the likelihood that terminal device 102 will be power-limited, but in some cases could result in terminal device 102 using an inappropriately high transmit power (which could result in interference or safety concerns)

and/or inappropriately high transmit repetition counts (which can be time-consuming).

In other aspects, power reduction database 2108 may be configured to identify a median-valued power reduction from the subset of power reductions as the potential power reduction. In the example introduced above, power reduction database 2108 may therefore identify −16 dB as the median-valued power reduction, and may then use the median-valued power reduction as the potential power reduction.

In other aspects, power reduction database 2108 may be configured to determine the potential power reduction from the subset of the power reductions. For example, power reduction database 2108 may be configured to calculate the mean of the subset of the potential power reductions, and to use the mean as the potential power reduction. In the example of power reduction table 2300, power reduction database 2108 may be configured to calculate the mean (using the subset of power reductions indexed by the index parameter, e.g., the row for $f_5$) as $(-16-20-16-10)/4 = -15.5$ dB, and to then use this mean as the potential power reduction.

In other aspects, power reduction database 1208 may be configured to use other information indicated by the input parameters to identify the potential power reduction. For example, in some aspects the input parameters can include historical statistical information about the other input parameters that identify corresponding power reductions. For example, continuing with the prior example using carrier frequency and uplink allocation as the input parameters for identifying power reductions, the input parameters can also include historical statistical information about past uplink allocations. This can include, for example, probability values for each uplink allocation that indicate the historical probability that each uplink allocation will be assigned, or some other historical statistical information that indicates a likelihood of the various uplink allocations being assigned based on past assignments. In some aspects, this historical statistical information can be cell-specific (e.g., unique to the cell that terminal device 102 is transmitting to), frequency specific (e.g., unique to the carrier frequency), network-specific (e.g., unique to the network that terminal device 102 is transmitting on), or can be otherwise associated with some specific criteria. If so, power reduction database 2108 can identify the appropriate historical statistical information based on the relevant criteria, and then use the identified historical statistical information as part of the input parameters. Power reduction database 2108 may obtain this historical statistical information by monitoring uplink allocations (or any other relevant input parameter that is probabilistically unknown) to develop the historical statistical information, or by receiving the historical statistical information from an external location (e.g., any server that stores such information).

In some aspects, power reduction database 2108 may use such historical statistical information to calculate a weighted average of the subset of power reductions (e.g., by weighting each of the subset of power reductions by a weight corresponding to a probability value assigned to it, and then calculating an average of the weighted power reductions), and to use the weighted average as the potential power reduction. In other aspects, power reduction database 2108 may be configured to select the power reduction from the subset of the power duction values that has the highest probability value as the potential power reduction.

In some aspects, power reduction database 2108 may separately consider MPRs and customized power reductions when identifying the potential power reduction in stage 2206. For example, in some aspects the power reduction table may be a table of MPRs that are dependent on input parameters (e.g., carrier frequency and uplink allocation), while there are also customized power reductions that are not dependent on any particular input parameters (e.g., customized power reductions that are applicable regardless of carrier frequency and/or uplink allocation). Accordingly, power reduction database 2108 may first be configured to identify the subset of power reductions (e.g., MPRs) based on the input parameters. Power reduction database 2108 may then select the potential power reduction as the maximum of: (a) the minimum MPR of the subset of power reductions, and (b) customized power reduction. This can be mathematically expressed as max(min(MPR), customized power reduction). The minimum MPR of the subset of power reductions may be the absolute minimum MPR that is guaranteed to be applicable (e.g. for a given carrier frequency), while the customized power reduction is also guaranteed to be applicable. Accordingly, selecting this maximum as the potential power reduction may in practice be selecting the minimum power reduction that is guaranteed to be applicable.

As described for the above aspects, there exist various different ways that power reduction database 2108 can identify the potential power reduction in stage 2206. Any of these or similar techniques are considered within the scope of this disclosure.

After power reduction database 2108 identifies the potential power reduction in stage 2206, power reduction database 2108 may provide the potential power reduction to scaling value calculator 2104. Scaling value calculator 2104 may then determine a scaling value with which to scale the reception metric (obtained by measurement engine 2102 in stage 2204). As previously introduced, terminal device 102 may scale the reception metric to compensate for applicable power reductions enforced at a later time, where scaling of the reception metric can result in selection of a coverage class with a higher transmit power (in other words, a corresponding compensating boost to transmit power) and/or a higher transmit repetition count. The size of the scaling value (e.g., the amount that the reception metric is reduced) can be proportional to the size of the potential power reduction, or in other words, higher potential power reductions (in absolute terms) can yield larger scaling values (and vice versa for lower potential power reductions).

In some aspects, scaling value calculator 2104 may be configured to determine the scaling value according to an equation. In one example, scaling value calculator 2104 may be configured to calculate a scaling value $P_{txcomp}$ based on the power class transmit power assigned to terminal device 102. For example, in the case of 3GPP standards, there may be a preassigned power class, out of a plurality of predefined power classes, designated for terminal device 102. Each of the predefined power classes may be matched with a power class transmit power that specifies the permissible transmit power by terminal devices assigned to the predefined power class. This power class transmit power assigned to terminal device 120 can be defined as $P_{powerclass}$, and can be provided to scaling value calculator 2104 (e.g., by the protocol stack running on terminal device 102).

Defining the potential power reduction $P_{power\_reduction}$, the potential maximum power can be denoted as $P_{cmax\_estimated} = P_{powerclass} - P_{power\_reduction}$. Scaling value calculator 2104 may then be configured to determine the scaling value $P_{txcomp}$ as $P_{txcomp} = P_{powerclass} - P_{cmax\_estimated}$.

Scaling value calculator 2104 may then provide $P_{txcomp}$ to metric scaler 2106 as the scaling value.

After receiving the scaling value, metric scaler 2106 may then scale the reception metric according to the scaling value to obtain a reduced reception metric in stage 2210. For example, in some aspects metric scaler 2106 may be configured to subtract the scaling value from the reception metric, and use the resulting difference as the reduced reception metric. In other aspects, depending on how the scaling value is calculated, metric scaler 2106 may be configured to divide (assuming the scaling value is greater than 1) or multiply (assuming the scaling value is less than 1) the reception metric by the scaling value. Regardless of which configuration is used, metric scaler 2106 may be configured to scale the reception metric according to the scaling value to obtain a reduced reception metric in stage 2210.

Metric scaler 2106 may then be configured to provide the reduced reception metric to coverage class selector 2110. Coverage class selector 2110 may then perform a coverage class evaluation in stage 2212 to select a coverage class of terminal device 102 based on the reduced reception metric. In some aspects, this can be based on a set of predefined thresholds, where each of the predefined thresholds is associated with a predefined coverage class (out of a plurality of coverage classes specified by the particular standard, e.g., three coverage classes for NB-IoT). For example, coverage class selector 2110 may be configured to compare the reduced reception metric to each of the set of predefined thresholds, and to identify the lowest of the predefined thresholds that the reduced reception metric is less than. Coverage class selector 2110 may then identify the predefined coverage class associated with the identified threshold, and select the predefined coverage class as the coverage class for terminal device 102. Stated generally, coverage class selector 2110 may be configured to compare the reduced reception metric to some predefined criteria (e.g., a set of predefined thresholds) to determine which predefined coverage class corresponds to the reduced reception metric.

Coverage class selector 2110 may be configured to then indicate the coverage class to transmit controller 2112. As shown in FIG. 21, transmit controller 2112 may be configured to provide control signals to RF transceiver 204, which may control the transmit power that RF transceiver 204 uses to transmit wireless signals via antenna system 202. Accordingly, after receiving the coverage class from coverage class selector 2110, transmit controller 2112 may be configured to select a baseline transmit power based on the coverage class in stage 2214. The baseline transmit power can be, for example, the maximum transmit power available for terminal device 102 to use. Transmit controller 2112 may also be configured to select a transmit repetition count based on the coverage class in stage 2214, which the protocol stack of terminal device 102 may use to govern the number of times transmissions are repeated.

Terminal device 102 may then begin using the baseline transmit power and transmit repetition count for uplink transmissions. For example, where each individual uplink transmission can have variable power, all transmissions may still be governed by the baseline transmit power, such as by using the baseline transmit power as a maximum transmit power constraint. The protocol stack of terminal device 102 may use the transmit repetition count to govern how many times transmissions are performed. This can include transmission of random access preambles and/or of uplink data when connected to the network.

During operation, scenarios may arise in which terminal device 102 is expected to reduce its transmit power. For example, when the protocol stack of terminal device 102 receives an uplink allocation (or a series of uplink allocations over time), transmit controller 2112 may be expected to reduce the baseline transmit power according to the MPR assigned to the uplink allocation (along with the corresponding carrier frequency). Depending on the particular application, other scenarios can also occur that will prompt transmit controller 2112 to reduce its baseline transmit power.

Accordingly, in such cases transmit controller 2112 may reduce the baseline transmit power according to an applicable power reduction to obtain a reduced transmit power in stage 2216. Terminal device 102 may then transmit with the reduced transmit power and the transmit repetition count in stage 2218.

In some cases, the compensation effects of reducing the reception metric may reduce the probability that terminal device 102 becomes power-limited when transmitting in stage 2218. For example, the reduction of the reception metric may prompt coverage class selector 2110 to select a 'worse' coverage class than in the case of the original reception metric. This can in turn cause transmit controller 2112 to select a higher baseline transmit power (e.g., may yield a compensating boost) and/or to select a higher transmit repetition count. Accordingly, even when transmit controller 2112 reduces the baseline transmit power in stage 2216, the earlier compensating boost to the baseline transmit power and/or the increased transmit repetition count may counteract the reduction. Furthermore, as power reduction database 2108 and scaling value calculator 2104 determined the scaling value based on the potential power reduction in stages 2206 and 2208, the compensating boost to the baseline transmit power and/or the increase in transmit repetition count may be commensurate to the actual applicable power reductions applied to terminal device 102b in stage 2216. Instead of blindly increasing the baseline transmit power and/or the transmit repetition count, terminal device 102 may therefore apply reasonable predictions about applicable power reductions to boost the baseline transmit power or transmit repetition count. This can therefore both reduce the occurrence of power-limited scenarios while reducing scenarios where terminal device 102 transmits with an inappropriately high transmit power or inappropriately high transmit repetition count.

In some aspects, terminal device 102 may be configured to use this transmit parameter selection for only a subset of the possible coverage classes. For example, there may be a very high penalty in terms of delay if there is a random access failure when terminal device 102 is in extreme coverage conditions. Accordingly, in some aspects metric scaler 2106 may be configured to scale the reception metric only when the reception metric is less than a predefined threshold. For example, metric scaler 2106 may be configured to compare the reception metric to the predefined threshold, and to exclusively scale the reception metric by the scaling value when the reception metric is less than the predefined threshold. In some aspects, the predefined threshold may be equal to the predefined threshold matched with a particular coverage class. Accordingly, metric scaler 2106 would only scale the reception metric when terminal device 102 is in the particular coverage class, and would otherwise provide the original reception metric to coverage class selector 2110/transmit controller 2112. The coverage class could be, for example, the extreme coverage class (e.g., the coverage class defined by the lowest threshold).

Figure 25:
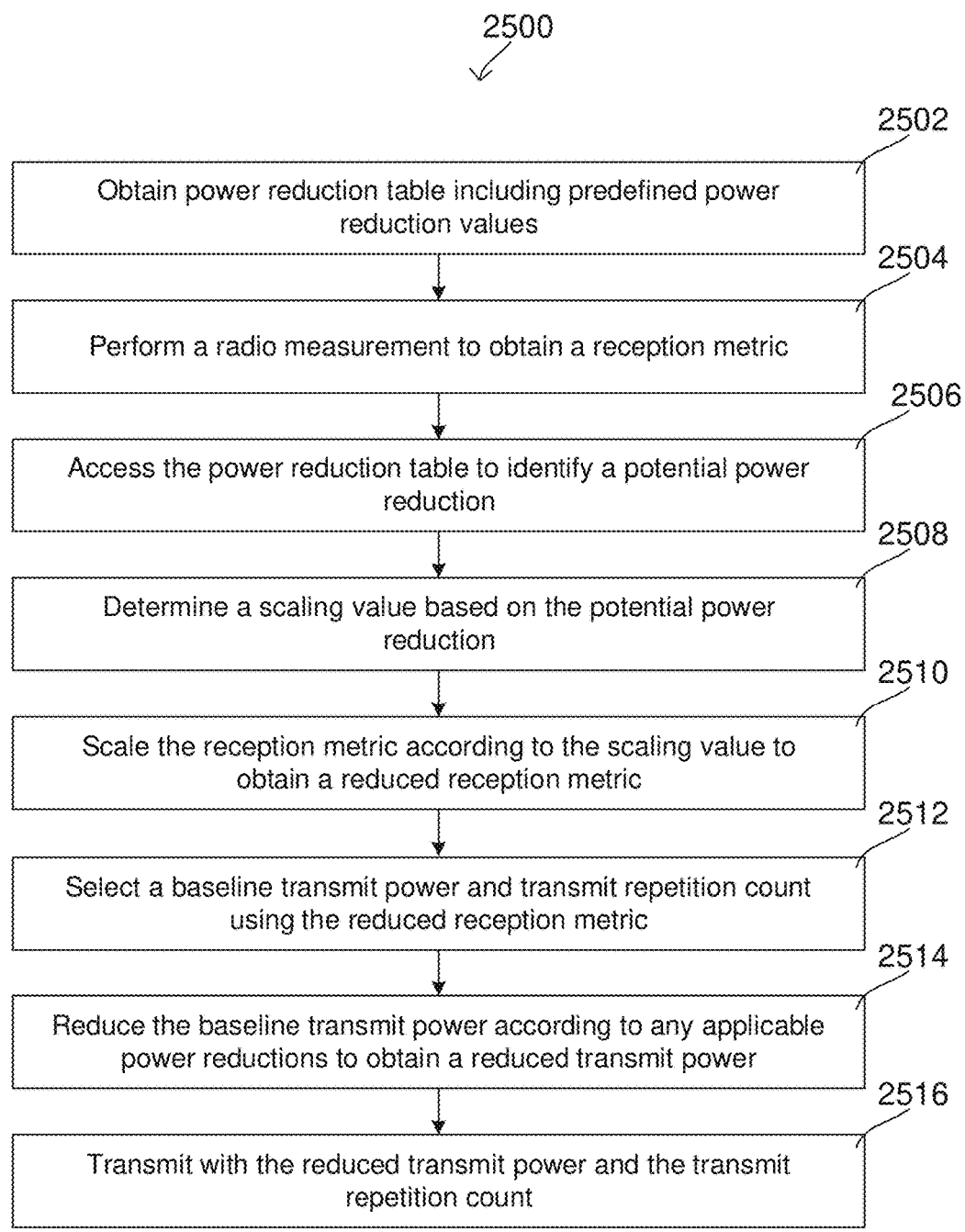
FIG. 25 shows an exemplary flow chart for selecting transmit powers and transmit repetition counts according to some aspects.
Figure 26:
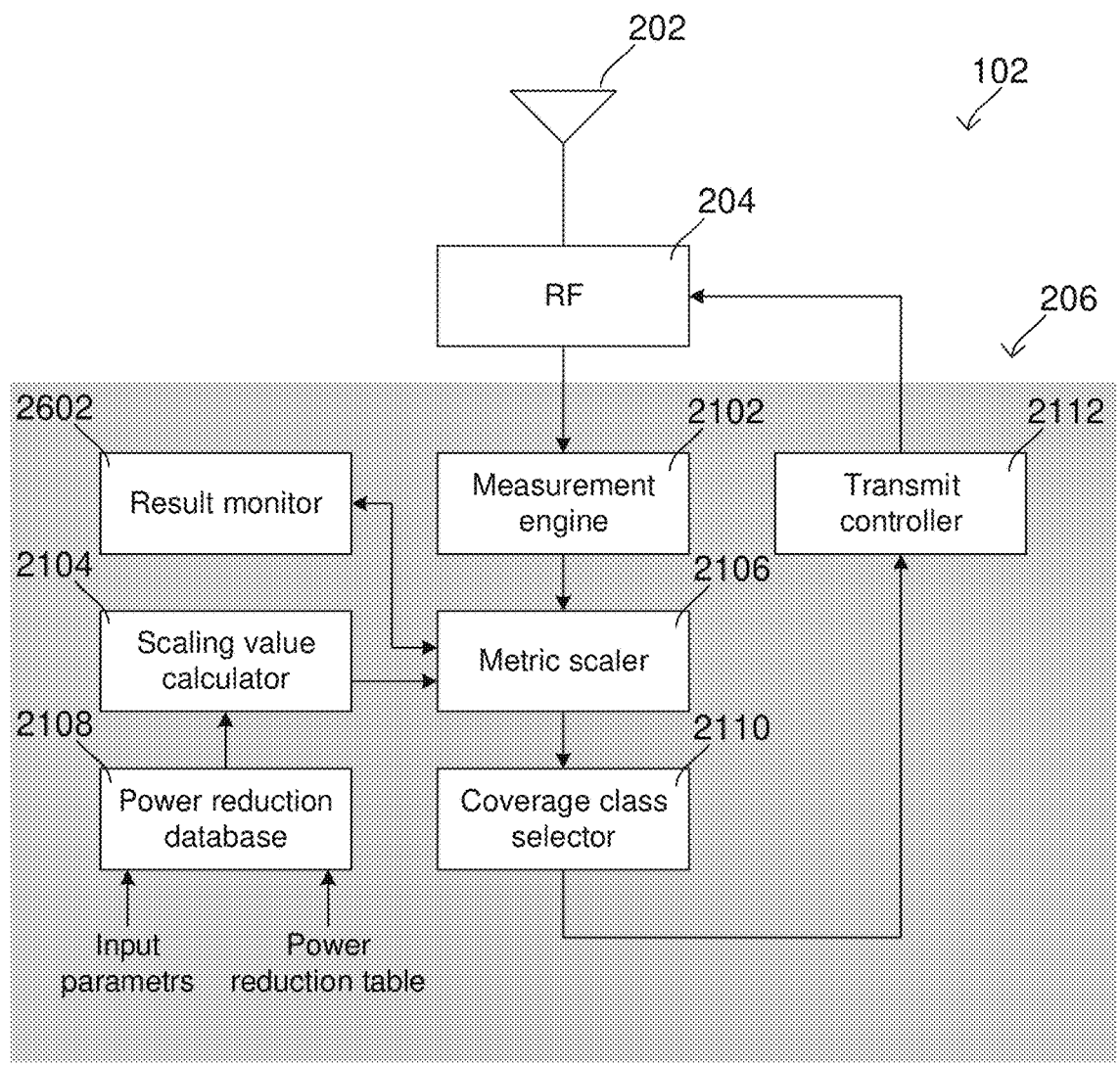
FIG. 26 shows an exemplary internal configuration of a terminal device for performing transmit parameter selection according to some aspects.

In some aspects, terminal device 102 may be configured to selectively apply this transmit parameter selection to certain cells based on past experience. FIG. 26 shows another exemplary internal configuration of terminal device 102 according to some aspects. As shown in FIG. 26, baseband modem 206 may additionally include result monitor 2602. In some aspects, result monitor 2602 may also be included in the configuration of baseband modem 206 shown in FIG. 25. Result monitor 2602 can be implemented as digital hardware circuitry (configured with digital logic that defines the functionality described below) and/or as a processor (configured to execute program code that defines the functionality described below). In some aspects, result monitor 2602 can be implemented as a protocol stack component of controller 210.

Result monitor 2602 may be configured to track performance of terminal device 102 over time. For example, in some aspects result monitor 2602 can be configured to identify and document random access failures, such as by storing result data in a memory that documents the random access failure. This can include storing the cell identity of the cell which terminal device 102 was attempting to connect to when the random access failure occurred. In some aspects, result monitor 2602 can additionally or alternatively be configured to identify and document power-limited scenarios, such as by identifying occurrences of uplink transmissions that fail due to insufficient transmit power or transmit repetition count and storing result data in the memory that documents the power-limited scenarios. This can include storing the cell identity of the cell which terminal device 102 was attempting to connect to when the power-limited scenario occurred.

Metric scaler 2106 may then be configured to access result monitor 2602 for result data during operation of terminal device 102. When terminal device 102 attempts to perform a random access procedure with a particular cell, or is in the process of transmitting uplink data to a particular cell, metric scaler 2106 may compare the cell (e.g., according to its cell identity, which the protocol stack of terminal device 102 may provide to metric scaler 2106) to the result data. Metric scaler 2106 may then determine whether the result data indicates that the cell has been associated with transmission failures (e.g., random access or uplink data transmissions). This can include determining, from the result data, whether the cell has been associated with more than a predefined number of transmission failures (where the predefined number can be, for example, zero or any positive integer). If metric scaler 2106 determines that the result data indicates the cell has been associated with transmission failures, metric scaler 2106 may implement the metric scaling of the reception metric to obtain the reduced reception metric. Conversely, if metric scaler 2106 determines that the result data indicates the cell has not been associated with transmission failures, metric scaler 2106 may not implement the metric scaling of the reception metric (and may provide the original reception metric to coverage class selector 2110/transmit controller 2112). Accordingly, in some cases terminal device 102 may selectively apply the transmit parameter selection to cells based on a history of past transmission failures by the cells. This selective application can lead to smarter use of the transmit parameter selection, as terminal device 102 may apply it when appropriate.

Figure 24:
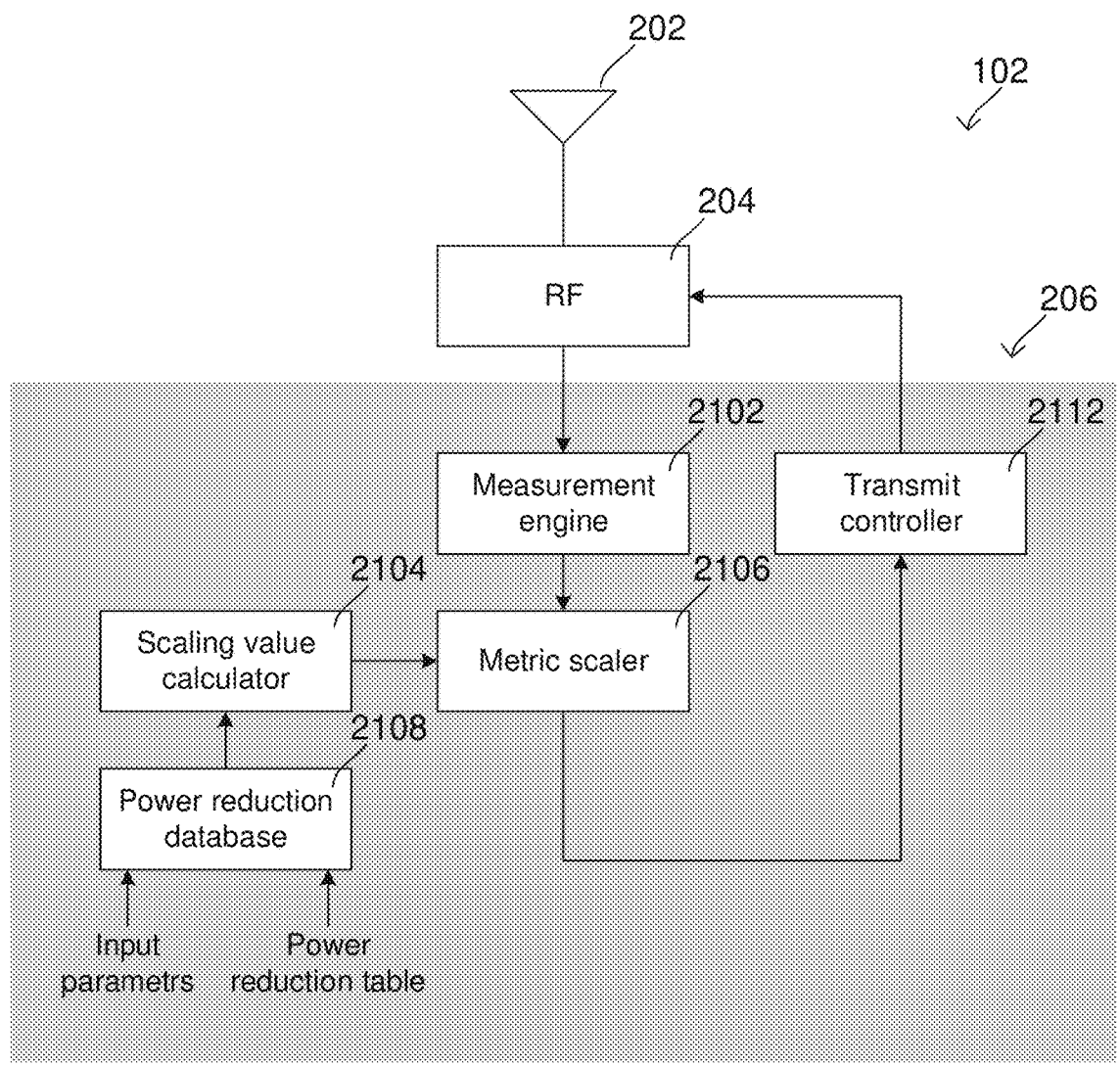
FIG. 24 shows an exemplary internal configuration of a terminal device for performing transmit parameter selection according to some aspects.

As previously indicated, these concepts can be applied to any use case involving selection of transmit powers or transmit repetition counts based on power reductions. This can include cases such as those described above, where a terminal device performs a coverage class evaluation to select a coverage class and selects a transmit power and/or transmit repetition count based on the coverage class. These concepts can also apply to cases where terminal devices do not use coverage classes, and directly select transmit powers and/or transmit repetition counts based on reception metrics. For example, FIG. 24 shows an exemplary configuration of terminal device 102 according to some aspects. As shown in FIG. 24, baseband modem 206 may include measurement engine 2102, scaling value calculator 2104, metric scaler 2106, power reduction database 2108, and transmit controller 2112. In contrast to the case of FIG. 21, baseband modem 206 may not include coverage class selector 2110. Accordingly, instead of being configured to select the baseline transmit power and/or transmit repetition count based on a coverage class, transmit controller 2112 may be configured to directly select the baseline transmit power and/or transmit repetition count based on the reduced reception metric. FIG. 25 shows exemplary flow chart 2500 describing this procedure. Accordingly, while terminal device 102 may perform stages 2502-2510 in the same manner as stages 2202-2210 of FIG. 22, transmit controller 2112 may be configured to select the baseline transmit power and/or transmit repetition count using the reduced reception metric in stage 2512. For example, transmit controller 2112 may be configured to compare the reduced reception metric to a set of predefined thresholds, each matched with a predefined baseline transmit power, and to select the predefined baseline transmit power and/or transmit repetition count matched with the lowest predefined threshold that the reduced reception metric is less than. In another example, transmit controller 2112 may be configured with a transmit power equation that takes a reception metric as input and produces a baseline transmit power as output (where the specifics of the transmit power equation can be uniquely configurable based on the use case). Transmit controller 2112 may additionally or alternatively be configured with a transmit repetition count equation that takes a reception metric as input and produces a transmit repetition count as output.

After selecting the baseline transmit power and/or transmit repetition count in stage 2512, transmit controller 2112 may reduce the baseline transmit power, and control terminal device 102 to transmit with the reduced transmit power and transmit repetition count in stages 2514 and 2516. Accordingly, similarly to the aspects described above for coverage classes, terminal device 102 may give its transmit power a compensating boost in consideration of the applicable power reductions that could be applied. The increase to transmit repetition count can similarly boost the probability of successful transmissions.

Figure 27:
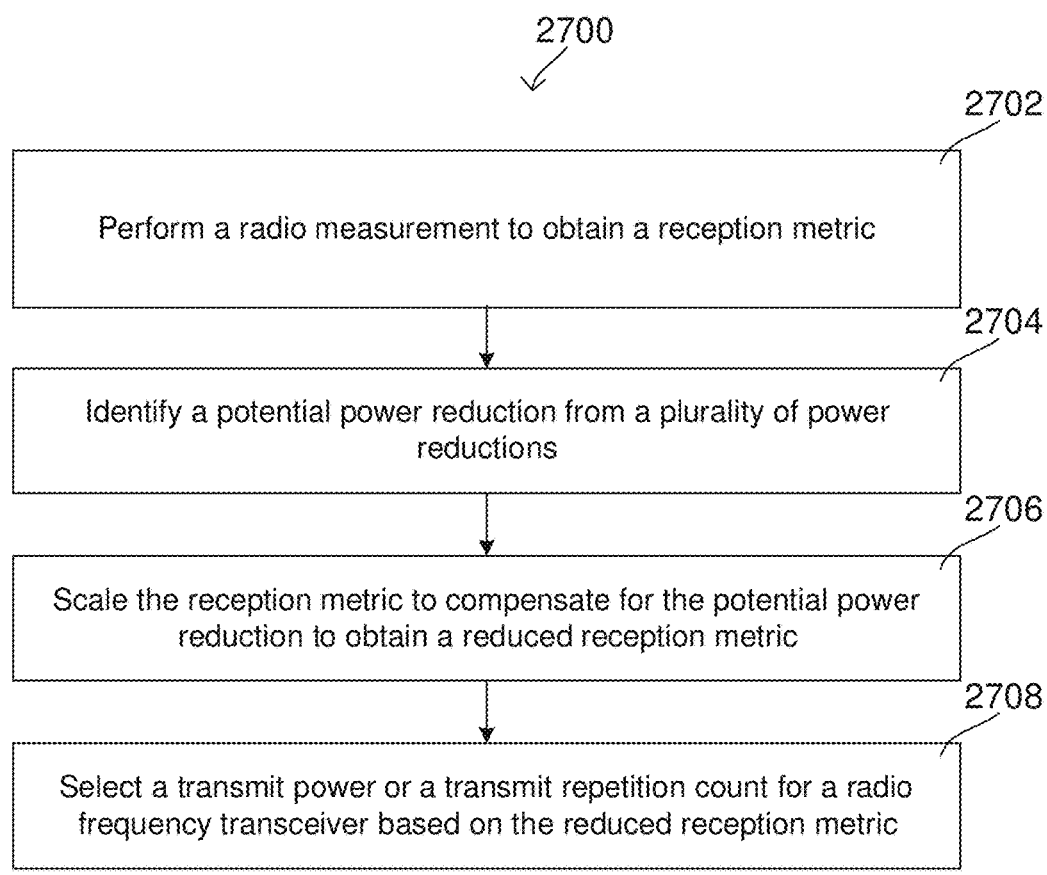
FIG. 27 shows an exemplary method of performing wireless communications at a communication device according to some aspects.

FIG. 27 shows exemplary method 2700 of performing wireless communications at a communication device according to some aspects. As shown in FIG. 27, method 2700 includes performing a radio measurement to obtain a reception metric (2702), identifying a potential power reduction from a plurality of power reductions (2704), scaling the reception metric to compensate for the potential power reduction to obtain a reduced reception metric (2706), and selecting a transmit power or a transmit repetition count for a radio frequency transceiver based on the reduced reception metric (2708).

These transmit parameter selection aspects described herein can be applied to any radio access technology. Although not so limited, these aspects can in particular be applicable to contexts where terminal devices make a decision based on their transmission power capabilities. Additionally, these aspects can be applicable when the terminal device does not have certain knowledge of the specific applicable transmit power reductions that will be applied (e.g., due to the unavailability of specific knowledge about the uplink allocation that will determine the MPR).

The concepts described herein can be incorporated into any procedure performed at terminal devices in which a terminal device uses its transmission power capability without having all of the information regarding the transmission resources (e.g., uplink allocation) that will be assigned to the terminal device. The terminal device can then scale their transmission power down using the techniques described herein (e.g., considering the power reduction for a certain frequency). For example, the terminal device can consider the potential maximum transmit power $P_{cmax\_estimated}$ as part of the scaling value $P_{txcomp}$ during cell selection criterion evaluation.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples pertain to further aspects of this disclosure:

Example 1 is a communication device including a measurement engine configured to perform a radio measurement to obtain a reception metric, a power reduction database configured to identify a potential power reduction from a plurality of power reductions, a metric scaler configured to scale the reception metric to compensate for the potential power reduction to obtain a reduced reception metric, and a transmit controller configured to select a transmit power or a transmit repetition count for a radio frequency transceiver based on the reduced reception metric.

In Example 2, the subject matter of Example 1 can optionally further include the radio frequency transceiver and one or more antennas, and configured as a terminal device.

In Example 3, the subject matter of Example 1 can optionally be configured as a baseband modem for a terminal device.

In Example 4, the subject matter of any one of Examples 1 to 3 can optionally include that the measurement engine is configured to perform a signal strength measurement to obtain the reception metric.

In Example 5, the subject matter of any one of Examples 1 to 4 can optionally include that the power reduction database is configured to identify the potential power reduction by selecting a subset of the plurality of power reductions based on one or more input parameters, and selecting one of the subset of the plurality of power reductions as the potential power reduction or determining the potential power reduction from the subset of the plurality of power reductions.

In Example 6, the subject matter of Example 5 can optionally include that the power reduction database is configured to select one of the subset of the plurality of power reductions as the potential power reduction by identifying a lowest-valued reduction of the subset of the plurality of power reductions, and using the lowest-valued reduction of the subset of the plurality of power reductions as the potential power reduction.

In Example 7, the subject matter of Example 5 can optionally include that the power reduction database is configured to determine the potential power reduction from the subset of the plurality of power reductions by determining a mean value of the plurality of power reductions and using the mean value as the potential power reduction.

In Example 8, the subject matter of any one of Examples 5 to 7 can optionally include that the power reduction database is configured to select the subset of the plurality of power reductions based on one or more input parameters by selecting the subset of the plurality of power reductions by identifying power reductions of the plurality of power reductions that are matched with the one or more input parameters.

In Example 9, the subject matter of Example 5 can optionally include that each of the plurality of power reductions are matched to a carrier frequency and an uplink allocation, and the one or more input parameters include a current carrier frequency of the communication device, and that the power reduction database is configured to select the subset of the plurality of power reductions by selecting the power reductions from the plurality of power reductions that are matched to the carrier frequency.

In Example 10, the subject matter of Example 9 can optionally include that an uplink allocation for the communication device is unknown at the time of the selecting or is dynamically assignable over time.

In Example 11, the subject matter of any one of Examples 1 to 10 can optionally further include a scaling value calculator configured to receive the potential power reduction from the power reduction database, to determine a scaling value based on the potential power reduction, and to provide the scaling value to the metric scaler.

In Example 12, the subject matter of Example 11 can optionally include that the metric scaler is configured to receive the scaling value from the scaling value calculator and to scale the reception metric according to the scaling value to obtain the reduced reception metric.

In Example 13, the subject matter of any one of Examples 1 to 12 can optionally further include a coverage class selector configured to receive the reduced reception metric from the metric scaler, and to select a coverage class for the communication device based on the reduced reception metric, that the transmit controller is configured to select the transmit power or the transmit repetition count for the radio frequency transceiver by selecting a transmit power or a transmit repetition count assigned to the coverage class as the transmit power or the transmit repetition count.

In Example 14, the subject matter of any one of Examples 1 to 13 can optionally include that the transmit controller is further configured to after selecting the transmit power or the transmit repetition count for the radio frequency transceiver, determine an applicable power reduction and reduce the transmit power according to the applicable transmit power to obtain a reduced transmit power, and control the radio frequency transceiver to transmit with the reduced transmit power.

Example 15 is a method of performing wireless communications at a communication device, the method including performing a radio measurement to obtain a reception metric, identifying a potential power reduction from a plurality of power reductions, scaling the reception metric to compensate for the potential power reduction to obtain a reduced reception metric, and selecting a transmit power or a transmit repetition count for a radio frequency transceiver based on the reduced reception metric.

In Example 16, the subject matter of Example 15 can optionally further include transmitting signals with the radio frequency transceiver according to the transmit power or the transmit repetition count.

In Example 17, the subject matter of Example 15 or 16 can optionally include that performing the radio measurement to obtain the reception metric includes performing a signal strength measurement to obtain the reception metric.

In Example 18, the subject matter of any one of Examples 15 to 17 can optionally include that identifying the potential power reduction includes selecting a subset of the plurality of power reductions based on one or more input parameters, and selecting one of the subset of the plurality of power reductions as the potential power reduction or determining the potential power reduction from the subset of the plurality of power reductions.

In Example 19, the subject matter of Example 18 can optionally include that selecting one of the subset of the plurality of power reductions as the potential power reduction includes identifying a lowest-valued reduction of the subset of the plurality of power reductions, and using the lowest-valued reduction of the subset of the plurality of power reductions as the potential power reduction.

In Example 20, the subject matter of Example 18 can optionally include that determining the potential power reduction from the subset of the plurality of power reductions includes determining a mean value of the plurality of power reductions as the potential power reduction.

In Example 21, the subject matter of any one of Examples 18 to 20 can optionally include that selecting the subset of the plurality of power reductions based on one or more input parameters by selecting the subset of the plurality of power reductions includes identifying power reductions of the plurality of power reductions that are matched with the one or more input parameters, and using these power reductions as the subset of the plurality of power reductions.

In Example 22, the subject matter of Example 18 can optionally include that each of the plurality of power reductions are matched to a carrier frequency and an uplink allocation, and the one or more input parameters include a current carrier frequency of the communication device, and that selecting the subset of the plurality of power reductions includes selecting the power reductions from the plurality of power reductions that are matched to the carrier frequency.

In Example 23, the subject matter of Example 22 can optionally include that an uplink allocation for the communication device is unknown at the time of the selecting or is dynamically assignable over time.

In Example 24, the subject matter of any one of Examples 15 to 23 can optionally further include determining a scaling value based on the potential power reduction, where scaling the reception metric to compensate for the potential power reduction includes scaling the reception metric according to the scaling value.

In Example 25, the subject matter of any one of Examples 15 to 24 can optionally further include selecting a coverage class for the communication device based on the reduced reception metric, where selecting the transmit power or the transmit repetition count for the radio frequency transceiver includes selecting a transmit power or a transmit repetition count assigned to the coverage class as the transmit power or the transmit repetition count.

In Example 26, the subject matter of any one of Examples 15 to 25 can optionally further include after selecting the transmit power or the transmit repetition count for the radio frequency transceiver, determining an applicable power reduction and reducing the transmit power according to the applicable transmit power to obtain a reduced transmit power, and controlling the radio frequency transceiver to transmit with the reduced transmit power.

Example 27 is a terminal device including a radio frequency transceiver, one or more antennas, and a baseband modem configured to perform a radio measurement to obtain a reception metric, identify a potential power reduction from a plurality of power reductions, scale the reception metric to compensate for the potential power reduction to obtain a reduced reception metric, and select a transmit power or a transmit repetition count for the radio frequency transceiver based on the reduced reception metric.

In Example 28, the subject matter of Example 27 can optionally include that the baseband modem includes a measurement engine configured to perform the radio measurement to obtain the reception metric, a power reduction database configured to identify the potential power reduction from the plurality of power reductions, a metric scaler configured to scale the reception metric to compensate for the potential power reduction to obtain the reduced reception metric, and a transmit controller configured to select the transmit power or the transmit repetition count for the radio frequency transceiver based on the reduced reception metric.

Example 29 is a communication device including means for performing a radio measurement to obtain a reception metric, means for identifying a potential power reduction from a plurality of power reductions, means for scaling the reception metric to compensate for the potential power reduction to obtain a reduced reception metric, and means for selecting a transmit power or a transmit repetition count for a radio frequency transceiver based on the reduced reception metric.

Example 30 is a non-transitory computer readable medium storing instructions that, when executed by a processor, control the processor to perform the method of any preceding Example.

Example 31 is a non-transitory computer readable medium storing instructions that, when executed by a processor of a terminal device, control the terminal device to perform the method of any preceding Example.

Example 32 is a communication device including a processor, and a memory storing instructions that, when executed by the processor, cause the processor to perform the method of any preceding Example.

Example 33 is a method of performing wireless communications, the method including receiving scan results for a plurality of scan target center frequencies including a first and second scan target center frequency, defining an ignore region for the first scan target center frequency that includes one or more neighboring center frequencies of the first scan target center frequency, determining whether to include the second scan target center frequency in a search target list based on whether the second scan target center frequency is in the ignore region, and providing the search target list to a cell searcher.

In Example 34, the subject matter of Example 33 can optionally further include ranking the plurality of scan target center frequencies according to corresponding detection metrics, where the first scan target center frequency is ranked higher than the second scan target center frequency.

In Example 35, the subject matter of Example 34 can optionally further include defining ignore regions for one or more predecessor scan target center frequencies, including the first scan target center frequency, that have higher detection metrics than the second scan target center frequency, where determining whether to include the second scan target center frequency in the search target list based on whether the scan target frequency is in the ignore region includes determining whether the second scan target center frequency is in the ignore region of any of the one or more predecessor scan target center frequencies, determining whether the detection metric of the second scan target center frequency is greater than a predefined threshold, and including the second scan target center frequency in the search target list if the second scan target center frequency is not in the ignore region of any of the one or more predecessor scan target center frequencies and the detection metric of the second scan target center frequency is greater than the predefined threshold.

In Example 36, the subject matter of Example 34 can optionally include that defining the ignore region includes iterating through the ranking and defining the ignore region once the first scan target center frequency is reached in the ranking, and that determining whether to include the second scan target center frequency in the search target list includes continuing to iterate through the ranking and, when the second scan target center frequency is reached, determining whether the second scan target center frequency is in the ignore region of the first scan target center frequency.

In Example 37, the subject matter of Example 36 can optionally include that determining whether to include the second scan target center frequency in the search target list further includes when the second scan target center frequency is reached, determining whether the detection metric is greater than a predefined threshold.

In Example 38, the subject matter of any one of Examples 34 to 37 can optionally include that each detection metric is a ratio of a peak value to a mean value of a cross-correlation between a target synchronization signal and a baseband signal received on one of the plurality of scan target center frequencies.

In Example 39, the subject matter of any one of Examples 34 to 37 can optionally further include determining the detection metrics as a ratio of a peak value to a mean value of a cross-correlation between a target synchronization signal and a baseband signal received on one of the plurality of scan target center frequencies.

In Example 40, the subject matter of Example 38 or 39 can optionally include that the scan results include the detection metrics.

In Example 41, the subject matter of any one of Examples 34 to 37 can optionally include that each detection metric is an estimated SNR for one of the plurality of scan target center frequencies.

In Example 42, the subject matter of Example 41 can optionally include that the scan results include alpha statistics for the plurality of scan target center frequencies, the method further including determining the estimated SNRs based on the alpha statistics.

In Example 43, the subject matter of Example 33 can optionally further include defining ignore regions for one or more predecessor scan target center frequencies including the first scan target center frequency, where determining whether to include the second scan target center frequency in the search target list based on whether the scan target frequency is in the ignore region includes determining whether the second scan target center frequency is in the ignore region of any of the one or more predecessor scan target center frequencies, determining whether a detection metric of the second scan target center frequency is greater than a predefined threshold, and including the second scan target center frequency in the search target list if the second scan target center frequency is not in the ignore region of any of the one or more predecessor scan target center frequencies and the detection metric of the second scan target center frequency is greater than the predefined threshold.

In Example 44, the subject matter of any one of Examples 33 to 43 can optionally include that the scan results include detection metrics for the plurality of scan target center frequencies, and that the first scan target center frequency has a higher detection metric than the second scan target center frequency.

In Example 45, the subject matter of any one of Examples 33 to 44 can optionally include that the scan results are for a Narrowband Internet of Things (NB-IoT) frequency scan.

In Example 46, the subject matter of any one of Examples 33 to 45 can optionally further include receiving search results from the cell searcher, and selecting a cell to connect to based on the search results.

In Example 47, the subject matter of any one of Examples 33 to 46 can optionally include that defining the ignore region for the first scan target center frequency includes defining the ignore region to include an immediately next higher center frequency of the first scan target center frequency on a predefined channel raster, and to include an immediately next lower center frequency of the first scan target center frequency on the predefined channel raster.

In Example 48, the subject matter of any one of Examples 33 to 46 can optionally include that defining the ignore region for the first scan target center frequency includes defining the ignore region to include a predefined quantity of immediately next higher and immediately next lower center frequencies to the first scan target center frequency on the predefined channel raster.

Example 49 is a communication device including one or more processors configured to receive scan results for a plurality of scan target center frequencies including a first and second scan target center frequency, define an ignore region for the first scan target center frequency that includes one or more neighboring center frequencies of the first scan target center frequency, determine whether to include the second scan target center frequency in a search target list based on whether the second scan target center frequency is in the ignore region, and provide the search target list to a cell searcher.

In Example 50, the subject matter of Example 49 can optionally further include a scan engine configured to perform a frequency scan to obtain the scan results, and to provide the scan results to a protocol stack of the one or more processors.

In Example 51, the subject matter of Example 49 or 50 can optionally further include the cell searcher.

In Example 52, the subject matter of any one of Examples 49 to 51 can optionally be configured as a terminal device and further including a radio frequency (RF) transceiver and one or more antennas.

In Example 53, the subject matter of any one of Examples 49 to 51 can optionally be configured as an integrated circuitry component for a terminal device.

In Example 54, the subject matter of any one of Examples 49 to 53 can optionally include that the one or more processors are further configured to rank the plurality of scan target center frequencies according to corresponding detection metrics, where the first scan target center frequency is ranked higher than the second scan target center frequency In Example 55, the subject matter of Example 54 can optionally include that the one or more processors are further configured to define ignore regions for one or more predecessor scan target center frequencies, including the first scan target center frequency, that have higher detection metrics than the second scan target center frequency, and that the one or more processors are configured to determine whether to include the second scan target center frequency in the search target list based on whether the scan target frequency is in the ignore region by determining whether the second scan target center frequency is in the ignore region of any of the one or more predecessor scan target center frequencies, determining whether the detection metric of the second scan target center frequency is greater than a predefined threshold, and including the second scan target center frequency in the search target list if the second scan target center frequency is not in the ignore region of any of the one or more predecessor scan target center frequencies and the detection metric of the second scan target center frequency is greater than the predefined threshold.

In Example 56, the subject matter of Example 54 can optionally include that the one or more processors are configured to define the ignore region by iterating through the ranking and defining the ignore region once the first scan target center frequency is reached in the ranking, and that the one or more processors are configured to determine whether to include the second scan target center frequency in the search target list by continuing to iterate through the ranking and, when the second scan target center frequency is reached, determining whether the second scan target center frequency is in the ignore region of the first scan target center frequency.

In Example 57, the subject matter of Example 56 can optionally include that the one or more processors are further configured to determine whether to include the second scan target center frequency in the search target list by when the second scan target center frequency is reached, determining whether the detection metric is greater than a predefined threshold.

In Example 58, the subject matter of any one of Examples 54 to 57 can optionally include that each detection metric is a ratio of a peak value to a mean value of a cross-correlation between a target synchronization signal and a baseband signal received on one of the plurality of scan target center frequencies.

In Example 59, the subject matter of any one of Examples 54 to 57 can optionally further include a scan engine configured to determine the detection metrics by determining a ratio of a peak value to a mean value of a cross-correlation between a target synchronization signal and a baseband signal received on one of the plurality of scan target center frequencies.

In Example 60, the subject matter of Example 58 or 59 can optionally include that the scan results include the detection metrics.

In Example 61, the subject matter of any one of Examples 54 to 57 can optionally include that each detection metric is an estimated SNR for one of the plurality of scan target center frequencies.

In Example 62, the subject matter of Example 61 can optionally include that the scan results include alpha statistics for the plurality of scan target center frequencies, the one or more processors are further configured to determine the estimated SNRs based on the alpha statistics.

In Example 63, the subject matter of Example 49 can optionally include the one or more processors are further configured to define ignore regions for one or more predecessor scan target center frequencies including the first scan target center frequency, where the one or more processors are configured to determine whether to include the second scan target center frequency in the search target list based on whether the scan target frequency is in the ignore region by determining whether the second scan target center frequency is in the ignore region of any of the one or more predecessor scan target center frequencies, determining whether a detection metric of the second scan target center frequency is greater than a predefined threshold, and including the second scan target center frequency in the search target list if the second scan target center frequency is not in the ignore region of any of the one or more predecessor scan target center frequencies and the detection metric of the second scan target center frequency is greater than the predefined threshold.

In Example 64, the subject matter of any one of Examples 49 to 63 can optionally include that the scan results include detection metrics for the plurality of scan target center frequencies, and that the first scan target center frequency has a higher detection metric than the second scan target center frequency.

In Example 65, the subject matter of any one of Examples 49 to 64 can optionally include that the scan results are for a Narrowband Internet of Things (NB-IoT) frequency scan.

In Example 66, the subject matter of any one of Examples 49 to 65 can optionally include that the one or more processors are further configured to receive search results from the cell searcher and to select a cell to connect to based on the search results.

In Example 67, the subject matter of any one of Examples 49 to 66 can optionally include that the one or more processors are configured to define the ignore region for the first scan target center frequency by defining the ignore region to include an immediately next higher center frequency of the first scan target center frequency on a predefined channel raster, and to include an immediately next lower center frequency of the first scan target center frequency on the predefined channel raster.

In Example 68, the subject matter of any one of Examples 49 to 66 can optionally include that the one or more processors are configured to define the ignore region for the first scan target center frequency by defining the ignore region to include a predefined quantity of immediately next higher and immediately next lower center frequencies to the first scan target center frequency on a predefined channel raster.

Example 69 is a method of performing wireless communications, the method including receiving detection metrics for a plurality of scan target center frequencies as scan results for a frequency scan, ranking the plurality of scan target center frequencies according to their detection metrics, while iterating through the ranking of scan target center frequencies, determining whether a current scan target center frequency is in a preceding scan target center frequency's ignore region and determining whether the detection metric of the current scan target center frequency is greater than a predefined threshold, and if the current scan target center frequency is not in a predecessor scan target center frequency's ignore region and its detection metric is greater than the predefined threshold, adding the current scan target center frequency to a search target list and defining an ignore region including one or more neighboring center frequencies of the current scan target center frequency.

Example 70 is a communication device including one or more processors configured to receive detection metrics for a plurality of scan target center frequencies as scan results for a frequency scan, rank the plurality of scan target center frequencies according to their detection metrics, while iterating through the ranking of scan target center frequencies, determine whether a current scan target center frequency is in a preceding scan target center frequency's ignore region and determining whether the detection metric of the current scan target center frequency is greater than a predefined threshold, and if the current scan target center frequency is not in a predecessor scan target center frequency's ignore region and its detection metric is greater than the predefined threshold, add the current scan target center frequency to a search target list and defining an ignore region including one or more neighboring center frequencies of the current scan target center frequency.

Example 71 is a non-transitory computer readable medium storing instructions that when executed by one or more processors cause the processor to perform the method of any one of Examples 33 to 48 or 69.

Example 72 is a non-transitory computer readable medium storing instructions that when executed by one or more processors of a terminal device cause the terminal device to perform the method of any one of Examples 33 to 48 or 69.

Example 73 is a terminal device including one or more processors configured to run a protocol stack, a scan engine, and a cell searcher configured to perform the method of any one of Examples 33 to 48 or 69.

Example 74 is a method of detecting signals, the method including determining a rough time offset estimate for a target synchronization signal in a received signal, extracting a plurality of extracted windows from the received signal based on the rough time offset estimate, generating a matrix with frequency-domain cross-correlations between the plurality of extracted windows and the target synchronization signal, and determining a refined time offset estimate and a frequency offset estimate based on a maximum-valued element of the matrix.

In Example 75, the subject matter of Example 74 can optionally include that determining the rough time offset estimate includes determining a time-domain cross-correlation between the target synchronization signal and the received signal, identifying a maximum-valued sample of the time-domain cross-correlation, and determining the rough time offset estimate with the maximum-valued sample.

In Example 76, the subject matter of Example 74 can optionally include that determining the rough time offset estimate includes determining, for each of a plurality of radio frames of the received signal, a time-domain cross-correlation between the target synchronization signal and each radio frame, determining the absolute value of each time-domain cross-correlation to obtain a respective time-domain cross-correlation magnitude, accumulating the respective time-domain cross-correlation magnitudes over the plurality of radio frames to obtain an accumulated time-domain cross-correlation magnitude, identifying a maximum-valued sample of the accumulated time-domain cross-correlation magnitude, and determining the rough time offset estimate with the maximum-valued sample.

In Example 77, the subject matter of Example 75 or 76 can optionally include that determining the time-domain cross-correlation between the target synchronization signal and a radio frame includes performing a frequency-domain element-by-element multiplication between a complex conjugate of the frequency-domain target synchronization signal and the radio frame to obtain a product, and converting the product to the time domain to obtain the time-domain cross-correlation.

In Example 78, the subject matter of any one of Examples 74 to 77 can optionally include that the rough time offset estimate indicates a potential time sample location of the target synchronization signal in the received signal.

In Example 79, the subject matter of any one of Examples 74 to 78 can optionally include that extracting the plurality of extracted windows from the received signal based on the rough time offset estimate includes extracting each of the plurality of extracted windows from the received signal with different window starting points, where the different window starting points are based around the rough time offset estimate.

In Example 80, the subject matter of any one of Examples 74 to 78 can optionally include that extracting the plurality of extracted windows from the received signal based on the rough time offset estimate includes looping through a plurality of delta values that each indicate a time sample delay relative to the rough time offset estimate, and for each of the plurality of delta values, extracting one of the plurality of extracted windows from the received signal starting from a sample of the received signal that occurs at the time sample delay of the delta value relative to the rough time offset estimate.

In Example 81, the subject matter of any one of Examples 74 to 80 can optionally include that generating the matrix with the frequency-domain cross-correlations includes determining a first set of frequency-domain cross-correlations between each of the plurality of extracted windows and a first template of the target synchronization signal, determining second set of frequency-domain cross-correlations between each of the plurality of extracted windows and a second template of the target synchronization signal having a time offset from the first template of the synchronization signal, and generating the matrix using the first and second sets of frequency-domain cross-correlations as columns of the matrix.

In Example 82, the subject matter of Example 81 can optionally include that generating the matrix using the first and second sets of frequency-domain cross-correlations as the columns of the matrix includes interleaving the first and second sets of frequency-domain cross-correlations as the columns of the matrix.

In Example 83, the subject matter of Example 81 can optionally include that the plurality of extracted windows have different window starting points within the received signal, and that generating the matrix using the first and second sets of frequency-domain cross-correlations as the columns of the matrix includes placing the first and second sets of frequency-domain cross-correlations as the columns of the matrix in the order of the window starting points of their respective extracted windows, where the columns of the matrix alternate between the first and second sets of frequency-domain cross-correlations.

In Example 84, the subject matter of any one of Examples 81 to 83 can optionally include that the time offset between the first and second templates of the target synchronization signal is a sub-sample timing offset.

In Example 85, the subject matter of any one of Examples 81 to 83 can optionally include that the time offset between the first and second templates of the target synchronization signal is a half-sample timing offset.

In Example 86, the subject matter of any one of Examples 81 to 85 can optionally include that the first and second templates of the target synchronization signal are time-domain complex conjugates of the target synchronization signal.

In Example 87, the subject matter of any one of Examples 74 to 86 can optionally include that the columns of the matrix correspond to candidate timing offset estimates, and that the rows of the matrix correspond to candidate frequency offset estimates.

In Example 88, the subject matter of any one of Examples 74 to 87 can optionally include that the frequency-domain cross-correlations of the matrix are accumulated frequency-domain cross-correlations, the method further including accumulating frequency-domain cross-correlations over a plurality of radio frames to obtain the frequency-domain cross-correlations for the matrix.

In Example 89, the subject matter of any one of Examples 74 to 88 can optionally include that determining the refined time offset estimate and the frequency offset estimate includes identifying the maximum-valued element of the matrix, interpolating with a set of horizontal neighbor elements of the maximum-valued element to determine the refined time offset estimate, and interpolating with a set of vertical neighbor elements of the maximum-valued element to determine the frequency offset estimate.

In Example 90, the subject matter of any one of Examples 74 to 88 can optionally include that determining the refined time offset estimate and the frequency offset estimate includes identifying the maximum-valued element of the matrix, generating a first three-point parabola with the maximum valued element and right and left horizontal neighbor elements of the maximum-valued element and determining the refined time offset estimate with the first three-point parabola, and generating a second three-point parabola with the maximum valued element and upper and lower vertical neighbor elements of the maximum-valued element and determining the frequency offset estimate with the second three-point parabola.

In Example 91, the subject matter of any one of Examples 74 to 90 can optionally include that the target synchronization signal is a Narrowband Internet of Things (NB-IoT) Primary Synchronization Signal (NPSS).

In Example 92, the subject matter of any one of Examples 74 to 91 can optionally further include transmitting or receiving signals with a timing schedule based on the refined time offset estimate and with a carrier frequency based on the frequency offset estimate.

In Example 93, the subject matter of any one of Examples 74 to 92 can optionally further include wirelessly receiving the received signal with a radio frequency (RF) transceiver, where the frequency offset estimate indicates an estimated offset in frequency between a synchronization signal in the received signal and a carrier frequency of the RF transceiver.

Example 94 is a non-transitory computer readable medium storing instructions that when executed by a processor cause the processor to perform the method of any one of Examples 74 to 92.

Example 95 is a non-transitory computer readable medium storing instructions that when executed by a processor of a terminal device cause the terminal device to perform the method of any one of Examples 74 to 92.

Example 96 is an integrated circuit including one or more processors or one or more digital hardware circuits, and configured to perform the method of any one of Examples 74 to 92.

Example 97 is a wireless communication device including a determiner configured to determine a rough time offset estimate for a target synchronization signal in a received signal, an extractor configured to extract a plurality of extracted windows from the received signal based on the rough time offset estimate, a matrix generator configured to generate a matrix with frequency-domain cross-correlations between the plurality of extracted windows and the target synchronization signal, and a detector configured to determine a refined time offset estimate and a frequency offset estimate based on a maximum-valued element of the matrix.

In Example 98, the subject matter of Example 97 can optionally include that the determiner, the extractor, the matrix generator, and the detector are mounted on a cell searcher integrated circuit, and are configured as processors or digital hardware logic.

In Example 99, the subject matter of Example 97 or 98 can optionally further include a cross-correlation calculator configured to determine a time-domain cross-correlation between the target synchronization signal and the received signal, where the detector is further configured to identify a maximum-valued sample of the time-domain cross-correlation, and to determine the rough time offset estimate with the maximum-valued sample.

In Example 100, the subject matter of Example 97 or 98 can optionally further include a cross-correlation calculator configured to determine, for each of a plurality of radio frames of the received signal, a time-domain cross-correlation between the target synchronization signal and each radio frame, an absolute value determiner configured to determine the absolute value of each time-domain cross-correlation to obtain a respective time-domain cross-correlation magnitude, an accumulator configured to accumulate the respective time-domain cross-correlation magnitudes over the plurality of radio frames to obtain an accumulated time-domain cross-correlation magnitude, where the determiner is configured to identify a maximum-valued sample of the accumulated time-domain cross-correlation magnitude and to determine the rough time offset estimate with the maximum-valued sample.

In Example 101, the subject matter of Example 100 can optionally include that the cross-correlation calculator includes a buffer configured to store the plurality of radio frames of the received signal.

In Example 102, the subject matter of any one of Examples 99 to 101 can optionally further include a template memory configured to provide a frequency-domain complex conjugate synchronization signal template of the target synchronization signal to the cross-correlation calculator, where the cross-correlation calculator includes a fast Fourier transform (FFT) engine configured to determine an FFT of the received signal to produce frequency-domain baseband samples, a multiplier configured to perform an element-by-element multiplication of the frequency-domain complex conjugate synchronization signal template and the frequency-domain baseband samples to obtain a product, and an inverse FFT (IFFT) engine configured to perform an IFFT on the product to obtain the time-domain cross-correlation.

In Example 103, the subject matter of any one of Examples 97 to 102 can optionally include that the rough time offset estimate indicates a potential time sample location of the target synchronization signal in the received signal.

In Example 104, the subject matter of any one of Examples 97 to 103 can optionally include that the extractor is configured to extract the plurality of extracted windows from the received signal based on the rough time offset estimate by extracting each of the plurality of extracted windows from the received signal with different window starting points, where the different window starting points are based around the rough time offset estimate.

In Example 105, the subject matter of any one of Examples 97 to 103 can optionally include that the extractor is configured to extract the plurality of extracted windows from the received signal based on the rough time offset estimate by looping through a plurality of delta values that each indicate a time sample delay relative to the rough time offset estimate, and for each of the plurality of delta values, extracting one of the plurality of extracted windows from the received signal starting from a sample of the received signal that occurs at the time sample delay of the delta value relative to the rough time offset estimate.

In Example 106, the subject matter of any one of Examples 97 to 105 can optionally further include a multiplier and a fast Fourier transform (FFT) engine configured to determine a first set of frequency-domain cross-correlations between each of the plurality of extracted windows and a first template of the target synchronization signal, and configured to determine a second set of frequency-domain cross-correlations between each of the plurality of extracted windows and a second template of the target synchronization signal, where the matrix generator is configured to generate the matrix using the first and second sets of the frequency-domain cross-correlations as columns of the matrix.

In Example 107, the subject matter of Example 106 can optionally include that the matrix generator is configured to generate the matrix using the first and second sets of frequency-domain cross-correlations as the columns of the matrix by interleaving the first and second sets of frequency-domain cross-correlations as the columns of the matrix.

In Example 108, the subject matter of Example 106 can optionally include that the plurality of extracted windows have different window starting points within the received signal, and where the matrix generator is configured to generate the matrix using the first and second sets of frequency-domain cross-correlations as the columns of the matrix by placing the first and second sets of frequency-domain cross-correlations as the columns of the matrix in the order of the window starting points of their respective extracted windows, where the columns of the matrix alternate between the first and second sets of frequency-domain cross-correlations.

In Example 109, the subject matter of any one of Examples 106 to 108 can optionally further include a first template memory configured to store the first template of the target synchronization signal and a second template memory configured to store the second template of the target synchronization signal.

In Example 110, the subject matter of any one of Examples 106 to 109 can optionally include that the time offset between the first and second templates of the target synchronization signal is a sub-sample timing offset.

In Example 111, the subject matter of any one of Examples 106 to 109 can optionally include that the time offset between the first and second templates of the target synchronization signal is a half-sample timing offset.

In Example 112, the subject matter of any one of Examples 106 to 111 can optionally include that the first and second templates of the target synchronization signal are time-domain complex conjugates of the target synchronization signal.

In Example 113, the subject matter of any one of Examples 97 to 112 can optionally include that the columns of the matrix correspond to candidate timing offset estimates, and the rows of the matrix correspond to candidate frequency offset estimates.

In Example 114, the subject matter of any one of Examples 97 to 113 can optionally include that the frequency-domain cross-correlations of the matrix are accumulated frequency-domain cross-correlations, the wireless communication device further including an accumulator configured to accumulate frequency-domain cross-correlations over a plurality of radio frames to obtain the frequency-domain cross-correlations for the matrix.

In Example 115, the subject matter of any one of Examples 97 to 114 can optionally include that the detector is configured to determine the refined time offset estimate and the frequency offset estimate by identifying the maximum-valued element of the matrix, interpolating with a set of horizontal neighbor elements of the maximum-valued element to determine the refined time offset estimate, and interpolating with a set of vertical neighbor elements of the maximum-valued element to determine the frequency offset estimate.

In Example 116, the subject matter of Example one can optionally include Examples 97 to 114, where the detector is configured to determine the refined time offset estimate and the frequency offset estimate by identifying the maximum-valued element of the matrix, generating a first three-point parabola with the maximum valued element and right and left horizontal neighbor elements of the maximum-valued element and determining the refined time offset estimate with the first three-point parabola, and generating a second three-point parabola with the maximum valued element and upper and lower vertical neighbor elements of the maximum-valued element and determining the frequency offset estimate with the second three-point parabola.

In Example 117, the subject matter of any one of Examples 97 to 116 can optionally include that the target synchronization signal is a Narrowband Internet of Things (NB-IoT) Primary Synchronization Signal (NPSS).

In Example 118, the subject matter of any one of Examples 97 to 117 can optionally further include a radio frequency (RF) transceiver configured to transmit or receive signals with a timing schedule based on the refined time offset estimate and with a carrier frequency based on the frequency offset estimate.

In Example 119, the subject matter of any one of Examples 97 to 117 can optionally further include a radio frequency (RF) transceiver configured to wirelessly receive the received signal, where the frequency offset estimate indicates an estimated offset in frequency between a synchronization signal in the received signal and a carrier frequency of the RF transceiver.

Example 120 is a terminal device for wireless communications, the terminal device including the wireless communication device of any one of Examples 97 to 117.

In Example 121, the subject matter of Example 120 can optionally include that the wireless communication device is a cell searcher of the terminal device.

In Example 122, the subject matter of Example 120 or 121 can optionally further include one or more antennas, a radio frequency (RF) transceiver, and a baseband modem that includes the wireless communication device.

Example 123 is a method of performing a frequency scan, the method including determining a cross-correlation between a baseband signal from a scan target center frequency and a target synchronization signal, determining a peak value and a mean value of the cross-correlation, determining a detection metric as a ratio of the peak value to the mean value, and reporting the detection metric as a scan result for the scan target center frequency to a protocol stack.

In Example 124, the subject matter of Example 123 can optionally include that the scan target center frequency is assigned for frequency scan by the protocol stack.

In Example 125, the subject matter of Example 123 or 124 can optionally include that determining the cross-correlation between the baseband signal and the target synchronization signal includes calculating an element-by-element multiplication between a Fourier transform of the baseband signal and Fourier transform complex conjugate of the target synchronization signal, determining an inverse Fourier transform of the element-by-element multiplication to obtain the cross-correlation.

In Example 126, the subject matter of Example 123 or 124 can optionally include that the cross-correlation is an accumulated cross-correlation magnitude, the method further including determining and accumulating cross-correlation magnitudes between the baseband signal and the target synchronization signal over a plurality of radio frames to obtain the cross-correlation.

In Example 127, the subject matter of any one of Examples 123 to 126 can optionally include that the baseband signal from the scan target center frequency is a downmixed baseband signal.

In Example 128, the subject matter of Example 127 can optionally further include receiving the baseband signal from a radio frequency (RF) transceiver.

In Example 129, the subject matter of any one of Examples 123 to 128 can optionally further include receiving a plurality of baseband signals, each downmixed from a scan target center frequency, determining cross-correlations for the plurality of baseband signals, determining a detection metric for each of the plurality of baseband signals as a ratio of a peak value to a mean value of their respective cross-correlations, and reporting the detection metrics for the plurality of baseband signals as scan results to the protocol stack.

In Example 130, the subject matter of any one of Examples 123 to 129 can optionally include that the target synchronization signal is a Narrowband Internet of Things (NB-IoT) Primary Synchronization Signal (NPSS).

Example 131 is a scan engine including a cross-correlation calculator configured to determine a cross-correlation between a received signal on a scan target center frequency and a target synchronization signal, and a determiner configured to determine a peak value and a mean value of the cross-correlation, determine a detection metric as a ratio of the peak value to the mean value, and report the detection metric as a scan result for the scan target center frequency to a protocol stack.

In Example 132, the subject matter of Example 131 can optionally include that the scan target center frequency is assigned for frequency scan by the protocol stack.

In Example 133, the subject matter of Example 131 or 132 can optionally include that the cross-correlation calculator includes a fast Fourier transform (FFT) engine configured to determine a Fourier transform of the baseband signal to obtain a frequency-domain baseband signal, a multiplier configured to calculate an element-by-element multiplication between the frequency-domain baseband signal and a Fourier transform complex conjugate of the target synchronization signal, and an inverse FFT (IFFT) engine configured to determine an inverse Fourier transform of the element-by-element multiplication to obtain the cross-correlation.

In Example 134, the subject matter of Example 131 or 132 can optionally include that the cross-correlation is an accumulated cross-correlation magnitude.

In Example 135, the subject matter of any one of Examples 131 to 134 can optionally include that the baseband signal from the scan target center frequency is a downmixed baseband signal.

In Example 136, the subject matter of Example 135 can optionally further include receiving the baseband signal from a radio frequency (RF) transceiver.

In Example 137, the subject matter of any one of Examples 131 to 136 can optionally include the cross-correlation calculator further configured to receive a plurality of baseband signals, each downmixed from a scan target center frequency, and to determine cross-correlations for the plurality of baseband signals, where the determiner is further configured to determine a detection metric for each of the plurality of baseband signals as a ratio of a peak value to a mean value of their respective cross-correlations, and to report the detection metrics for the plurality of baseband signals as scan results to the protocol stack.

In Example 138, the subject matter of any one of Examples 131 to 137 can optionally include that the target synchronization signal is a Narrowband Internet of Things (NB-IoT) Primary Synchronization Signal (NPSS)

Example 139 is a communication device including one or more processors configured to execute a protocol stack, a scan engine configured to determine a cross-correlation between a baseband signal on a scan target center frequency and a target synchronization signal, determine a peak value and a mean value of the cross-correlation, determine a detection metric as a ratio of the peak value to the mean value, and report the detection metric as a scan result for the scan target center frequency to the protocol stack, the one or more processors configured to select one or more search target center frequencies for cell search based on the detection metric.

In Example 140, the subject matter of Example 139 can optionally include that the protocol stack is software executed by the one or more processors.

In Example 141, the subject matter of Example 139 or 140 can optionally further include a radio frequency (RF) transceiver configured to downmix a radio signal using the scan target center frequency as a downmixing frequency to obtain the baseband signal, and to provide the baseband signal to the scan engine.

In Example 142, the subject matter of any one of Examples 139 to 141 can optionally further include one or more antennas.

In Example 143, the subject matter of any one of Examples 139 to 142 can optionally further include a cell searcher, where the one or more processors are configured to assign the one or more search target center frequencies to the cell searcher for cell search.

In Example 144, the subject matter of Example 143 can optionally include that the cell searcher is configured to perform a cell search on the one or more search target center frequencies to detect one or more cells, and to report the one or more cells to the protocol stack as search results.

In Example 145, the subject matter of Example 144 can optionally include that the one or more processors are configured to select a cell from the one or more cells to connect to.

In Example 146, the subject matter of any one of Examples 139 to 145 can optionally include that the scan engine includes a cross-correlation calculator configured to determine the cross-correlation between the baseband signal and the target synchronization signal.

In Example 147, the subject matter of any one of Examples 139 to 146 can optionally include that the scan engine is further configured to determine a cross-correlation between baseband signals from one or more additional scan target center frequencies and the target synchronization signal, determine a peak value and mean value for each of the cross-correlations, and determine a detection metric for each of the one or more additional scan target center frequencies as a ratio of the peak value to the mean value, and reporting the detection metrics for each of the one or more additional scan target center frequencies as scan results to the protocol stack.

In Example 148, the subject matter of any one of Examples 139 to 147 can optionally include that the scan target center frequency is one of a plurality of scan target center frequencies, the scan engine configured to determine and report detection metrics as scan results for each of the plurality of scan target center frequencies to the protocol stack.

In Example 149, the subject matter of Example 148 can optionally include that the one or more processors are configured to select the one or more search target center frequencies for cell search based on the detection metric by comparing the detection metrics for the plurality of scan target center frequencies to a predefined threshold, and including one or more of the plurality of scan target center frequencies having detection metrics greater than the predefined threshold in the one or more search target center frequencies.

In Example 150, the subject matter of Example 149 can optionally include that the one or more processors are further configured to determine whether a quantity of the one or more search target center frequencies is greater than a predefined minimum size, and if the quantity of the one or more search target center frequencies is not greater than the predefined minimum size, instruct the scan engine to perform an extended coverage frequency scan.

In Example 151, the subject matter of Example 150 can optionally include that the scan engine is configured to perform the extended coverage frequency scan on a second plurality of scan target center frequencies, and to report detection metrics for the extended coverage frequency scan back to the protocol stack, where the one or more processors are configured to compare the detection metrics for the extended coverage frequency scan to the predefined threshold, and to include one or more of the second plurality of scan target center frequencies having detection metrics greater than the predefined threshold in the one or more search target frequencies.

In Example 152, the subject matter of Example 150 or 151 can optionally include that the scan engine is configured to determine the detection metrics for the second plurality of scan target center frequencies with a larger number of accumulated radio frames than the detection metrics for the plurality of scan target center frequencies.

In Example 153, the subject matter of Example 148 can optionally include that the protocol stack is further configured to identify a predefined quantity of the plurality of scan target center frequencies having the highest detection metrics, and to include the predefined quantity of the plurality of scan target center frequencies in the one or more search target center frequencies.

In Example 154, the subject matter of any one of Examples 148 to 152 can optionally further include a signal-to-noise ratio (SNR) estimator configured to determine an estimated SNR for the plurality of scan target center frequencies based on their detection metrics.

In Example 155, the subject matter of any one of Examples 139 to 146 can optionally further include a signal-to-noise ratio (SNR) estimator configured to determine an estimated SNR for the scan target center frequency based on the detection metric.

In Example 156, the subject matter of Example 154 or 155 can optionally include that the SNR estimator is configured to determine estimated SNRs with a mapping function that maps an input detection metric to an output estimated SNR.

In Example 157, the subject matter of any one of Examples 139 to 156 can optionally include that the target synchronization signal is a Narrowband Internet of Things (NB-IoT) Primary Synchronization Signal (NPSS).

In Example 158, the subject matter of any one of Examples 139 to 157 can optionally include that the scan engine is configured to determine and report detection metrics for a plurality of scan target center frequencies, including the first scan target center frequency, to the protocol stack, and where the one or more processors are configured to select the one or more search target center frequencies for cell search based on the detection metric by ranking the plurality of scan target center frequencies according to their detection metrics, while iterating through the ranking, determining whether a current scan target center frequency of the current iteration is in an ignore region of any predecessor scan target center frequency of a previous iteration and determining whether the detection metric of the current scan target center frequency is greater than a predefined threshold, and if the current scan target center frequency is not in the ignore region of any predecessor scan target center frequency and its detection metric is greater than the predefined threshold, selecting the current scan target center frequency as one of the one or more search target center frequencies.

In Example 159, the subject matter of Example 158 can optionally include that the one or more processors are further configured to, if the current scan target center frequency is not in the ignore region of any predecessor scan target center frequency and its detection metric is greater than the predefined threshold, define an ignore region for the current scan target center frequency.

In Example 160, the subject matter of Example 159 can optionally include that the one or more processors are configured to define the ignore region for the current scan target center frequency by defining the ignore region to include a predefined quantity of immediately next higher and immediately next lower center frequencies to the current scan target center frequency on a predefined channel raster.

In Example 161, the subject matter of any one of Examples 139 to 157 can optionally include that the scan engine is configured to determine and report detection metrics for a plurality of scan target center frequencies, including the first scan target center frequency, to the protocol stack, and where the one or more processors are configured to select the one or more search target center frequencies for cell search based on the detection metric by determining whether the first scan target center frequency is in an ignore region of another of the plurality of scan target center frequencies, determining whether the detection metric of the first scan target center frequency is greater than a predefined threshold, and if the first scan target center frequency is not in the ignore region of another scan target center frequency and its detection metric is greater than the predefined threshold, selecting the first scan target center frequency as one of the one or more search target center frequencies.

In Example 162, the subject matter of Example 161 can optionally include that the one or more processors are further configured to, if the first scan target center frequency is not in the ignore region of any predecessor scan target center frequency and its detection metric is greater than the predefined threshold, define an ignore region for the first scan target center frequency.

In Example 163, the subject matter of Example 162 can optionally include that the one or more processors are configured to define the ignore region for the first scan target center frequency by defining the ignore region to include a predefined quantity of immediately next higher and immediately next lower center frequencies to the first scan target center frequency on a predefined channel raster.

Example 164 is a method of performing frequency scans, the method including determining a cross-correlation between a baseband signal on a scan target center frequency and a target synchronization signal, determining a peak value and a mean value of the cross-correlation, determining a detection metric as a ratio of the peak value to the mean value, and selecting one or more search target center frequencies for cell search based on the detection metric.

In Example 165, the subject matter of Example 164 can optionally further include downmixing a radio signal using the scan target center frequency as a downmixing frequency to obtain the baseband signal.

In Example 166, the subject matter of Example 164 or 165 can optionally further include performing the cell search on the one or more search target center frequencies to detect one or more cells.

In Example 167, the subject matter of Example 166 can optionally further include selecting a cell from the one or more cells to connect to.

In Example 168, the subject matter of any one of Examples 164 to 167 can optionally include that the scan target center frequency is one of a plurality of scan target center frequencies, the method further including determining detection metrics for each of the plurality of scan target center frequencies.

In Example 169, the subject matter of Example 168 can optionally include that selecting the one or more search target center frequencies for cell search based on the detection metric includes comparing the detection metrics for the plurality of scan target center frequencies to a predefined threshold, and including one or more of the plurality of scan target center frequencies having detection metrics greater than the predefined threshold in the one or more search target center frequencies.

In Example 170, the subject matter of Example 169 can optionally further include determining whether a quantity of the one or more search target center frequencies is greater than a predefined minimum size, and if the quantity of the one or more search target center frequencies is not greater than the predefined minimum size, performing an extended coverage frequency scan.

In Example 171, the subject matter of Example 170 can optionally include that performing the extended coverage frequency scan includes performing the extended coverage frequency scan on a second plurality of scan target center frequencies to obtain detection metrics for the second plurality of scan target center frequencies, the method further including comparing the detection metrics for the extended coverage frequency scan to the predefined threshold, and including one or more of the second plurality of scan target center frequencies having detection metrics greater than the predefined threshold in the one or more search target frequencies.

In Example 172, the subject matter of Example 171 can optionally include that determining the detection metrics for the second plurality of scan target center frequencies includes determining the detection metrics for the second plurality of scan target center frequencies with a larger number of accumulated radio frames than the detection metrics for the plurality of scan target center frequencies.

In Example 173, the subject matter of Example 168 can optionally further include identifying a predefined quantity of the plurality of scan target center frequencies having the highest detection metrics, and including the predefined quantity of the plurality of scan target center frequencies in the one or more search target center frequencies.

In Example 174, the subject matter of any one of Examples 168 to 173 can optionally further include determining an estimated SNR for the plurality of scan target center frequencies based on their detection metrics.

In Example 175, the subject matter of any one of Examples 164 to 167 can optionally further include determining an estimated SNR for the scan target center frequency based on the detection metric.

In Example 176, the subject matter of any one of Examples 164 to 175 can optionally include that the target synchronization signal is a Narrowband Internet of Things (NB-IoT) Primary Synchronization Signal (NPSS).

In Example 177, the subject matter of any one of Examples 164 to 176 can optionally further include determining detection metrics for a plurality of scan target center frequencies, including the first scan target center frequency, and where selecting the one or more search target center frequencies for cell search based on the detection metric includes ranking the plurality of scan target center frequencies according to their detection metrics, while iterating through the ranking, determining whether a current scan target center frequency of the current iteration is in an ignore region of any predecessor scan target center frequency of a previous iteration and determining whether the detection metric of the current scan target center frequency is greater than a predefined threshold, and if the current scan target center frequency is not in the ignore region of any predecessor scan target center frequency and its detection metric is greater than the predefined threshold, selecting the current scan target center frequency as one of the one or more search target center frequencies.

In Example 178, the subject matter of Example 177 can optionally further include if the current scan target center frequency is not in the ignore region of any predecessor scan target center frequency and its detection metric is greater than the predefined threshold, defining an ignore region for the current scan target center frequency.

In Example 179, the subject matter of Example 178 can optionally include that defining the ignore region for the current scan target center frequency includes defining the ignore region to include a predefined quantity of immediately next higher and immediately next lower center frequencies to the current scan target center frequency on a predefined channel raster.

In Example 180, the subject matter of any one of Examples 164 to 176 can optionally further include determining detection metrics for a plurality of scan target center frequencies, including the first scan target center frequency, to the protocol stack, and where selecting the one or more search target center frequencies for cell search based on the detection metric includes determining whether the first scan target center frequency is in an ignore region of another of the plurality of scan target center frequencies, determining whether the detection metric of the first scan target center frequency is greater than a predefined threshold, and if the first scan target center frequency is not in the ignore region of another scan target center frequency and its detection metric is greater than the predefined threshold, selecting the first scan target center frequency as one of the one or more search target center frequencies.

In Example 181, the subject matter of Example 180 can optionally further include, if the first scan target center frequency is not in the ignore region of any predecessor scan target center frequency and its detection metric is greater than the predefined threshold, defining an ignore region for the first scan target center frequency.

In Example 182, the subject matter of Example 181 can optionally include that defining the ignore region for the first scan target center frequency includes defining the ignore region to include a predefined quantity of immediately next higher and immediately next lower center frequencies to the first scan target center frequency on a predefined channel raster.

Example 183 is a non-transitory computer readable medium storing instructions that when executed by one or more processors cause the processor to perform the method of any one of Examples 123 to 130 or 164 to 176.

Example 184 is a non-transitory computer readable medium storing instructions that when executed by one or more processors of a terminal device cause the terminal device to perform the method of any one of Examples 123 to 130 or 164 to 176.

Example 185 is a terminal device including one or more processors for executing a protocol stack, a scan engine, and a cell searcher, and configured to perform the method of any one of Examples 123 to 130 or 164 to 176.

Example 186 is a method of performing wireless communications, the method including performing a first synchronization signal detection and a second synchronization signal detection on a cell using a target downmixing frequency to obtain a first detection time estimate, a second detection time estimate, and a frequency offset estimate, determining a correction factor for an oscillator based on a difference between the second detection time estimate and an expected second detection time estimate, determining an actual downmixing frequency based on the target downmixing frequency and the correction factor, and determining a center frequency of the cell with the actual downmixing frequency and the frequency offset estimate.

In Example 187, the subject matter of Example 186 can optionally include that performing the first synchronization signal detection on the cell using the target downmixing frequency includes estimating a first detection time of a target synchronization signal to obtain the first detection time estimate, and estimating a first offset between the target downmixing frequency and a carrier frequency of the target synchronization signal to obtain a first frequency offset estimate, where the frequency offset estimate is based on the first frequency offset estimate.

In Example 188, the subject matter of Example 187 can optionally include that performing the second synchronization signal detection on the cell using the target downmixing frequency includes estimating a second detection time of the target synchronization signal to obtain the second detection time estimate, and estimating a second offset between the target downmixing frequency and the carrier frequency of the target synchronization signal to obtain a second frequency offset estimate, where the frequency offset estimate is an average of the first and second frequency offset estimates.

In Example 189, the subject matter of any one of Examples 186 to 188 can optionally further include determining the expected second detection time estimate based on the first detection time estimate and a schedule of a target synchronization signal.

In Example 190, the subject matter of any one of Examples 186 to 188 can optionally further include determining the expected second detection time estimate based on the first detection time estimate and a fixed periodicity of a target synchronization signal.

In Example 191, the subject matter of any one of Examples 186 to 190 can optionally further include correcting an oscillation frequency of the oscillator according to the correction factor.

In Example 192, the subject matter of any one of Examples 186 to 191 can optionally include that the target downmixing frequency is based on an oscillation frequency of the oscillator.

In Example 193, the subject matter of any one of Examples 186 to 192 can optionally include that determining the actual downmixing frequency based on the target downmixing frequency and the correction factor includes correcting the target downmixing frequency according to the correction factor to obtain the actual downmixing frequency.

In Example 194, the subject matter of any one of Examples 186 to 193 can optionally include that determining the center frequency of the cell with the actual downmixing frequency and the frequency offset estimate includes adding the frequency offset estimate to the actual downmixing frequency to determine the center frequency of the cell.

In Example 195, the subject matter of any one of Examples 186 to 194 can optionally further include tuning a radio frequency (RF) transceiver with the target downmixing frequency set to a target center frequency and receiving a signal via the RF transceiver, where the first and second synchronization signal detections are performed on the signal.

In Example 196, the subject matter of any one of Examples 186 to 195 can optionally include that the cell is offset from a predefined channel raster of center frequencies by a channel raster offset and where the target downmixing frequency is set to a target center frequency of the predefined channel raster, the method further including determining a difference between the center frequency of the cell and the target center frequency to determine the channel raster offset of the cell.

In Example 197, the subject matter of Example 196 can optionally include that the cell is an NB-IoT cell (Narrowband Internet of Things), and where the channel raster offset is a predefined channel raster offset for NB-IoT cells.

In Example 198, the subject matter of any one of Examples 186 to 196 can optionally include that the cell is an NB-IoT (Narrowband Internet of Things) Cell.

In Example 199, the subject matter of any one of Examples 186 to 198 can optionally include that performing the first and second synchronization signal detections includes performing synchronization signal detection on NPSSs (Narrowband Internet of Things (NB-IoT) Primary Synchronization Signals).

In Example 200, the subject matter of any one of Examples 186 to 199 can optionally include that the correction factor is dependent on an inaccuracy of the oscillator.

Example 200 is a non-transitory computer readable medium storing instructions that when executed by a processor cause the processor to perform the method of any one of Examples 186 to 200.

Example 202 is a non-transitory computer readable medium storing instructions that when executed by a processor of a terminal device cause the terminal device to perform the method of any one of Examples 186 to 200.

Example 203 is a digital signal processing chip including integrated circuitry configured to perform the method of any one of Examples 186 to 200.

Example 204 is a communication device, the communication device including a synchronization signal detector configured to perform a first synchronization signal detection and a second synchronization signal detection on a cell using a target downmixing frequency to obtain a first detection time estimate, a second detection time estimate, and a frequency offset estimate, an oscillator corrector configured to determine a correction factor for an oscillator based on a difference between the second detection time estimate and an expected second detection time estimate, and a raster offset determiner configured to determine an actual downmixing frequency based on the target downmixing frequency and the correction factor, and to determine a center frequency of the cell with the actual downmixing frequency and the frequency offset estimate.

In Example 205, the subject matter of Example 204 can optionally further include an RF transceiver configured to provide a baseband signal to the synchronization signal detector, where the synchronization signal detector is configured to perform the first and second synchronization signal detections on the baseband signal.

In Example 206, the subject matter of Example 204 or 205 can optionally further include one or more antennas configured to perform wireless reception.

In Example 207, the subject matter of any one of Examples 204 to 206 can optionally further include an application processor.

In Example 208, the subject matter of any one of Examples 204 to 207 can optionally include that the synchronization signal detector is configured to perform the first synchronization signal detection on the cell using the target downmixing frequency by estimating a first detection time of a target synchronization signal to obtain the first detection time estimate, and estimating a first offset between the target downmixing frequency and a carrier frequency of the target synchronization signal to obtain a first frequency offset estimate, where the frequency offset estimate is based on the first frequency offset estimate.

In Example 209, the subject matter of Example 208 can optionally include that the synchronization signal detector is configured to perform the second synchronization signal detection on the cell using the target downmixing frequency by estimating a second detection time of the target synchronization signal to obtain the second detection time estimate, and estimating a second offset between the target downmixing frequency and the carrier frequency of the target synchronization signal to obtain a second frequency offset estimate, where the frequency offset estimate is an average of the first and second frequency offset estimates.

In Example 210, the subject matter of any one of Examples 204 to 209 can optionally include that the synchronization signal detector is configured to determine the expected second detection time estimate based on the first detection time estimate and a schedule of a target synchronization signal.

In Example 211, the subject matter of any one of Examples 204 to 209 can optionally include that the synchronization signal detector is further configured to determine the expected second detection time estimate based on the first detection time estimate and a fixed periodicity of a target synchronization signal.

In Example 212, the subject matter of any one of Examples 204 to 211 can optionally include that the oscillator corrector is further configured to correct an oscillation frequency of the oscillator according to the correction factor.

In Example 213, the subject matter of any one of Examples 204 to 212 can optionally include that the target downmixing frequency is generated based on an oscillation frequency of the oscillator.

In Example 214, the subject matter of any one of Examples 204 to 213 can optionally include that the raster offset determiner is configured to determine the actual downmixing frequency based on the target downmixing frequency and the correction factor by correcting the target downmixing frequency according to the correction factor to obtain the actual downmixing frequency.

In Example 215, the subject matter of any one of Examples 204 to 214 can optionally include that the raster offset determiner is configured to determine the center frequency of the cell with the actual downmixing frequency and the frequency offset estimate by adding the frequency offset estimate to the actual downmixing frequency to determine the center frequency of the cell.

In Example 216, the subject matter of any one of Examples 204 to 215 can optionally further include a radio frequency (RF) transceiver configured to tune reception with the target downmixing frequency to a target center frequency, and to receive a signal, where the synchronization signal detector is configured to perform the first and second synchronization signal detections on the signal.

In Example 217, the subject matter of any one of Examples 204 to 216 can optionally include that the cell is offset from a predefined channel raster of center frequencies by a channel raster offset and where the target downmixing frequency is set to a target center frequency of the predefined channel raster, and where the raster offset determiner is configured to determine a difference between the center frequency of the cell and the target center frequency to determine the channel raster offset of the cell.

In Example 218, the subject matter of Example 217 can optionally include that the cell is an NB-IoT cell (Narrowband Internet of Things), and where the channel raster offset is a predefined channel raster offset for NB-IoT cells.

In Example 219, the subject matter of any one of Examples 204 to 218 can optionally include that the cell is an NB-IoT (Narrowband Internet of Things) Cell.

In Example 220, the subject matter of any one of Examples 204 to 219 can optionally include that performing the first and second synchronization signal detections includes performing synchronization signal detection on NPSSs (Narrowband Internet of Things (NB-IoT) Primary Synchronization Signals).

In Example 221, the subject matter of any one of Examples 204 to 220 can optionally include that the correction factor is dependent on an inaccuracy of the oscillator.

Example 221 is a terminal device including the communication device of any one of Examples 204 to 221 in a baseband modem.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A wireless communication device comprising one or more processors configured to:
   determine a rough time offset estimate for a target synchronization signal in a received signal;
   extract a plurality of extracted windows from the received signal based on the rough time offset estimate;
   generate a matrix with frequency-domain cross-correlations between the plurality of extracted windows and the target synchronization signal; and
   determine a refined time offset estimate and a frequency offset estimate based on a maximum-valued element of the matrix.

2. The wireless communication device of claim 1, the one or more processors configured to determine a time-domain cross-correlation between the target synchronization signal and the received signal,
   wherein the one or more processors are further configured to identify a maximum-valued sample of the time-domain cross-correlation, and to determine the rough time offset estimate with the maximum-valued sample.

3. The wireless communication device of claim 1, the one or more processors configured to:
   determine, for each of a plurality of radio frames of the received signal, a time-domain cross-correlation between the target synchronization signal and each radio frame;
   determine the absolute value of each time-domain cross-correlation to obtain a respective time-domain cross-correlation magnitude;
   accumulate the respective time-domain cross-correlation magnitudes over the plurality of radio frames to obtain an accumulated time-domain cross-correlation magnitude,
   wherein the one or more processors are configured to identify a maximum-valued sample of the accumulated time-domain cross-correlation magnitude and to determine the rough time offset estimate with the maximum-valued sample.

4. The wireless communication device of claim 1, wherein the one or more processors are configured to extract the plurality of extracted windows from the received signal based on the rough time offset estimate by:
   extracting each of the plurality of extracted windows from the received signal with different window starting points, where the different window starting points are based around the rough time offset estimate.

5. The wireless communication device of claim 1, wherein the one or more processors are configured to determine the refined time offset estimate and the frequency offset estimate by:
   identifying the maximum-valued element of the matrix;
   interpolating with a set of horizontal neighbor elements of the maximum-valued element to determine the refined time offset estimate; and
   interpolating with a set of vertical neighbor elements of the maximum-valued element to determine the frequency offset estimate.

6. A scan engine comprising one or more processors configured to:
   determine a cross-correlation between a received signal on a scan target center frequency and a target synchronization signal; and
   determine a peak value and a mean value of the cross-correlation, determine a detection metric as a ratio of the peak value to the mean value, and report the detection metric as a scan result for the scan target center frequency to a protocol stack.

7. The scan engine of claim 6, wherein the scan target center frequency is assigned for frequency scan by the protocol stack.

8. The scan engine of claim 6, the one or more processors configured to receive a plurality of baseband signals, each downmixed from a scan target center frequency, and to determine cross-correlations for the plurality of baseband signals;
   wherein the one or more processors are configured to determine a detection metric for each of the plurality of baseband signals as a ratio of a peak value to a mean value of their respective cross-correlations, and to report the detection metrics for the plurality of baseband signals as scan results to the protocol stack.

9. A communication device comprising one or more processors configured to execute a protocol stack, the one or more processors configured to:
   determine a cross-correlation between a baseband signal on a scan target center frequency and a target synchronization signal, determine a peak value and a mean value of the cross-correlation, determine a detection metric as a ratio of the peak value to the mean value, and report the detection metric as a scan result for the scan target center frequency to the protocol stack; and
   select one or more search target center frequencies for cell search based on the detection metric.

10. The communication device of claim 9, wherein the one or more processors are configured to assign the one or more search target center frequencies to the cell searcher for cell search.

* * * * *